United States Patent [19]
Luke et al.

[11] Patent Number: 6,081,253
[45] Date of Patent: Jun. 27, 2000

[54] METHOD FOR GENERATING NUMEROUS HARMONIOUS COLOR PALETTES FROM TWO COLORS

[75] Inventors: Joy Turner Luke, Sperryville, Va.; Stephen Colston Luke, Potomac, Md.

[73] Assignee: Bronson Color Company, Inc., Sperryville, Va.

[21] Appl. No.: 09/021,297

[22] Filed: Feb. 10, 1998

[51] Int. Cl.$^7$ .................................................. G09G 5/04
[52] U.S. Cl. ......................................................... 345/153
[58] Field of Search .................................... 345/133, 149, 345/150, 153, 155, 334, 22–24; 382/162–167, 154, 277, 293

[56] References Cited

U.S. PATENT DOCUMENTS

| | | | |
|---|---|---|---|
| 4,409,614 | 10/1983 | Eichler et al. | 358/76 |
| 4,524,421 | 6/1985 | Searby et al. | 364/521 |
| 4,685,070 | 8/1987 | Flinchbaugh | 364/522 |
| 4,694,286 | 9/1987 | Bergstedt | 340/703 |
| 4,721,951 | 1/1988 | Holler | 340/701 |
| 4,736,436 | 4/1988 | Yasukawa et al. | 382/154 |
| 4,794,382 | 12/1988 | Lai et al. | 340/703 |
| 4,907,025 | 3/1990 | Ikeno et al. | 354/400 |
| 4,985,853 | 1/1991 | Taylor et al. | 364/521 |
| 5,103,407 | 4/1992 | Gabor | 395/131 |
| 5,249,263 | 9/1993 | Yanker | 395/131 |
| 5,254,977 | 10/1993 | MacDonald | 345/150 |
| 5,254,978 | 10/1993 | Beretta | 345/150 |
| 5,311,212 | 5/1994 | Beretta | 345/150 |
| 5,581,376 | 12/1996 | Harrington | 358/518 |
| 5,630,038 | 5/1997 | Itoh et al. | 395/131 |

OTHER PUBLICATIONS

Barbara J. Meier; ACE: A Color Expert System for User Interface Design; Department of Computer Science; Dec. 31, 1988; pp. 117–128.

Penny Bauersfeld; A Knowledge–Based System to Select Colors for a Palette; Rochester Institute of Technology; Aug. 16, 1988; pp. 1–94.

*Primary Examiner*—Mark R. Powell
*Assistant Examiner*—Thu Nguyen
*Attorney, Agent, or Firm*—Greenberg Traurig; Richard E. Kurtz

[57] ABSTRACT

When the positions of two points within a uniform three dimensional space are known, this invention finds all the planes in the space that pass through an axis determined by those two points. It identifies all the points on each plane by their location and preserves their spatial relationship to one another within the three dimensional space. Every plane in a set of planes derived from a particular pair of points is defined by a unique formula. This invention is especially useful when the points represent units with characteristics dependent on their position in the space. Color systems exemplify this relationship.

Several color systems exist in which all reproducible colors are arranged in a three dimensional color solid so that colors progressively change in lightness vertically, in saturation horizontally and in hue as the solid is rotated. Individual colors in these systems are represented by points within the color solid and spacing between these colors has been determined by studies to be perceptually equidistant. The embodiment described in this disclosure utilizes one of these color systems to create and manipulate orderly groups of colors, i.e., color palettes, in which each color is specified by a notational system defining both its location in the color space and its appearance.

The most useful form of this embodiment is computer software that generates numerous color palettes and allows the user to view and select color palettes and individual colors. Appendix A contains the source code for this embodiment.

20 Claims, 23 Drawing Sheets

|  | L | j | g |
|---|---|---|---|
| 1st Formula | $L = 0$ | $j_1 = j_2$ put 1; otherwise $g_2 - g_1$ | $j_1 = j_2$ put 0; otherwise $j_1 - j_2$ |
| 2nd Formula | $g_1 = g_2$ put 0 otherwise $g_2 - g_1$ | $j = 0$ | $g_1 = g_2$ put 1 otherwise, $L_1 - L_2$ |
| 3rd Formula | $L_1 = L_2$ put 1 otherwise, $j_2 - j_1$ | $L_1 = L_2$ put 0 otherwise, $L_1 - L_2$ | $g = 0$ |

FIGURE. 8a

|        | L | j | g |
|--------|---|---|---|
| FORMULA 1 | 0 | 1 | 0 |
| FORMULA 2 | 0 | 0 | 1 |
| FORMULA 3 | 0 | 9 | 0 |

FIGURE 8b

|        | L | j | g |
|--------|---|---|---|
| FORMULA 1 | 0 | 0 | 2 |
| FORMULA 2 | 0 | 0 | 1 |
| FORMULA 3 | 1 | 0 | 0 |

FIGURE 8c

|  | L | j | g |
|---|---|---|---|
| FORMULA 1 | 0 | 1 | 0 |
| FORMULA 2 | -3 | 0 | 0 |
| FORMULA 3 | 1 | 0 | 0 |

FIGURE 8d

|  | L | j | g |
|---|---|---|---|
| FORMULA 1 | 0 | 9 | 3 |
| FORMULA 2 | 9 | 0 | 0 |
| FORMULA 3 | 1 | 0 | 0 |

FIGURE 8e

|  | L | j | g |
|---|---|---|---|
| FORMULA 1 | 0 | 1 | 0 |
| FORMULA 2 | -9 | 0 | 2 |
| FORMULA 3 | 0 | 2 | 0 |

FIGURE 8f

|  | L | j | g |
|---|---|---|---|
| FORMULA 1 | 0 | 0 | 2 |
| FORMULA 2 | 0 | 0 | 1 |
| FORMULA 3 | -2 | 2 | 0 |

FIGURE 8g j Chart - Upper Left Section

| | | | | | L = 6<br>j = 1<br>g >-1, <1 | | | | |
|---|---|---|---|---|---|---|---|---|---|
| | | | | L = 6<br>j = 0<br>g >-1, <2 | L = 5<br>j = 1<br>g >-4, <4 | L = 5<br>j = 2<br>g >-4, <4 | L = 5<br>j = 3<br>g >-3, <3 | | |
| | | | L = 5<br>j = -1<br>g >-3, <3 | L = 5<br>j = 0<br>g >-4, <4 | L = 5<br>j = 1<br>g >-4, <4 | L = 4<br>j = 2<br>g >-5, <5 | L = 4<br>j = 3<br>g >-5, <5 | | |
| | | L = 5<br>j = -2<br>g >-1, <3 | L = 4<br>j = -1<br>g >-5, <5 | L = 4<br>j = 0<br>g >-5, <5 | L = 4<br>j = 1<br>g >-5, <5 | L = 4<br>j = 2<br>g >-5, <5 | L = 4<br>j = 3<br>g >-5, <5 | | |
| | | L = 4<br>j = -2<br>g >-4, <4 | L = 3<br>j = -1<br>g >-7, <6 | L = 3<br>j = 0<br>g >-7, <6 | L = 3<br>j = 1<br>g >-7, <6 | L = 3<br>j = 2<br>g >-7, <6 | L = 3<br>j = 3<br>g >-7, <6 | | |
| | L = 4<br>j = -3<br>g >-2, <4 | L = 3<br>j = -2<br>g >-6, <5 | L = 2<br>j = -1<br>g >-8, <6 | L = 2<br>j = 0<br>g >-8, <7 | L = 2<br>j = 1<br>g >-8, <7 | L = 2<br>j = 2<br>g >-9, <7 | L = 2<br>j = 3<br>g >-9, <6 | | |
| | L = 3<br>j = -3<br>g >-4, <5 | L = 2<br>j = -2<br>g >-7, <6 | L = 1<br>j = -1<br>g >-8, <6 | L = 1<br>j = 0<br>g >-9, <7 | L = 1<br>j = 1<br>g >-9, <7 | L = 1<br>j = 2<br>g >-9, <7 | L = 1<br>j = 3<br>g >-10, <7 | | |
| L = 3<br>j = -4<br>g >-2, <5 | L = 2<br>j = -3<br>g >-6, <6 | L = 1<br>j = -2<br>g >-8, <6 | L = 0<br>j = -1<br>g >-8, <7 | L = 0<br>j = 0<br>g >-9, <7 | L = 0<br>j = 1<br>g >-9, <7 | L = 0<br>j = 2<br>g >-10, <7 | L = 0<br>j = 3<br>g >-10, <7 | | |
| L = 2<br>j = -4<br>g >-2, <5 | L = 1<br>j = -3<br>g >-6, <6 | L = 0<br>j = -2<br>g >-8, <6 | | | | | | | |
| L = 1<br>j = -4<br>g >-4, <6 | L = 0<br>j = -3<br>g >-7, <6 | | | | | | | | |
| L = 2<br>j = -5<br>g >-1, <5 | L = 1<br>j = -4<br>g >-4, <6 | L = 0<br>j = -4<br>g >-5, <6 | | | | | | | |
| L = 1<br>j = -5<br>g >-2, <5 | L = 0<br>j = -5<br>g >-3, <5 | | | | | | | | |
| L = 1<br>j = -6<br>g >1, <5 | L = 0<br>j = -6<br>g >-1, <5 | | | | | | | | |

FIGURE 9a j Chart - Lower Left Section

| | | | | | | | | | |
|---|---|---|---|---|---|---|---|---|---|
| L=-1<br>j=3<br>g>-10,<7 | L=-1<br>j=2<br>g>-10,<7 | L=-1<br>j=1<br>g>-10,<7 | L=-1<br>j=0<br>g>-9,<7 | L=-1<br>j=-1<br>g>-8,<7 | L=-1<br>j=-2<br>g>-8,<6 | L=-1<br>j=-3<br>g>-7,<6 | L=-1<br>j=-4<br>g>-4,<5 | L=-1<br>j=-5<br>g>-3,<5 | L=-1<br>j=-6<br>g>-1,<5 |
| L=-2<br>j=3<br>g>-11,<6 | L=-2<br>j=2<br>g>-11,<7 | L=-2<br>j=1<br>g>-11,<7 | L=-2<br>j=0<br>g>-11,<7 | L=-2<br>j=-1<br>g>-9,<7 | L=-2<br>j=-2<br>g>-9,<7 | L=-2<br>j=-3<br>g>-6,<5 | L=-2<br>j=-4<br>g>-4,<5 | L=-2<br>j=-5<br>g>-3,<5 | L=-2<br>j=-6<br>g>-1,<5 |
| L=-3<br>j=3<br>g>-10,<6 | L=-3<br>j=2<br>g>-10,<6 | L=-3<br>j=1<br>g>-10,<6 | L=-3<br>j=0<br>g>-9,<6 | L=-3<br>j=-1<br>g>-8,<6 | L=-3<br>j=-2<br>g>-7,<6 | L=-3<br>j=-3<br>g>-6,<6 | L=-3<br>j=-4<br>g>-4,<5 | L=-3<br>j=-5<br>g>-2,<4 | L=-3<br>j=-6<br>g>-1,<4 |
| L=-4<br>j=3<br>g>-9,<5 | L=-4<br>j=2<br>g>-9,<5 | L=-4<br>j=1<br>g>-8,<5 | L=-4<br>j=0<br>g>-7,<5 | L=-4<br>j=-1<br>g>-7,<5 | L=-4<br>j=-2<br>g>-5,<5 | L=-4<br>j=-3<br>g>-3,<5 | L=-4<br>j=-4<br>g>-3,<5 | L=-4<br>j=-5<br>g>-2,<3 | |
| L=-5<br>j=3<br>g>-10,<4 | L=-5<br>j=2<br>g>-8,<4 | L=-5<br>j=1<br>g>-8,<4 | L=-5<br>j=0<br>g>-7,<4 | L=-5<br>j=-1<br>g>-6,<4 | L=-5<br>j=-2<br>g>-5,<4 | L=-5<br>j=-3<br>g>-4,<4 | L=-5<br>j=-4<br>g>-3,<5 | | |
| | L=-6<br>j=2<br>g>-7,<3 | L=-6<br>j=1<br>g>-7,<3 | L=-6<br>j=0<br>g>-7,<3 | L=-6<br>j=-1<br>g>-5,<3 | L=-6<br>j=-2<br>g>-5,<3 | L=-6<br>j=-3<br>g>-3,<3 | | | |
| | | L=-7<br>j=1<br>g>-2,<2 | L=-7<br>j=0<br>g>-2,<2 | L=-7<br>j=-1<br>g>-2,<2 | L=-7<br>j=-2<br>g>-2,<2 | L=-7<br>j=-3<br>g>-2,<2 | | | |

FIGURE 9b j Chart - Upper Right Section

| L=5 | L=4 | L=3 | L=2 | L=1 | L=0 | | |
|---|---|---|---|---|---|---|---|
| | L=4<br>j=11<br>g >-2,<1 | L=4<br>j=12<br>g >-1,<1 | | | | | |
| | L=4<br>j=11<br>g >-2,<1 | L=3<br>j=11<br>g >-4,<2 | | | | | |
| | L=4<br>j=10<br>g >-3,<2 | L=3<br>j=10<br>g >-4,<2 | L=2<br>j=10<br>g >-7,<3 | | | | |
| L=5<br>j=9<br>g >-1,<1 | L=4<br>j=9<br>g >-3,<3 | L=3<br>j=9<br>g >-6,<4 | L=2<br>j=9<br>g >-7,<4 | L=1<br>j=9<br>g >-8,<4 | | | |
| L=5<br>j=8<br>g >-2,<2 | L=4<br>j=8<br>g >-3,<3 | L=3<br>j=8<br>g >-6,<4 | L=2<br>j=8<br>g >-7,<5 | L=1<br>j=8<br>g >-8,<5 | L=0<br>j=8<br>g >-9,<5 | | |
| L=5<br>j=7<br>g >-2,<2 | L=4<br>j=7<br>g >-4,<3 | L=3<br>j=7<br>g >-6,<5 | L=2<br>j=7<br>g >-7,<5 | L=1<br>j=7<br>g >-8,<6 | L=0<br>j=7<br>g >-9,<5 | | |
| L=5<br>j=6<br>g >-2,<2 | L=4<br>j=6<br>g >-5,<4 | L=3<br>j=6<br>g >-6,<5 | L=2<br>j=6<br>g >-8,<6 | L=1<br>j=6<br>g >-8,<6 | L=0<br>j=6<br>g >-10,<6 | | |
| L=5<br>j=5<br>g >-3,<3 | L=4<br>j=5<br>g >-5,<4 | L=3<br>j=5<br>g >-6,<5 | L=2<br>j=5<br>g >-8,<6 | L=1<br>j=5<br>g >-9,<6 | L=0<br>j=5<br>g >-10,<6 | | |
| L=5<br>j=4<br>g >-3,<3 | L=4<br>j=4<br>g >-5,<5 | L=3<br>j=4<br>g >-7,<5 | L=2<br>j=4<br>g >-8,<6 | L=1<br>j=4<br>g >-9,<7 | L=0<br>j=4<br>g >-10,<7 | | |

FIGURE 9c j Chart - Lower Right Section

| L = -1<br>j = 4<br>g >-10, <6 | L = -1<br>j = 5<br>g >-10, <6 | L = -1<br>j = 6<br>g >-10, <6 | L = -1<br>j = 7<br>g >-10, <6 | | |
|---|---|---|---|---|---|
| L = -2<br>j = 4<br>g >-11, <6 | L = -2<br>j = 5<br>g >-11, <6 | L = -2<br>j = 6<br>g >-11, <5 | | | |
| L = -3<br>j = 4<br>g >-9, <6 | L = -3<br>j = 5<br>g >-8, <6 | | | | |
| L = -4<br>j = 4<br>g >-9, <5 | | | | | |
| | | | | | |
| | | | | | |
| | | | | | |

FIGURE 9d g Chart - Upper Left Section

| g \ L | L = 5 | L = 4 | L = 3 | L = 2 | L = 1 | L = 0 |
|---|---|---|---|---|---|---|
| g = -1 | j > -2, < 9 | j > -4, < 12 | j > -5, < 12 | j > -5, < 11 | j > -6, < 10 | j > -6, < 9 |
| g = -2 | j > -2, < 6 | j > -3, < 11 | j > -4, < 12 | j > -4, < 11 | j > -5, < 10 | j > -6, < 9 |
| g = -3 | j > -1, < 3 | j > -3, < 8 | j > -4, < 12 | j > -4, < 11 | j > -5, < 10 | j > -5, < 9 |
| g = -4 | | j > -2, < 7 | j > -3, < 10 | j > -4, < 11 | j > -4, < 10 | j > -5, < 9 |
| g = -5 | | | j > -3, < 10 | j > -4, < 11 | j > -4, < 10 | j > -4, < 9 |
| g = -6 | | | j > -2, < 5 | j > -3, < 10 | j > -3, < 9 | j > -4, < 9 |
| g = -7 | | | | j > -2, < 7 | j > -3, < 10 | j > -3, < 9 |
| g = -8 | | | | j > 1, < 5 | j > 0, < 6 | j > -1, < 9 |
| g = -9 | | | | | j > 2, < 4 | j > 1, < 7 |

FIGURE 10a g Chart - Lower Left Section

| L = -1<br>g = -1<br>j >-6, <8 | L = -1<br>g = -2<br>j >-6, <8 | L = -1<br>g = -3<br>j >-5, <8 | L = -1<br>g = -4<br>j >-4, <8 | L = -1<br>g = -5<br>j >-4, <8 | L = -1<br>g = -6<br>j >-4, <8 | L = -1<br>g = -7<br>j >-3, <8 | L = -1<br>g = -8<br>j >-1, <8 | L = -1<br>g = -9<br>j > 0, <8 |
| --- | --- | --- | --- | --- | --- | --- | --- | --- |
| L = -2<br>g = -1<br>j >-6, <7 | L = -2<br>g = -2<br>j >-6, <7 | L = -2<br>g = -3<br>j >-5, <7 | L = -2<br>g = -4<br>j >-4, <7 | L = -2<br>g = -5<br>j >-4, <7 | L = -2<br>g = -6<br>j >-3, <7 | L = -2<br>g = -7<br>j >-3, <7 | L = -2<br>g = -8<br>j >-3, <7 | L = -2<br>g = -9<br>j >-1, <7 |
| L = -3<br>g = -1<br>j >-6, <6 | L = -3<br>g = -2<br>j >-5, <6 | L = -3<br>g = -3<br>j >-5, <6 | L = -3<br>g = -4<br>j >-4, <6 | L = -3<br>g = -5<br>j >-4, <6 | L = -3<br>g = -6<br>j >-3, <6 | L = -3<br>g = -7<br>j >-2, <6 | L = -3<br>g = -8<br>j >-1, <5 | L = -3<br>g = -9<br>j >0, <4 |
| L = -4<br>g = -1<br>j >-6, <5 | L = -4<br>g = -2<br>j >-5, <5 | L = -4<br>g = -3<br>j >-4, <5 | L = -4<br>g = -4<br>j >-3, <5 | L = -4<br>g = -5<br>j >-2, <5 | L = -4<br>g = -6<br>j >-1, <4 | L = -4<br>g = -7<br>j >0, <5 | L = -4<br>g = -8<br>j >1, <5 | L = -4<br>g = -9<br>j >2, <4 |
| L = -5<br>g = -1<br>j >-6, <4 | L = -5<br>g = -2<br>j >-5, <4 | L = -5<br>g = -3<br>j >-4, <4 | L = -5<br>g = -4<br>j >-3, <4 | L = -5<br>g = -5<br>j >-2, <4 | L = -5<br>g = -6<br>j >-1, <3 | L = -5<br>g = -7<br>j >0, <4 | L = -5<br>g = -8<br>j >1, <4 | L = -5<br>g = -9<br>j >2, <4 |
| L = -6<br>g = -1<br>j >-6, <3 | L = -6<br>g = -2<br>j >-5, <3 | L = -6<br>g = -3<br>j >-3, <3 | L = -6<br>g = -4<br>j >-3, <3 | L = -6<br>g = -5<br>j >-1, <3 | L = -6<br>g = -6<br>j >-1, <3 | | | |
| L = -7<br>g = -1<br>j >-4, <2 | | | | | | | | |
| | | | | | | | | L = -2<br>g = -10<br>j >-1, <7 |

FIGURE 10b g Chart - Upper Right Section

| | | | | | | | |
|---|---|---|---|---|---|---|---|
| | | | | | | | |
| | | | | | | | |
| | | | | | | | |
| | | | | | | L = 2<br>g = 6<br>j >-1, <3 | L = 1<br>g = 6<br>j >-2, <5 | L = 0<br>g = 6<br>j >-2, <5 |
| | | | | L = 3<br>g = 5<br>j >-2, <4 | L = 2<br>g = 5<br>j >-3, <7 | L = 1<br>g = 5<br>j >-5, <8 | L = 0<br>g = 5<br>j >-5, <6 |
| | | | L = 4<br>g = 4<br>j >-2, <5 | L = 3<br>g = 4<br>j >-4, <8 | L = 2<br>g = 4<br>j >-6, <9 | L = 1<br>g = 4<br>j >-7, <9 | L = 0<br>g = 4<br>j >-7, <9 |
| | | L = 5<br>g = 3<br>j >-1, <3 | L = 4<br>g = 3<br>j >-4, <7 | L = 3<br>g = 3<br>j >-5, <10 | L = 2<br>g = 3<br>j >-6, <9 | L = 1<br>g = 3<br>j >-7, <10 | L = 0<br>g = 3<br>j >-7, <9 |
| | | L = 5<br>g = 2<br>j >-3, <6 | L = 4<br>g = 2<br>j >-4, <10 | L = 3<br>g = 2<br>j >-5, <10 | L = 2<br>g = 2<br>j >-6, <11 | L = 1<br>g = 2<br>j >-7, <10 | L = 0<br>g = 2<br>j >-7, <9 |
| | L = 6<br>g = 1<br>j >-1, <1 | L = 5<br>g = 1<br>j >-3, <9 | L = 4<br>g = 1<br>j >-4, <11 | L = 3<br>g = 1<br>j >-5, <12 | L = 2<br>g = 1<br>j >-6, <11 | L = 1<br>g = 1<br>j >-6, <10 | L = 0<br>g = 1<br>j >-7, <9 |
| L = 6<br>g = 0<br>j >-1, <3 | L = 5<br>g = 0<br>j >-3, <10 | L = 4<br>g = 0<br>j >-4, <13 | L = 3<br>g = 0<br>j >-5, <12 | L = 2<br>g = 0<br>j >-6, <11 | L = 1<br>g = 0<br>j >-6, <10 | L = 0<br>g = 0<br>j >-7, <9 | |

FIGURE 10c g Chart - Lower Right Section

| | | | | | | | |
|---|---|---|---|---|---|---|---|
| | | | | | | | |
| | | | | | | | |
| | | | | L = -1<br>g = 6<br>j >-2, <4 | L = -2<br>g= 6<br>j >-3, <4 | | |
| | | | L = -1<br>g = 5<br>j >-4, <8 | L = -2<br>g = 5<br>j >-3,<6 | L = -3<br>g = 5<br>j >-4, <6 | | |
| | | L = -1<br>g = 4<br>j >-7, <8 | L = -2<br>g = 4<br>j >-7,<7 | L = -3<br>g = 4<br>j >-5, <6 | L = -4<br>g = 4<br>j >-5, <5 | | |
| | L = -1<br>g = 3<br>j >-7, <8 | L = -2<br>g = 3<br>j >-7,<7 | L = -3<br>g = 3<br>j >-7, <6 | L = -4<br>g = 3<br>j >-6, <5 | L = -5<br>g = 3<br>j >-6,<4 | | |
| | L = -1<br>g = 2<br>j >-7, <8 | L = -2<br>g = 2<br>j >-7,<7 | L = -3<br>g = 2<br>j >-7, <6 | L = -4<br>g = 2<br>j >-6, <5 | L = -5<br>g = 2<br>j >-6, <4 | L = -6<br>g = 2<br>j >-5 <3 | |
| | L = -1<br>g = 1<br>j >-7,<8 | L = -2<br>g = 1<br>j >-7 <7 | L = -3<br>g = 1<br>j >-7, <6 | L = -4<br>g = 1<br>j >-6, <5 | L = -5<br>g = 1<br>j >-6, <4 | L = -6<br>g = 1<br>j >-5, <3 | L = -7<br>g = 1<br>j >-4, <2 |
| L = -1<br>g = 0<br>j >-7, <8 | L = -2<br>g = 0<br>j >-7, <7 | L = -3<br>g = 0<br>j >-7, <6 | L = -4<br>g = 0<br>j >-6, <5 | L = -5<br>g = 0<br>j >-6, <4 | L = -6<br>g = 0<br>j >-5, <3 | L = -7<br>g = 0<br>j >-4, <2 | |

FIGURE 10d

L Chart - Upper Left Section

| g = 6 | g = 5 | g = 4 | g = 3 | g = 2 | g = 1 | g = 0 | g = −1 |
|---|---|---|---|---|---|---|---|
| g = 6, j = 3, L > −2, <2 | g = 5, j = 3, L > −4, <4 | g = 4, j = 3, L > −5, <5 | g = 3, j = 3, L > −6, <5 | g = 2, j = 3, L > −6, <6 | g = 1, j = 3, L > −6, <6 | g = 0, j = 3, L > −6, <6 | g = −1, j = 3, L > −6, <6 |
| g = 6, j = 2, L > −3, <3 | g = 5, j = 2, L > −4, <4 | g = 4, j = 2, L > −5, <5 | g = 3, j = 2, L > −6, <6 | g = 2, j = 2, L > −7, <6 | g = 1, j = 2, L > −7, <6 | g = 0, j = 2, L > −7, <7 | g = −1, j = 2, L > −7, <6 |
| g = 6, j = 1, L > −3, <3 | g = 5, j = 1, L > −4, <5 | g = 4, j = 1, L > −5, <6 | g = 3, j = 1, L > −6, <6 | g = 2, j = 1, L > −7, <6 | g = 1, j = 1, L > −8, <6 | g = 0, j = 1, L > −8, <6 | g = −1, j = 1, L > −8, <6 |
| g = 6, j = 0, L > −3, <3 | g = 5, j = 0, L > −4, <5 | g = 4, j = 0, L > −5, <6 | g = 3, j = 0, L > −5, <6 | g = 2, j = 0, L > −7, <7 | g = 1, j = 0, L > −8, <7 | g = 0, j = 0, L > −8, <7 | g = −1, j = 0, L > −8, <6 |
| g = 6, j = −1, L > −2, <2 | g = 5, j = −1, L > −4, <5 | g = 4, j = −1, L > −5, <5 | g = 3, j = −1, L > −6, <5 | g = 2, j = −1, L > −7, <6 | g = 1, j = −1, L > −8, <6 | g = 0, j = −1, L > −8, <6 | g = −1, j = −1, L > −8, <6 |
| g = 6, j = −2, L > −3, <1 | g = 5, j = −2, L > −4, <3 | g = 4, j = −2, L > −5, <4 | g = 3, j = −2, L > −6, <5 | g = 2, j = −2, L > −7, <6 | g = 1, j = −2, L > −8, <6 | g = 0, j = −2, L > −8, <6 | g = −1, j = −2, L > −8, <5 |
|  | g = 5, j = −3, L > −4, <2 | g = 4, j = −3, L > −5, <4 | g = 3, j = −3, L > −6, <5 | g = 2, j = −3, L > −7, <5 | g = 1, j = −3, L > −8, <5 | g = 0, j = −3, L > −8, <5 | g = −1, j = −3, L > −8, <5 |
|  | g = 5, j = −4, L > −1, <2 | g = 4, j = −4, L > −5, <3 | g = 3, j = −4, L > −6, <4 | g = 2, j = −4, L > −7, <4 | g = 1, j = −4, L > −7, <4 | g = 0, j = −4, L > −7, <4 | g = −1, j = −4, L > −7, <4 |
|  |  | g = 4, j = −5, L > −3, <3 | g = 3, j = −5, L > −6, <3 | g = 2, j = −5, L > −6, <3 | g = 1, j = −5, L > −6, <3 | g = 0, j = −5, L > −6, <3 | g = −1, j = −5, L > −6, <2 |
|  |  | g = 4, j = −6, L > −3, <2 | g = 3, j = −6, L > −4, <2 | g = 2, j = −6, L > −4, <2 | g = 1, j = −6, L > −4, <1 | g = 0, j = −6, L > −4, <1 |  |

FIGURE 11a

L Chart - Lower Left Section

| j \ g | g=-2 | g=-3 | g=-4 | g=-5 | g=-6 | g=-7 | g=-8 | g=-9 | g=-10 |
|---|---|---|---|---|---|---|---|---|---|
| j=3 | L > -6, < 6 | L > -6, < 5 | L > -6, < 5 | L > -6, < 4 | L > -6, < 4 | L > -6, < 3 | L > -6, < 3 | L > -6, < 2 | L > -3, < -1 |
| j=2 | L > -7, < 6 | L > -7, < 6 | L > -7, < 5 | L > -7, < 4 | L > -7, < 4 | L > -6, < 3 | L > -5, < 3 | L > -4, < 1 | L > -3, < -1 |
| j=1 | L > -7, < 6 | L > -7, < 6 | L > -7, < 5 | L > -7, < 5 | L > -7, < 4 | L > -6, < 3 | L > -4, < 2 | L > -4, < 0 | L > -3, < -1 |
| j=0 | L > -7, < 6 | L > -7, < 6 | L > -7, < 5 | L > -7, < 4 | L > -7, < 4 | L > -4, < 3 | L > -4, < 0 | L > -3, < -1 | L > -3, < -1 |
| j=-1 | L > -7, < 6 | L > -7, < 5 | L > -7, < 5 | L > -6, < 4 | L > -5, < 4 | L > -4, < 3 | L > -3, < -1 | | |
| j=-2 | L > -7, < 5 | L > -7, < 5 | L > -7, < 4 | L > -4, < 4 | L > -4, < 3 | L > -3, < 2 | L > -3, < -1 | | |
| j=-3 | L > -7, < 4 | L > -6, < 4 | L > -4, < 2 | L > -4, < 3 | L > -2, < 1 | | | | |
| j=-4 | L > -7, < 2 | L > -4, < 2 | L > -1, < 1 | L > -1, < 0 | | | | | |
| j=-5 | L > -1, < 1 | | | | | | | | |

FIGURE 11b

L Chart - Upper Right Section

| | | | | | | | | |
|---|---|---|---|---|---|---|---|---|
| | | | | | | | g = 0<br>j = 12<br>L > 3, <5 | |
| | | | | | | g = 1<br>j = 11<br>L > 2, <4 | g = 0<br>j = 11<br>L > 2, <5 | g = -1<br>j = 11<br>L > 2, <5 |
| | | | | | g = 2<br>j = 10<br>L > 1, <3 | g = 1<br>j = 10<br>L > 1, <5 | g = 0<br>j = 10<br>L > 1, <5 | g = -1<br>j = 10<br>L > 1, <5 |
| | | | | g = 3<br>j = 9<br>L > 0, <4 | g = 2<br>j = 9<br>L > 0, <5 | g = 1<br>j = 9<br>L > 0, <5 | g = 0<br>j = 9<br>L > 0, <6 | g = -1<br>j = 9<br>L > 0, <5 |
| | | | g = 4<br>j = 8<br>L > -1, <3 | g = 3<br>j = 8<br>L > -1, <4 | g = 2<br>j = 8<br>L > -1, <5 | g = 1<br>j = 8<br>L > -1, <6 | g = 0<br>j = 8<br>L > -1, <6 | g = -1<br>j = 8<br>L > -1, <6 |
| | | g = 5<br>j = 7<br>L > -2, <2 | g = 4<br>j = 7<br>L > -2, <4 | g = 3<br>j = 7<br>L > -2, <4 | g = 2<br>j = 7<br>L > -2, <5 | g = 1<br>j = 7<br>L > -2, <6 | g = 0<br>j = 7<br>L > -2, <6 | g = -1<br>j = 7<br>L > -2, <6 |
| | g = 5<br>j = 6<br>L > -2, <3 | g = 4<br>j = 6<br>L > -3, <4 | g = 3<br>j = 6<br>L > -3, <5 | g = 2<br>j = 6<br>L > -3, <5 | g = 1<br>j = 6<br>L > -3, <6 | g = 0<br>j = 6<br>L > -3, <6 | g = -1<br>j = 6<br>L > -3, <6 | |
| | g = 5<br>j = 5<br>L > -4, <3 | g = 4<br>j = 5<br>L > -4, <4 | g = 3<br>j = 5<br>L > -4, <5 | g = 2<br>j = 5<br>L > -4, <5 | g = 1<br>j = 5<br>L > -4, <6 | g = 0<br>j = 5<br>L > -4, <6 | g = -1<br>j = 5<br>L > -4, <6 | |
| g = 6<br>j = 4<br>L > -1, <2 | g = 5<br>j = 4<br>L > -5, <5 | g = 4<br>j = 4<br>L > -5, <5 | g = 3<br>j = 4<br>L > -5, <5 | g = 2<br>j = 4<br>L > -5, <6 | g = 1<br>j = 4<br>L > -5, <6 | g = 0<br>j = 4<br>L > -5, <6 | g = -1<br>j = 4<br>L > -5, <6 | |

FIGURE 11c

L Chart - Lower Right Section

| | | | | | | | |
|---|---|---|---|---|---|---|---|
| | | | | | | | |
| | | | | | | | |
| | | | | g = -2<br>j = 11<br>L > 1, <4 | g = -3<br>j = 11<br>L > 2, <4 | | |
| | | | g = -2<br>j = 10<br>L > 1, <5 | g = -3<br>j = 10<br>L > 1, <4 | g = -4<br>j = 10<br>L > 1, <3 | g = -5<br>j = 10<br>L > 1, <3 | g = -6<br>j = 10<br>L > 1, <3 |
| | | g = -2<br>j = 9<br>L > 0, <5 | g = -3<br>j = 9<br>L > 0, <4 | g = -4<br>j = 9<br>L > 0, <4 | g = -5<br>j = 9<br>L > 0, <3 | g = -6<br>j = 9<br>L > 0, <2 | g = -7<br>j = 9<br>L > 0, <2 |
| | | g = -2<br>j = 8<br>L > -1, <5 | g = -3<br>j = 8<br>L > -1, <4 | g = -4<br>j = 8<br>L > -1, <4 | g = -5<br>j = 8<br>L > -1, <3 | g = -6<br>j = 8<br>L > -1, <2 | g = -7<br>j = 8<br>L > -1, <1 | g = -8<br>j = 8<br>L > -1, <1 |
| | g = -2<br>j = 7<br>L > -2, <5 | g = -3<br>j = 7<br>L > -2, <5 | g = -4<br>j = 7<br>L > -2, <4 | g = -5<br>j = 7<br>L > -2, <3 | g = -6<br>j = 7<br>L > -2, <2 | g = -7<br>j = 7<br>L > -2, <1 | g = -8<br>j = 7<br>L > -2, <1 | g = -9<br>j = 7<br>L > -2 <0 |
| g = -2<br>j = 6<br>L > -3, <5 | g = -3<br>j = 6<br>L > -3, <5 | g = -4<br>j = 6<br>L > -3, <5 | g = -5<br>j = 6<br>L > -3, <4 | g = -6<br>j = 6<br>L > -3, <3 | g = -7<br>j = 6<br>L > -3, <3 | g = -8<br>j = 6<br>L > -3, <1 | g = -9<br>j = 6<br>L > -3 <1 | g = -10<br>j = 6<br>L > -3 <-1 |
| g = -2<br>j = 5<br>L > -4, <6 | g = -3<br>j = 5<br>L > -4, <5 | g = -4<br>j = 5<br>L > -4, <5 | g = -5<br>j = 5<br>L > -4, <4 | g = -6<br>j = 5<br>L > -4, <3 | g = -7<br>j = 5<br>L > -4, <3 | g = -8<br>j = 5<br>L > -4, <1 | g = -9<br>j = 5<br>L > -3 <1 | g = -10<br>j = 5<br>L > -3 <-1 |
| g = -2<br>j = 4<br>L > -5, <6 | g = -3<br>j = 4<br>L > -5, <5 | g = -4<br>j = 4<br>L > -5, <5 | g = -5<br>j = 4<br>L > -5, <4 | g = -6<br>j = 4<br>L > -5, <4 | g = -7<br>j = 4<br>L > -5, <3 | g = -8<br>j = 4<br>L > -5, <2 | g = -9<br>j = 4<br>L > -3 <1 | g = -10<br>j = 4<br>L > -3, <-1 |

FIGURE 11d

METHOD FOR GENERATING NUMEROUS HARMONIOUS COLOR PALETTES FROM TWO COLORS

This application relates to Disclosure Document #424543 submitted Sep. 30, 1997.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to the creation of numerous planes within a uniform three dimensional (3D) space in which individual points are located by three coordinates. Specifically, when the points represent the units of some entity and when the location of two units in this uniform space are known, this invention generates a large number of two-dimensional planes, each of which include the two units and all other units that fall on that plane. Each plane in a set of planes derived from a particular pair of units is defined by a unique formula. Each unit on a plane is defined by its location in the solid, while its position relative to other points on the plane is preserved. This method is especially useful when the units have characteristics dependent on their location within the solid since the invention displays, organizes and manipulates the planes and individual units based on their location.

This arrangement is exemplified by existing color systems in which all reproducible colors are spaced at a perceptually uniform distance from one another. The location of each color also defines its lightness, its hue and its saturation. This invention applied to a uniform color solid generates numerous planes based on two colors selected and entered by the user. In this embodiment each plane in a set of planes represents a palette of colors and is defined by an equation. Some 40 to 200 palettes are generated and since the relationships between colors is preserved on the planes, each plane contains harmonious colors unique to that plane, in addition to colors on the axis defined by the two colors entered by the user. From the equations that define each plane, the invention derives the notation for all colors located on that plane. The notation specifies both that color's location in the color space and its appearance.

If the invention is applied instead to units in some other type of uniform 3D space, the principles above apply. Planes will contain an orderly array of related units and the units on each plane will be identified by their position in the solid and the qualities inherent in its organization.

2. Description of the Prior Art

A prior color selection system is disclosed by Beretta, U.S. Pat. No. 5,254,978, entitled "Reference Color Selection System." The system provides a reference file of colorimetrically measured typical object colors in arbitrary groups and the interface allows the user to retrieve these colors as part of a color palette and to view and modify them. Other objects can be measured and entered in the reference file by the user and all colors in the reference files can be mixed to form other colors. Unlike the present invention, the Beretta palettes must be put together by the user and, although it is possible to create any color, the Beretta system does not systematically explore all color space. The present invention generates harmonious palettes from every region of color space and the user selects the one most suitable for a particular project.

Another disclosure by Beretta in "Functional Color Selection System," U.S. Pat. No. 5,311,212, has the user choose a key color after which colors can be selected that are analogous to, or complementary to, the key color. The user may also select lightness and chroma variations of the color key. The color theories on which this system is based, while useful in some cases, limits the user to adding colors that are either similar to, or strongly contrasting with, the key color. From any one point in color space only limited areas of total color space can be used. Furthermore, the colors considered to be complements are dictated by the arrangement of colors in the 'uniform' color space on which the system is based. Although several color spaces are referred to as uniform, they are not identical so use of a different color space will result in somewhat different complements. In this Beretta system also palettes must be assembled by the user.

The Bauersfeld Master Thesis "ColorPalette: A Knowledge-Based System to Select Colors for a Palette" describes a system based on "principles of human computer interface design and color theory." This system includes an "advisory" system based on general concepts about which colors should be used together. The user can place colors that are provided with the system in a palette and add new colors to the palette, as long as the advisory system finds the relationship among the colors is acceptable. This limits the user to the colors that others, without any knowledge of the particular project, have decided are suitable. The placement and relative sizes of colors in an arrangement can completely change their apparent color and relationship to one another; therefore, it is not possible for any system, or expert, to foresee what colors are suitable for a certain situation. The present invention gives the user with a choice among palettes from all regions of color space, allows the user to select one or more, and then to alter the placement and relative size of individual colors in the palette to verify that they are suitable for the current project.

Barbara Meier in "ACE: A Color Expert System for User Interface Design" discloses another system based on color rules. ACE uses a table to encode relations between the object colors of standard items found in Apple Macintosh desktop environments, such as screen background, windows, icons. dialog boxes, cursors and menus. If it is necessary to introduce other object colors, the user selects and enters "properties that describe the item's physical and functional characteristics . . . " To do this ACE asks questions about objects and their relationships and users select answers from menus. This system addresses one problem inherent in Bauersfeld system by taking into consideration the size, placement and surround of objects before assigning them a color based on a set of rules. While this may work reasonably well in the restricted environment of a display screen, it is not applicable to most of the situations for which colors are needed. For the user, even in a controlled environment, the system is restrictive and complicated. Once the environment is expanded the questions and answers, and number of rules, would multiple exponentially.

The Bauersfeld and Meier systems are based on generalized rules that, while they may be of help to beginners in a simple environment, are not flexible enough for real world situations and would eliminate the unusual color combinations that are the trademark of outstanding design in any field.

There are several disclosures that provide a way to select or create individual colors. These colors can be put into palettes by the user, but these methods do not provide palettes representing all areas of color space nor is the user given any assistance in creating the palettes. Taylor, et. al., disclose in "Display-Based Color System," U.S. Pat. No. 4,985,853, a method for spacing and arranging the colors that embody a uniform CIE $L^*, u^*, v^*$ color space from among the colors achievable on a color display device. Individual colors can be selected from this uniform color space, just as colors can be chosen from the current Apple Color Picker on the Macintosh computer. The advantage of the Taylor system is that it is based on an internationally accepted and reasonably uniform color space and the colors are displayed in vertical hue planes. This arrangement allows the user to view each hue surrounded by variations of that hue in lightness and saturation. The system indicates on the plane which colors can be reproduced on the monitor and which can be printed by a specific printer. It does not deal with palettes of colors.

Searby, et. al, disclose in "Computerized graphics system and method using an electronically synthesized palette," U.S. Pat. No. 4,524,421, a method whereby the user can select a color and modify it by combining it in a mixing area with another preexisting color. In "Image retouching," U.S. Pat. No. 4,794,382, Lai, et al, disclose a method whereby the user selects a color from a list of preexisting colors after which a range of colors centered on the selected color are displayed. The user can select from this range to modify the original color.

Gabor in "Apparatus and method for color selection," U.S. Pat. No. 5,103,407, discloses a similar method for modifying a color. Bergstedt in "apparatus and method for modifying displayed color images," U.S. Pat. No. 4,694,286, discloses a method of modifying a color through use of a color menu and color modification keys. Braudaway in "Method for selecting colors," U.S. Pat. No. 4,907,075, discloses a method whereby a color is selected from an image based on how frequently it occurs in the image. Subsequent colors are chosen based on the frequency of their occurrence and similarity to previously selected colors. These methods allow a user to select individual colors, but do not address groups of colors.

SUMMARY OF THE INVENTION

Although it is possible to apply this invention to any uniform three dimensional space and it is especially useful when location in the solid also defines other qualities; this disclosure describes the invention as it applies to a uniform color solid in which colors are arranged by three perceptual qualities. This embodiment details deriving the equations that define each plane that passes through an axis formed by two known colors, and then using the equations to derive notations for individual colors on each plane.

In addition to a uniform three-dimensional color space and a notational system that locates color in that space, it is also necessary that Commission Internationale de Léclairage (CIE) notations, expressed in X, Y, Z primaries, or chromaticity coordinates (Y, x, y), or CIELAB notations ($L^*, a^*, b^*$), be published for the aim points for color samples that embody the color system. The international CIE system of color notation is device independent and serves as a way to convert between color systems based on differing concepts, or between differing imaging systems.

At present these two criteria are fulfilled by the Munsell Color system, the Optical Society of America's Uniform Color Scales (OSA-UCS), the Natural Color System, Colorcurve and the CIELAB system. Planes from within these three-dimensional color systems will always contain harmonious groups of colors since the natural perceptual relationship between the colors on a plane is preserved. The colors that lie on one of these two-dimensional planes are referred to here as color palettes, since they offer the user groups of coordinated colors.

While this method could be applied to the color systems listed above, and any other color system that satisfies the criteria, use of this invention in conjunction with the OSA-UCS color system will produce the greatest number of colors on the largest number of planes because the color samples embodying the OSA-UCS system are placed at the nodes of a cuboctahedral lattice. A diagram of the cuboctahedral unit at the center of the OSA-UCS color solid is illustrated in FIG. 1. This unit is repeated to form a three-dimensional color solid that includes all achievable colors. In this arrangement colors are equally spaced from twelve nearest neighbors, a stringent test for uniformity that also provides a closest packing array of colors. Therefore, the OSA-UCS color system is used to implement a preferred embodiment of this invention that will be described below.

The colors on each of the color planes generated by this form of the invention are designated in OSA-UCS color notations. The notation for an individual OSA-UCS color consists of three numbers. One number represents the color's lightness, +L for the lighter colors, –L for darker colors; a second number represents its yellowness, +j, or blueness, –j; and a third number represents its greenness, +g, or redness, –g. These OSA-UCS aim points are also defined in CIE notations.

In a first simplified embodiment the equations and notations can be calculated using a computer spreadsheet such as Excel. Then the notations for each color on a given plane can be used in conjunction with a set of painted OSA-UCS color samples to display the palettes generated by this invention; or the color notations can be converted into CIE or RGB notations to be sent to a printing system capable of reproducing colors from one of these types of notation. However, it is most convenient to display the numerous color palettes that the method will produce on a color monitor before selecting a palette. Therefore, the preferred embodiment of the invention is implemented in computer software that displays between 40 and 200 color palettes derived from a pair of colors on a color monitor or video device. Since the notations for individual colors can be converted to and from CIE or RGB notations, colors defined by these notations can be entered into the equations provided in trhe invention, displayed and manipulated, and then either the whole palette of colors, or individual colors, can be reproduced by a suitable printer, or exported as a PICT file for use in other computer or video applications. Individual colors within a palette can be moved, resized, rearranged and pasted into graphic applications to be incorporated into art work.

The detailed description of the method given below can be used just to derive the notations for the colors on each palette, or can serve as a guide in writing the software necessary to display them on a color computer monitor. Source code for a software application written for a Macintosh computer is included in Appendix A. This software will derive the color planes, display them on a monitor, allow the user to choose among the numerous palettes, to rearrange and resize the colors on that palette, and then either export the colors to another graphic application or print them. In this embodiment the invention will have maximum utility for anyone who selects groups of colors.

Since users often must include already existing colors in their color scheme, or want to use certain colors; and also because generating palettes from two colors results in a large, but practical number of palettes, the user begins the method by entering two colors into an existing computer application that can handle formulas or into a box on the first screen in the software application given in Appendix A. Colors can be entered in the application by several convenient methods. Any third color the user needs will be found on one of the planes this invention generates. An advantage in using two colors to generate the palettes is that, in almost all cases, small variations in the third or fourth color are not important; so the user has a choice among several palettes that contain approximations of the desired additional color(s). If desired, a section can be added to the method making it possible for the user to enter three colors and obtain one plane, or to enter four colors and in most cases obtain a plane, which will usually be curved. However, these last two options limit the user's choices and are less preferred.

From the two colors this invention generates approximately 40 to 200 palettes, depending on the particular pair of colors entered. These palettes cover all colors achievable in a specific media. The user can select the gamut that fits the desired display or reproduction device.

The three digit notation for a color, which represents the amounts of L, j and g that comprise that color, can be treated as a formula, i.e., the color notation 4, 3, 1 is $4L+3j+g=1$. Therefore:

$$(L_1+j_1+g_1=1)-(L_2+j_2+g_2=1)=L_3+j_3+g_3=0$$

Set L to 0: $0L_3+j_3+g_3=0$, or $j_3=-g_3$
Substituting back into one of the two original formulas:
$j_1{}^*g_3+g_1{}^*j_3=a_1$
Repeat, setting j to 0 and then g to 0 to obtain: $L_1{}^*g_3+g_1{}^*L_3=a_2$ and $L_1{}^*j_3+j_1{}^*L_3=a_3$ This process results in three formulas each of which represent a plane in OSA-UCS space that includes the two colors entered by the user. These primary planes can then be added together or subtracted from one another to create a series of planes that each contain the first pair of colors and all other colors unique to that plane.

The number of planes is controlled by the gamut of achievable colors and the angle in color space of an axis running between the original colors. The method eliminates duplicate planes and planes that do not contain a significant number of additional colors. All formulas are reduced by their greatest common divisor. Formulas are written so L is either zero or a positive number.

After all planes are generated, they are arranged by the ratio of j to g or g to j, and occasionally by the ratio of L to j or L to g. This puts the planes in order by hue, so they move in an orderly fashion through color space. In the cases where g is not zero, the ratio j/g is used and the individual colors are placed on a j Chart where L is plotted vertically and J is plotted horizontally. In cases where g is zero, the ratio g/j is used and colors are plotted on a g Chart with L vertical and g horizontal. In those cases where j and g are zero or when colors that differ widely would be placed next to one another in both a j and a g chart, colors are determined by L/j or L/g and the colors are plotted on an L chart with g vertical and j horizontal.

The computer software must be able to convert OSA-UCS notation to and from CIE notations, and also to and from the RGB notations necessary to display colors on a color monitor and to print on a RGB, CYM or CYMK printer.

As described above color planes are arranged by their hue relationship; however, the palettes can be arranged by the degrees of separation between the planes since they rotate around an axis running through the original pair of colors. This alternate arrangement is less pleasing visually because, although nearest neighbor planes are displayed next to one another, a plane may lie at an angle such that it includes individual colors that are quite different from those on the next plane.

If the alternate degree method is chosen, the formulas that are used to derive the colors on each plane are created in the same manner as described above, reduced by a common devisor, and sorted to eliminate duplicates. Then one of the first three formulas, the one defining the vertical plane, is chosen as the first plane. Colors are derived for that plane and also for another plane using the method described above. Three colors that do not fall in a straight line are selected from the vertical plane and from the second plane. These six colors are used to obtain vectors for the two planes. From the two vectors the degrees (or radians) between the two planes are calculated. This would be repeated, finding the degrees between the vertical plane and each of the other planes. The planes can then be sorted by the number of degrees from the vertical plane.

This invention will be useful to anyone who uses groups of colors, examples being professional designers, graphic artists, decorators, housewives, people making charts or posters, or companies selecting colors for a product.

BRIEF DESCRIPTION OF THE DRAWINGS

FIG. 8a is a schematic diagram of the method for deriving the first three formulas from the notations for the two colors entered by the user. FIG. 8b is a diagram showing the result of following the directions in FIG. 8a when the user enters two colors that differ only in lightness. FIG. 8c is a diagram showing the result of following the instructions in FIG. 8a when the colors entered by the user differ only in yellowness. FIG. 8d is a diagram showing the result of following the instructions in FIG. 8a when the two colors entered by the user differ only in greenness. FIG. 8e is a diagram showing the result of following the instructions in FIG. 8a when the colors entered by the user have the same lightness, but differ in the other two attributes. FIG. 8f is a diagram showing the result of following the instructions in FIG. 8a when the colors entered by the user have the same blue content but differ in the other two attributes. FIG. 8g is a diagram showing the result of following the instructions in FIG. 8a when the colors entered by the user have the same green content but differ in the other two attributes.

FIG. 9 is a schematic diagram of the arrangement of individual colors on a j Chart showing a gamut of colors achievable in paint or printing.

FIG. 10 is a schematic diagram of the arrangement of individual colors on a g Chart showing a gamut of colors achievable in paint or printing.

FIG. 11 is a schematic diagram of the arrangement of individual colors on an L Chart showing a gamut of colors achievable in paint or printing.

DETAILED DESCRIPTION OF THE PREFERRED EMBODIMENT

Figure 1:
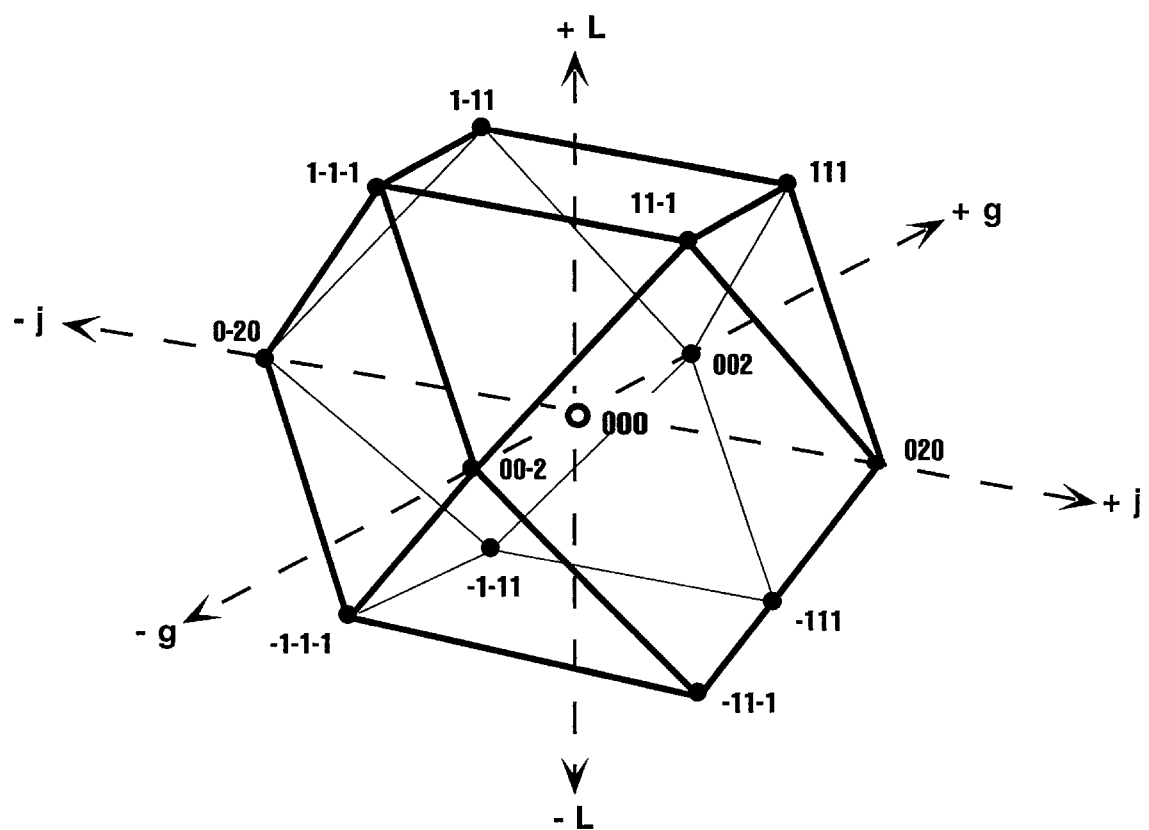
FIG. 1 is a diagram of the cuboctahedral unit that is repeated to form the internal structure of the OSA-UCS color solid. A color sample is located at each node of the unit.

1. Starting with two known points this invention can derive all planes that pass through an axis formed by those points, and all points on those planes, in any reasonably uniform three-dimensional space; however, use of the invention with a particular color system, the Optical Society of America's Uniform Color Scales (OSA-UCS), which meets the criteria listed below, is described here. The cuboctahedral unit with a color placed at each node, that repeats to fill the OSA-UCS space is shown in FIG. 1.

Figure 2:
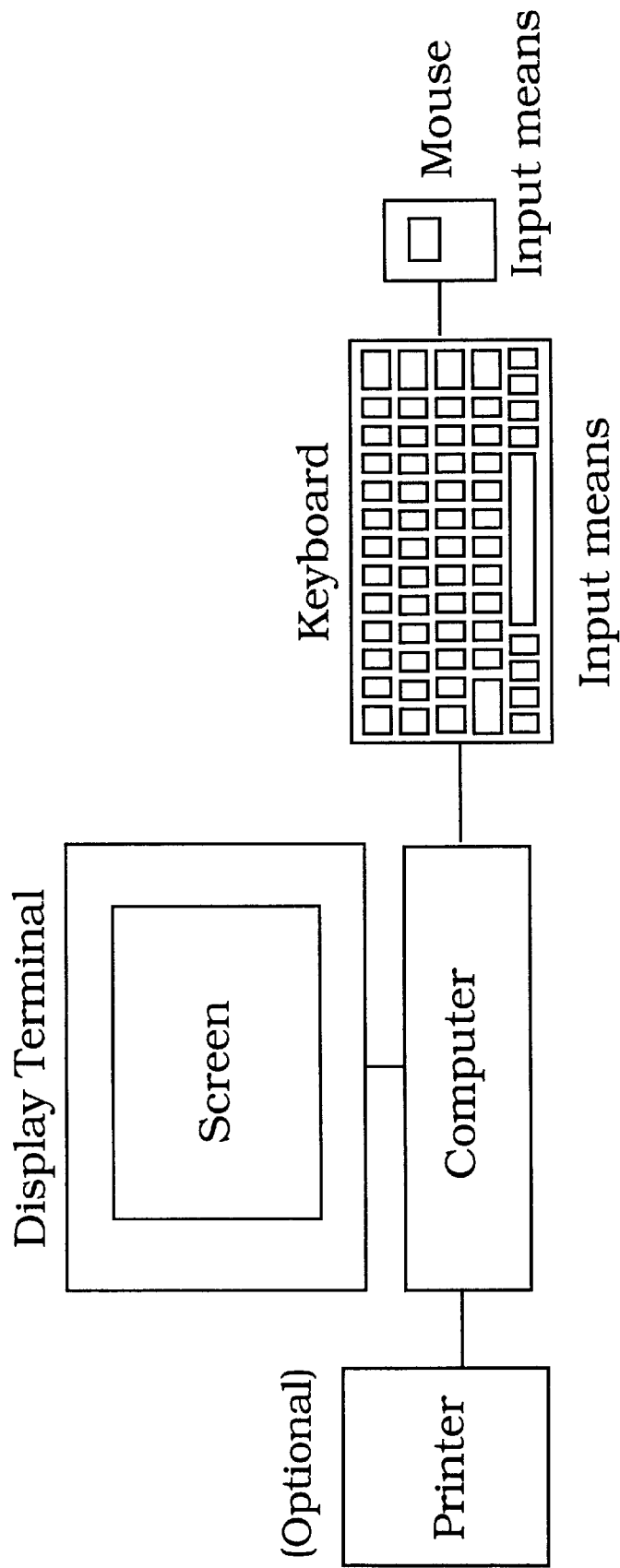
FIG. 2 is a block schematic diagram of a computer system suitable for displaying the color palettes generated by this invention in text form only, or preferably as a color display.

If it is only necessary to derive the notations for OSA-UCS colors on each plane, or palette, a monochromatic computer system is sufficient. However, the preferred embodiment of this invention requires a computer system such as in FIG. 2 that is capable of displaying a large range of colors. Either embodiment requires use of a uniform color space that can be represented in the notational system based on the Chromaticity Diagram developed by the Commission Internationale de Léclairage (CIE). The Uniform Color Scales developed by the Optical Society of America (OSA-UCS) is selected for description from among suitable color spaces since its use results in the greatest number of colors on the largest number of color planes. In the following embodiment of the invention, the spacing of colors and internal calculations are based on the OSA-UCS color system. Translation into the CIE system makes it possible to import and export color information from this invention to other computer software and to devices for color reproduction.

An excellent description of the CIE system is found in "Principles of Color Technology" by Fred W. Billmeyer and Max Saltzman. Use of the CIE system is also described in the American Society for Testing and Materials (ASTM) E 308, *Standard Practice for Computing the Colors of Objects by Using the CIE System*. This standard will be found in ASTM Book of Standards, Vol.6.01.

The foundation for the OSA-UCS is given in the articles "Uniform color scales," by David L. MacAdam and published in the Journal of the Optical Society of America, Vol. 64, pages 1691–1702 (1974), and "Colorimetric data for samples of OSA uniform color scales," by the same author and published in the Journal of the Optical Society of America, Vol. 68, pages 121–130 (1978). The system is also described in ASTM E 1360, Standard Practice for Specifying Color by Using the Optical Society of America Uniform Color Scales System, published in the ASTM Book of Standards, Vol. 06.01.

The description that follows assumes use of the OSA-UCS system and a color display system capable of displaying millions of colors since everything necessary to use this invention on a simpler computer system is covered also. To use software embodying this invention, the user decides on two colors to be used in a color scheme. This allows the maximum flexibility in searching three-dimensional color space for the color combination most suitable for the specific job. The program then returns from 40 to 200 palettes, depending on the original two colors, all of which include those two colors and the other colors that appear on that plane in color space. Each of these palettes will contain unique colors, with the exception of the original pair and any colors lying on the axis connecting them. The color planes are generated to move systematically through color space, allowing the user to explore the whole color solid, limited only by the gamut of colors attainable in the particular form of color reproduction desired.

The generated planes contain differing numbers of colors depending on the spacing between achievable colors at that angle, some planes may contain only one or two new colors in addition to the line of colors that include the two entered colors. The user can choose whether to display these small palettes by setting a number in the Preferences pop-up menu found under Edit.

Figure 3:
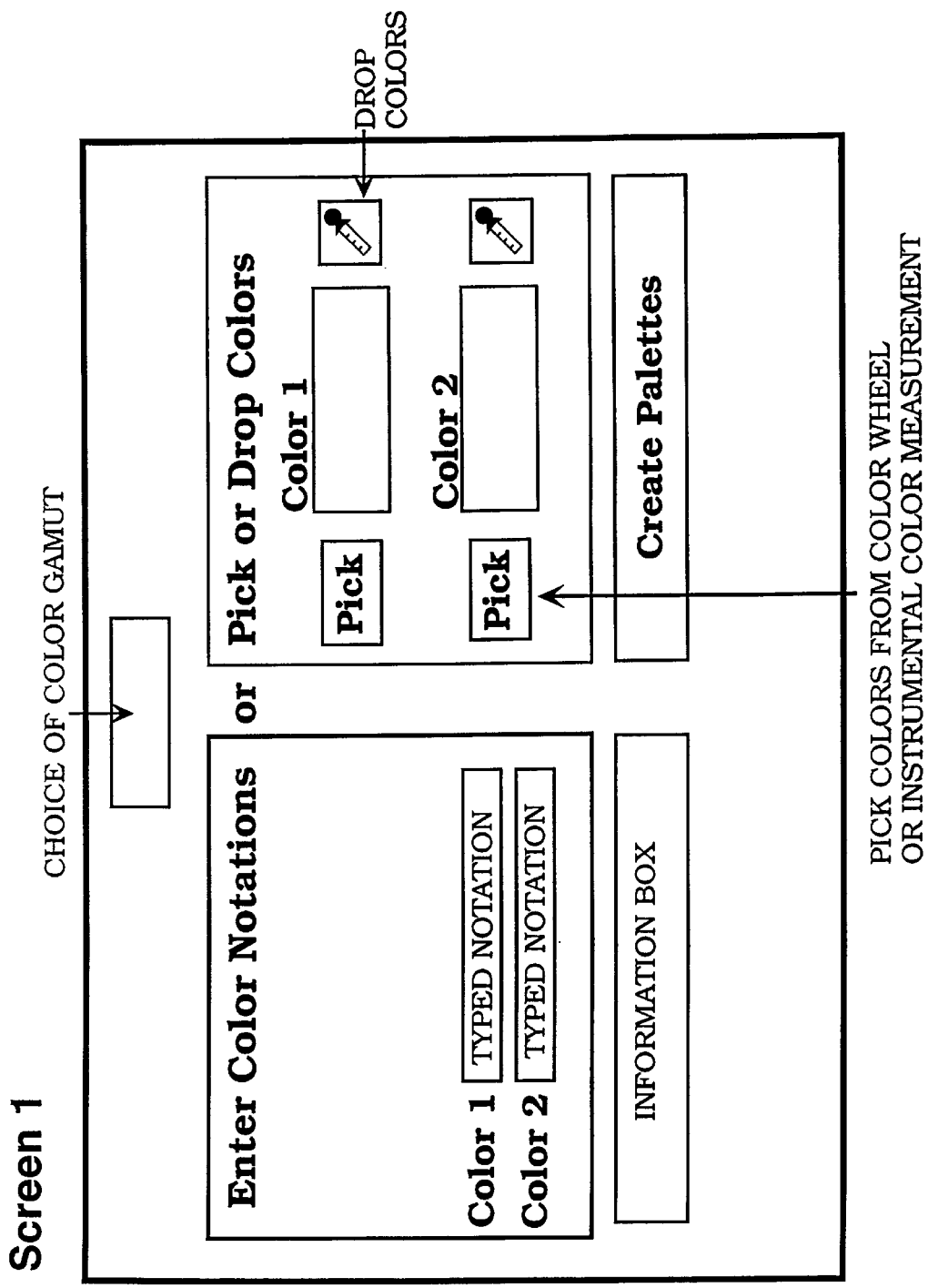
FIG. 3 is a schematic diagram of the first screen on the display device in which the two colors selected by the user are entered.

The user enters the two colors on the first monitor screen following the title screen using one of the six methods described below:

(1) The OSA-UCS notation defining a color can be typed into one of two boxes labeled "Color 1" and "Color 2" and labeled as 2 in FIG. 3. This option can be used by individuals who have the set of OSA-UCS color samples marketed by the Optical Society of America. They can select two colors from the color samples and enter their OSA-UCS notations in the boxes. OSA-UCS notations can also be estimated by viewing a color sample under a full spectrum light source having the same color temperature as the monitor being viewed, and adjusting the color on the monitor using the OSA-UCS notations until it appears to match the color sample. The two entered colors appear in the boxes labeled 6 in FIG. 3.

(2) The user can measure color samples, or colored objects, with a spectrophotometer, colorimeter or a color scanner capable of transmitting color data to the computer. The measured data is placed in this invention by selecting one of the "Pick" buttons labeled as 4 on FIG. 3. The data can be entered in either CIE or RGB notations. The colors appear in the boxes labeled 6 in FIG. 3.

(3) The "Pick" buttons can also be used to reach the Apple Color Picker on a Macintosh computer, or similar color software on another type of computer. The user creates the two colors with the Color Picker. The colors appear in the areas labeled 6 in FIG. 3.

(4) The user can directly type in CIE or RGB notations into any software that accepts these notations. When the user selects "Enter" or "OK" in these applications the colors appear in the areas labeled as 6 in FIG. 3.

(5) The user can select one of the eyedropper icons on the first screen, labeled as 5 in FIG. 3, and then pick up colors from the computer desk top or any computer application that displays colors. The colors appear in the boxes labeled 6 in FIG. 3.

(6) The user can select two colors from one of a group of provided color libraries, such as Pantone or Trumatch and they will appear in the boxes labeled as 6 in FIG. 3.

Figure 4:
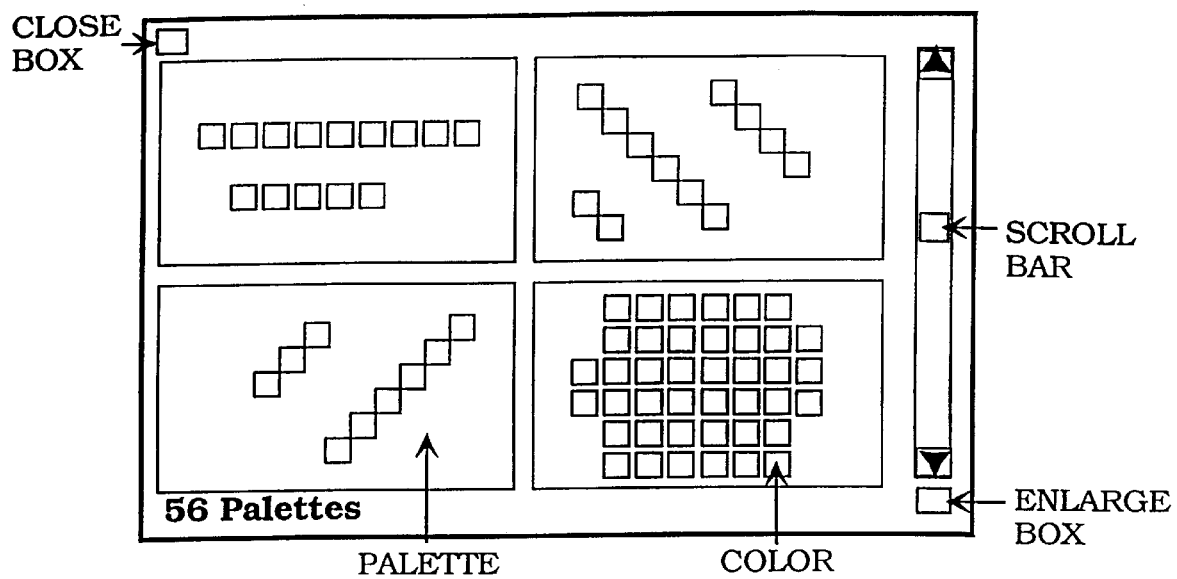
FIG. 4 is a schematic diagram of the second screen on the display device through which a reduced version of the numerous palettes can be scrolled.

Once the two colors are entered in the boxes labeled as 6, the user selects the box titled "Create Palettes" shown as 7 in FIG. 3 and a second screen appears. This screen is shown in FIG. 4. It can be scrolled to display thumbnail versions of 40 to 200 different groups of colors. Each of these planes, or palettes of colors, include the two colors entered in the first screen plus additional unique colors that harmonize with them. The individual colors on each palette are arranged in various patterns, as indicated by examples in FIG. 4. These patterns represent the placement of colors on one of three types of charts, i.e., a j Chart, a g Chart or a L Chart, depending on the formula used to generate that plane. The two colors entered by the user are outlined on each palette. The amount of space between a pair of colors on a chart indicates the amount of color difference between the colors.

Figure 5:
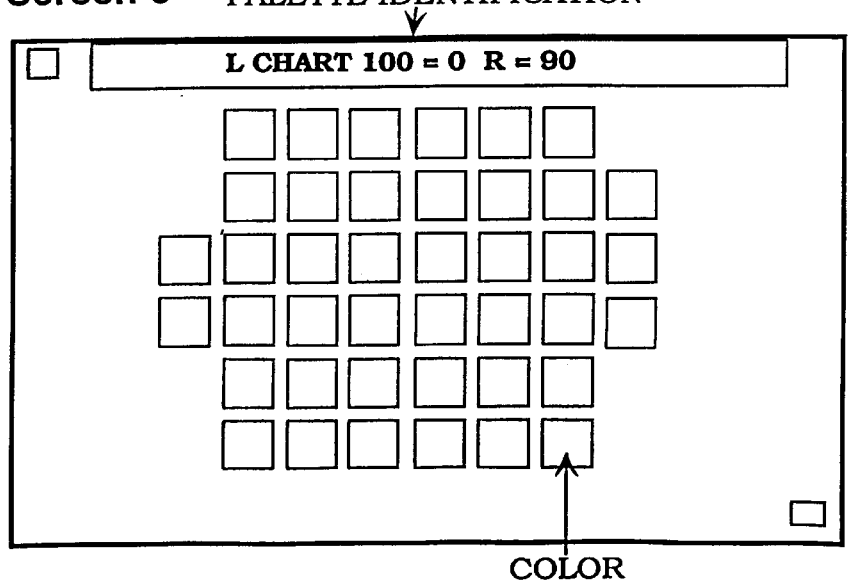
FIG. 5 is a schematic diagram of the third screen of the display, which displays a single enlarged color palette.
Figure 6:
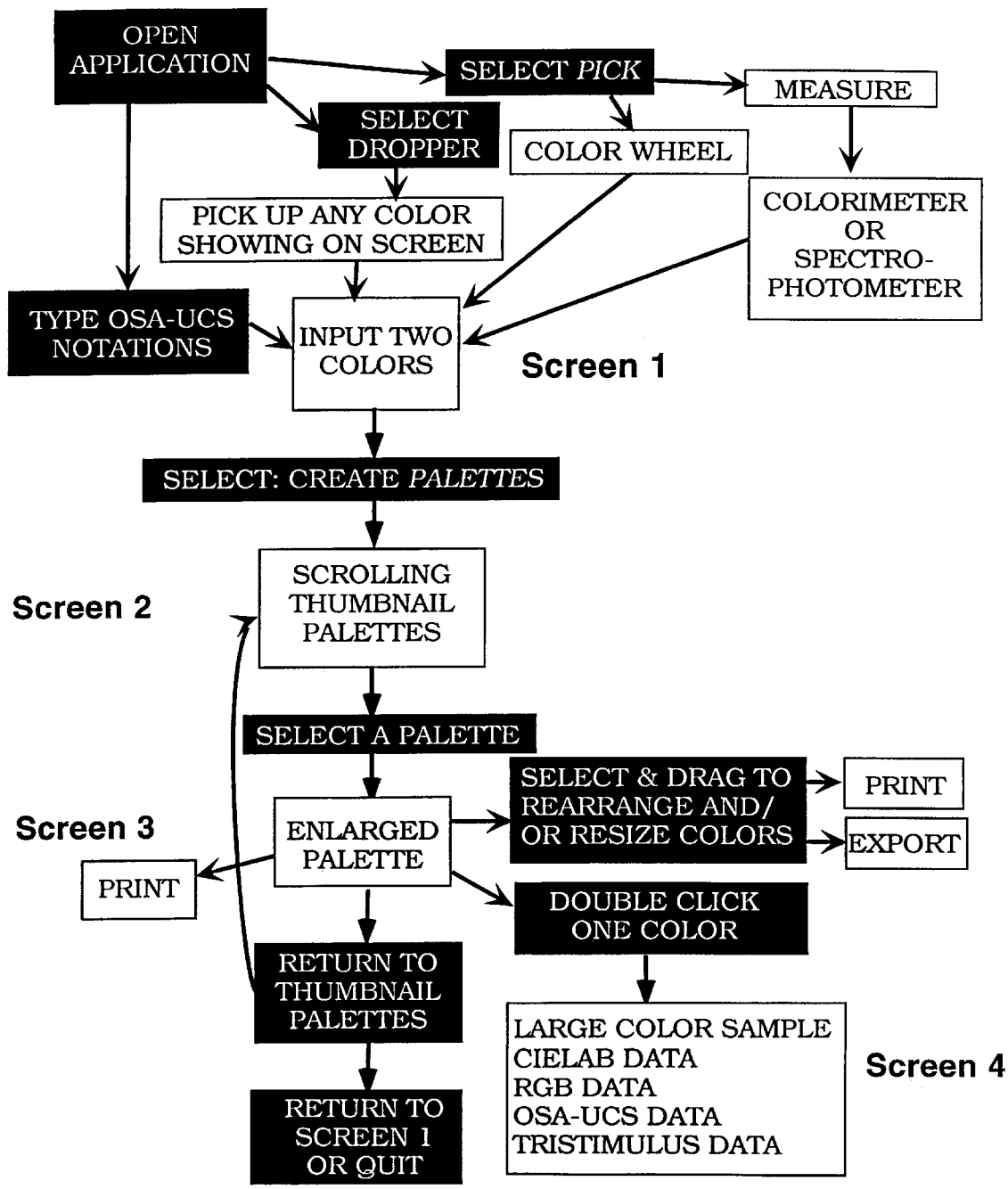
FIG. 6 is a flow chart illustrating the actions of the user and response of this invention in the preferred embodiment as computer software.

After entering two colors and viewing the thumbnail palettes, the user selects a palette and it appears enlarged on the third screen, as shown in FIG. 5. The user can select individual colors on the palette, move them, resize them, or place one color behind another. Each color can be copied and pasted into another application, or the whole palette can be saved as a PICT file and opened in another application. The user can also select a color and open a fourth screen, which shows an enlarged view of the color and lists its OSA-UCS, CIELAB, and R,G,B notations, its luminous reflectance and chromaticity coordinates and its r, g, b percentages. FIG. 6 is a flow diagram showing how the user interacts with the software application. The actions taken by the user are shown in black boxes.

In the OSA-UCS color system each color has three digits. The first, L, indicates how light or dark (value) the color is in a scale from −7, the darkest colors to 6, the lightest colors. The second digit, j, indicates how much yellowness (positive numbers) or how much blueness (negative numbers), the color contains. The third digit, g, indicates how much greenness (positive numbers) or how much redness (negative numbers) the color contains. For instance 5L, 5j, 4g (5, 5, 4) is a light yellow-green; −4L, 5j, −4g (−4, 5, −4) is a dark yellow-red; 0L, −5j, 4g (0, −5, 4) is a middle value blue-green; 0L, −5j, −4g (0, −5, −4) is a middle value red-blue. Notations are entered in the application as 5, 5, 4 and −4, 5, −4.

In addition to the fact that individual colors have a L, j, g notation. There are two types of formulas that employ L, j and g notations, i.e., ones used to manipulate data and ones that define each color plane (or palette of colors). The color plane formulas, which are derived from the user's two colors, have an L, a j, a g and an answer, so they will be indicated by $L_F$, $j_F$, $g_F$ and $ans_F$.

The following instructions and formulas are given in a form that can be entered in a computer speadsheet such as Microsoft Excel that uses formulas to perform calculations. This same set of instructions can be used as a guide in writing computer software. Source code for the software diagramed in FIG. 5 is included as Appendix A following this description.

2. Deriving the First Set of Formulas a. The digits of one of the users' entered colors is subtracted from the digits of the second color. The two colors 3, 4, 4 and 2, 2, −5 can also be written 3L, 4j, 4g and 2L, 2j, −5g and for the purpose of calculation are considered as 3L+4j+4g=1 and 2L+2j−5g=1. Then (3L+4j+4g=1)−(2L+2j−5g=1) is L+2j+9g=0. The L in this formula is set to 0 and the resulting equation solved: 2j+9g=0, or 2j=−9g. This defines the relationship between j and g when L=0, so that relationship can be used to derive a formula that will fit both colors. The j and g digits in the first color are multiplied by this relationship: 4j(−9g)+4g(2j)=−36+8=−28. So −9j+2g=−28, or multiplying by −1, 9j−2g=28. The first formula is $9j_F - 2g_F = 28$.

Proof: (9*4)−(2*4)=36−8=28 and (9*2)−(2*−5)=18+10=28

By the same process, set j to 0, 1L+9g=0, or L=−9g, multiply by the first color, 3L(−9g)+4g(L)=−27+4=−23, by multiplying by −1, the second formula that fits both colors is $9L_F - g_F = 23$.

Proof: (9*3)−(4*1)=27−4=23 and (9*2)−(1*−5)=18+5=23

For the third formula, set g to 0. 1L+2j=0, or, L=−2j, multiply by first color, 3L(−2j)+4j(1L)=−6+4=−2. So −2L+j=−2, or, 2L−j=2.

Proof: (2*3)−(4*1)=6−4=2 and (2*2)−(1*2)=4−2=2

The following are the formulas employed to find these three formulas. The j of the first color is noted as $j_1$ and the j of the second color is $j_2$, etc.:

Formula 1:

$L_F$: L=0

$j_F$: If $j_1=j_2$, put 1, otherwise put $g_2-g_1$ $g_F$: If $j_1=j_2$, put 0, otherwise put $j_1-j_2$ $ans_F$: If $j_1=j_2$, put $j_1$, otherwise put $j_1{}^*(g_2-g_1)+g_1{}^*(j_1-j_2)$ Formula 2:

$L_{2F}$: If $g_1=g_2$, put 0, otherwise put $g_2-g_1$ $j_{2F}$: j=0

$g_{2F}$: If $g_1=g_2$, put 1, otherwise put $L_1-L_2$ $ans_{2F}$: If $g_1=g_2$, put $g_1$, otherwise put $L_1{}^*(g_2-g_1)+g_1{}^*(L_1-L_2)$ Formula 3:

$L_{3F}$: If $L_1=L_2$, put 1, otherwise put $j_2-j_1$ $j_{3F}$: If $L_1=L_2$, put 0, otherwise put $L_1-L_2$ $g_{3F}$: g=0

$ans_{3F}$: If $L_1=L_2$, put $L_1$, otherwise put $L_1{}^*(j_2-j_1)+j_1{}^*(L_1-L_2)$ These three formulas are combined to generate an array of formulas that also satisfy the two original colors. Example: Add Formula 1 and Formula 2 above to create Formula 4, add Formula 2 to Formula 4 to create Formula 5, add Formula 2 to Formula 5 to create Formula 6, add Formula 2 to Formula 6 to create Formula 7, add Formula 2 to Formula 7 to create Formula 8, add Formula 2 to Formula 8 to create Formula 9, add Formula 2 to Formula 9 to create Formula 10.

| | | |
|---|---|---|
| a. $L_{4F} = L_F + L_{2F}$ | $L_{5F} = L_{4F} + L_{2F}$ | $L_{6F} = L_{5F} + L_{2F}$ |
| $j_{4F} = j_F + j_{2F}$ | $j_{5F} = j_{4F} + j_{2F}$ | $j_{6F} = j_{5F} + j_{2F}$ |
| $g_{4F} = g_F + g_{2F}$ | $g_{5F} = g_{4F} + g_{2F}$ | $g_{6F} = g_{5F} + g_{2F}$ |
| $ans_{4F} = ans_F + ans_{2F}$ | $ans_{5F} = ans_{4F} + ans_{2F}$ | $ans_{6F} = ans_{5F} + ans_{2F}$ |
| Repeat to $L_{10F}, j_{10F}, g_{10F}, ans_{10F}$ | | |

Note—Check Section 3 at this point because it may be preferred to do the process described there as these formulas are created, or after they have all been generated.

b. This process is duplicated by adding Formula 1 to Formula 4 (Formula 1+2) and continuing to add Formula 1 to the result each time to create another 10 formulas.

| | | |
|---|---|---|
| $L_{11F} = L_{4F} + L_F$ | $L_{12F} = L_{11F} + L_F$ | $L_{13F} = L_{12F} + L_F$ |
| $j_{11F} = j_{4F} + j_F$ | $j_{12F} = j_{11F} + j_F$ | $j_{13F} = j_{12F} + j_F$ |
| $g_{11F} = g_{4F} + g_F$ | $g_{12F} = g_{11F} + g_F$ | $g_{13F} = g_{12F} + g_F$ |
| $ans_{11F} = ans_{4F} + ans_F$ | $ans_{12F} = ans_{11F} + ans_F$ | $ans_{13F} = ans_{12F} + ans_F$ |
| Repeat to $L_{20F}, j_{20F}, g_{20F}, ans_{20F}$ | | | c. Create 10 more formulas by adding Formula 1 and Formula 3, continuing to add Formula 3 to the result each time.

| | | |
|---|---|---|
| $L_{21F} = L_F + L_{3F}$ | $L_{22F} = L_{21F} + L_{3F}$ | $L_{23F} = L_{22F} + L_{3F}$ |
| $j_{21F} = j_F + j_{3F}$ | $j_{22F} = j_{21F} + j_{3F}$ | $j_{23F} = j_{22F} + j_{3F}$ |
| $g_{21F} = g_F + g_{3F}$ | $g_{22F} = g_{21F} + g_{3F}$ | $g_{23F} = g_{22F} + g_{3F}$ |
| $ans_{21F} = ans_F + ans_{3F}$ | $ans_{22F} = ans_{21F} + ans_{3F}$ | $ans_{23F} = ans_{22F} + ans_{3F}$ |
| Repeat to $L_{30F}, j_{30F}, g_{30F}, ans_{30F}$ | | | d. Add Formula 1 repeatively to Formula 21 (Formula 1+3) to create another 10 formulas.

| | | |
|---|---|---|
| $L_{31F} = L_{21F} + L_F$ | $L_{32F} = L_{31F} + L_F$ | $L_{33F} = L_{32F} + L_F$ |
| $j_{31F} = j_{21F} + j_F$ | $j_{32F} = j_{31F} + j_F$ | $j_{33F} = j_{32F} + j_F$ |
| $g_{31F} = g_{21F} + g_F$ | $g_{32F} = g_{31F} + g_F$ | $g_{33F} = g_{32F} + g_F$ |
| $ans_{31F} = ans_{21F} + ans_F$ | $ans_{32F} = ans_{31F} + ans_F$ | $ans_{33F} = ans_{32F} + ans_F$ |
| Repeat to $L_{40F}, j_{40F}, g_{40F}, ans_{40F}$ | | | e. Add Formula 3 repeatedly to Formula 2 to create another 10 formulas.

| | | |
|---|---|---|
| $L_{41F} = L_{2F} + L_{3F}$ | $L_{42F} = L_{41F} + L_{3F}$ | $L_{43F} = L_{42F} + L_{3F}$ |
| $j_{41F} = j_{2F} + j_{3F}$ | $j_{42F} = j_{41F} + j_{3F}$ | $j_{43F} = j_{42F} + j_{3F}$ |
| $g_{41F} = g_{2F} + g_{3F}$ | $g_{42F} = g_{41F} + g_{3F}$ | $g_{43F} = g_{42F} + g_{3F}$ |
| $ans_{41F} = ans_{2F} + ans_{3F}$ | $ans_{42F} = ans_{41F} + ans_{3F}$ | $ans_{43F} = ans_{42F} + ans_{3F}$ |
| Repeat to $L_{50F}, j_{50F}, g_{50F}, ans_{50F}$ | | | f. Add Formula 2 repeatedly to Formula 41 (Formula 2+3) to create another 10 formulas.

| | | |
|---|---|---|
| $L_{51F} = L_{41F} + L_{2F}$ | $L_{52F} = L_{51F} + L_{2F}$ | $L_{53F} = L_{52F} + L_{2F}$ |
| $j_{51F} = j_{41F} + j_{2F}$ | $j_{52F} = j_{51F} + j_{2F}$ | $j_{53F} = j_{52F} + j_{2F}$ |
| $g_{51F} = g_{41F} + g_{2F}$ | $g_{52F} = g_{51F} + g_{2F}$ | $g_{53F} = g_{52F} + g_{2F}$ |
| $ans_{51F} = ans_{41F} + ans_{2F}$ | $ans_{52F} = ans_{51F} + ans_{2F}$ | $ans_{53F} = ans_{52F} + ans_{2F}$ |
| Repeat to $L_{60F}, j_{60F}, g_{60F}, ans_{60F}$ | | | g. Subtract Formula 2 from Formula 1 to create 10 formulas.

| | | |
|---|---|---|
| $L_{61F} = L_F - L_{2F}$ | $L_{62F} = L_{61F} - L_{2F}$ | $L_{63F} = L_{62F} - L_{2F}$ |
| $j_{61F} = j_F - j_{2F}$ | $j_{62F} = j_{61F} - j_{2F}$ | $j_{63F} = j_{62F} - j_{2F}$ |
| $g_{61F} = g_F - g_{2F}$ | $g_{62F} = g_{61F} - g_{2F}$ | $g_{63F} = g_{62F} - g_{2F}$ |
| $ans_{61F} = ans_F - ans_{2F}$ | $ans_{62F} = ans_{61F} - ans_{2F}$ | $ans_{63F} = ans_{62F} - ans_{2F}$ |
| Repeat to $L_{70F}, j_{70F}, g_{70F}, ans_{70F}$ | | | h. Subtract Formula 1 from Formula 2 to create 10 formulas.

| | | |
|---|---|---|
| $L_{71F} = L_{2F} - L_F$ | $L_{72F} = L_{71F} - L_F$ | $L_{73F} = L_{72F} - L_F$ |
| $j_{71F} = j_{2F} - j_F$ | $j_{72F} = j_{71F} - j_F$ | $j_{73F} = j_{72F} - j_F$ |
| $g_{71F} = g_{2F} - g_F$ | $g_{72F} = g_{71F} - g_F$ | $g_{73F} = g_{72F} - g_F$ |
| $ans_{71F} = ans_{2F} - ans_F$ | $ans_{72F} = ans_{71F} - ans_F$ | $ans_{73F} = ans_{72F} - ans_F$ |
| Repeat to $L_{80F}, j_{80F}, g_{80F}, ans_{80F}$ | | | i. Subtract Formula 3 from Formula 1 to create 10 formulas.

| | | |
|---|---|---|
| $L_{81F} = L_F - L_{3F}$ | $L_{82F} = L_{81F} - L_{3F}$ | $L_{83F} = L_{82F} - L_{3F}$ |
| $j_{81F} = j_F - j_{3F}$ | $j_{82F} = j_{81F} - j_{3F}$ | $j_{83F} = j_{82F} - j_{3F}$ |
| $g_{81F} = g_F - g_{3F}$ | $g_{82F} = g_{81F} - g_{3F}$ | $g_{83F} = g_{82F} - g_{3F}$ |
| $ans_{81F} = ans_F - ans_{3F}$ | $ans_{82F} = ans_{81F} - ans_{3F}$ | $ans_{83F} = ans_{82F} - ans_{3F}$ |
| Repeat to $L_{90F}, j_{90F}, g_{90F}, ans_{90F}$ | | | j. Subtract Formula 1 from Formula 3 to create 10 formulas.

| | | |
|---|---|---|
| $L_{91F} = L_{3F} - L_F$ | $L_{92F} = L_{91F} - L_F$ | $L_{93F} = L_{92F} - L_F$ |
| $j_{91F} = j_{3F} - j_F$ | $j_{92F} = j_{91F} - j_F$ | $j_{93F} = j_{92F} - j_F$ |
| $g_{91F} = g_{3F} - g_F$ | $g_{92F} = g_{91F} - g_F$ | $g_{93F} = g_{92F} - g_F$ |
| $ans_{91F} = ans_{3F} - ans_F$ | $ans_{92F} = ans_{91F} - ans_F$ | $ans_{93F} = ans_{92F} - ans_F$ |
| Repeat to $L_{100F}, j_{100F}, g_{100F}, ans_{100F}$ | | | k. Subtract Formula 3 from Formula 2 to create 10 formulas.

| | | |
|---|---|---|
| $L_{101F} = L_{2F} - L_{3F}$ | $L_{102F} = L_{101F} - L_{3F}$ | $L_{103F} = L_{102F} - L_{3F}$ |
| $j_{101F} = j_{2F} - j_{3F}$ | $j_{102F} = j_{101F} - j_{3F}$ | $j_{103F} = j_{102F} - j_{3F}$ |
| $g_{101F} = g_{2F} - g_{3F}$ | $g_{102F} = g_{101F} - g_{3F}$ | $g_{103F} = g_{102F} - g_{3F}$ |
| $ans_{101F} = ans_{2F} - ans_{3F}$ | $ans_{102F} = ans_{101F} - ans_{3F}$ | $ans_{103F} = ans_{102F} - ans_{3F}$ |
| Repeat to $L_{110F}, j_{110F}, g_{110F}, ans_{110F}$ | | | l. Subtract Formula 2 from Formula 3 to create 10 formulas.

| | | |
|---|---|---|
| $L_{111F} = L_{3F} - L_{2F}$ | $L_{112F} = L_{111F} - L_{2F}$ | $L_{113F} = L_{112F} - L_{2F}$ |
| $j_{111F} = j_{3F} - j_{2F}$ | $j_{112F} = j_{111F} - j_{2F}$ | $j_{113F} = j_{112F} - j_{2F}$ |
| $g_{111F} = g_{3F} - g_{2F}$ | $g_{112F} = g_{111F} - g_{2F}$ | $g_{113F} = g_{112F} - g_{2F}$ |
| $ans_{111F} = ans_{3F} - ans_{2F}$ | $ans_{112F} = ans_{111F} - ans_{2F}$ | $ans_{113F} = ans_{112F} - ans_{2F}$ |
| Repeat to $L_{120F}, j_{120F}, g_{120F}, ans_{120F}$ | | | m. Add Formula 1 to Formula 2 and subtract Formula 3 repeatedly to create 10 formulas.

| | | |
|---|---|---|
| $L_{121F} = L_F + L_{2F} - L_{3F}$ | $L_{122F} = L_{121F} - L_{3F}$ | $L_{123F} = L_{122F} - L_{3F}$ |
| $j_{121F} = j_F + j_{2F} - j_{3F}$ | $j_{122F} = j_{121F} - j_{3F}$ | $j_{123F} = j_{122F} - j_{3F}$ |
| $g_{121F} = g_F + g_{2F} - g_{3F}$ | $g_{122F} = g_{121F} - g_{3F}$ | $g_{123F} = g_{122F} - g_{3F}$ |

-continued

| | | |
|---|---|---|
| $ans_{121F} = ans_F + L_{2F} - L_{3F}$ | $ans_{122F} = ans_{121F} - L_{3F}$ | $ans_{123F} = ans_{122F} - L_{3F}$ |
| Repeat to $L_{130F}, j_{130F}, g_{130F}, ans_{130F}$ | | | n. Add Formula 1 to Formula 3 and subtract Formula 2 repeatedly to create 10 formulas.

| | | |
|---|---|---|
| $L_{131F} = L_F + L_{3F} - L_{2F}$ | $L_{132F} = L_{131F} - L_{2F}$ | $L_{133F} = L_{132F} - L_{2F}$ |
| $j_{131F} = j_F + j_{3F} - j_{2F}$ | $j_{132F} = j_{131F} - j_{2F}$ | $j_{133F} = j_{132F} - j_{2F}$ |
| $g_{131F} = g_F + g_{3F} - g_{2F}$ | $g_{132F} = g_{131F} - g_{2F}$ | $g_{133F} = g_{132F} - g_{2F}$ |
| $ans_{131F} = ans_F + L_{3F} - L_{2F}$ | $ans_{132F} = ans_{131F} - L_{2F}$ | $ans_{133F} = ans_{132F} - L_{2F}$ |
| Repeat to $L_{140F}, j_{140F}, g_{140F}, ans_{140F}$ | | | o. Add Formula 2 to Formula 3 and subtract Formula 1 repeatedly to create 10 formulas.

| | | |
|---|---|---|
| $L_{141F} = L_{2F} + L_{3F} - L_F$ | $L_{142F} = L_{141F} - L_F$ | $L_{143F} = L_{142F} - L_F$ |
| $j_{141F} = j_{2F} + j_{3F} - j_F$ | $j_{142F} = j_{141F} - j_F$ | $j_{143F} = j_{142F} - j_F$ |
| $g_{141F} = g_{2F} + g_{3F} - g_F$ | $g_{142F} = g_{141F} - g_F$ | $g_{143F} = g_{142F} - g_F$ |
| $ans_{141F} = ans_{2F} + L_{3F} - L_F$ | $ans_{142F} = ans_{141F} - L_F$ | $ans_{143F} = ans_{142F} - L_F$ |
| Repeat to $L_{150F}, j_{150F}, g_{150F}, ans_{150F}$ | | | p. Add Formula 2 to Formula 3 and add Formula 1 repeatedly to create 10 more formulas.

| | | |
|---|---|---|
| $L_{151F} = L_{2F} + L_{3F} + L_F$ | $L_{152F} = L_{151F} + L_F$ | $L_{153F} = L_{152F} + L_F$ |
| $j_{151F} = j_{2F} + j_{3F} + j_F$ | $j_{152F} = j_{151F} + j_F$ | $j_{153F} = j_{152F} + j_F$ |
| $g_{151F} = g_{2F} + g_{3F} + g_F$ | $g_{152F} = g_{151F} + g_F$ | $g_{153F} = g_{152F} + g_F$ |
| $ans_{151F} = ans_{2F} + L_{3F} + L_F$ | $ans_{152F} = ans_{151F} + L_F$ | $ans_{153F} = ans_{152F} + L_F$ |
| Repeat to $L_{160F}, j_{160F}, g_{160F}, ans_{160F}$ | | | q. Add Formula 1 to Formula 3 then add Formula 2 repeatedly to create 10 more formulas. To avoid repeating the first formula begin with Formula 151 (Formula 2+Formula3+Formula 1).

| | | |
|---|---|---|
| $L_{161F} = L_{151F} + L_{2F}$ | $L_{162F} = L_{161F} + L_{2F}$ | $L_{163F} = L_{162F} + L_{2F}$ |
| $j_{161F} = j_{151F} + j_{2F}$ | $j_{162F} = j_{161F} + j_{2F}$ | $j_{163F} = j_{162F} + j_{2F}$ |
| $g_{161F} = g_{151F} + g_{2F}$ | $g_{162F} = g_{161F} + g_{2F}$ | $g_{163F} = g_{162F} + g_{2F}$ |
| $ans_{161F} = ans_{151F} + L_{2F}$ | $ans_{162F} = ans_{161F} + L_{2F}$ | $ans_{163F} = ans_{162F} + L_{2F}$ |
| Repeat to $L_{170F}, j_{170F}, g_{170F}, ans_{170F}$ | | | r. Add Formula 1 to Formula 2 and add Formula 3 repeatedly to create 10 more formulas.

| | | |
|---|---|---|
| $L_{171F} = L_F + L_{2F} + L_{3F}$ | $L_{172F} = L_{171F} + L_{3F}$ | $L_{173F} = L_{172F} + L_{3F}$ |
| $j_{171F} = j_F + j_{2F} + j_{3F}$ | $j_{172F} = j_{171F} + j_{3F}$ | $j_{173F} = j_{172F} + j_{3F}$ |
| $g_{171F} = g_F + g_{2F} + g_{3F}$ | $g_{172F} = g_{171F} + g_{3F}$ | $g_{173F} = g_{172F} + g_{3F}$ |
| $ans_{171F} = ans_F + L_{2F} + L_{3F}$ | $ans_{172F} = ans_{171F} + L_{3F}$ | $ans_{173F} = ans_{172F} + L_{3F}$ |
| Repeat to $L_{180F}, j_{180F}, g_{180F}, ans_{180F}$ | | | s. Double Formula 2 and subtract Formula 1 repeatedly to create 10 more formulas.

$L_{181F} = L_{2F} + L_{2F} - L_F$             $L_{182F} = L_{181F} - L_F$         $L_{183F} = L_{182F} - L_F$
$j_{181F} = j_{2F} + j_{2F} - j_F$             $j_{182F} = j_{181F} - j_F$         $j_{183F} = j_{182F} - j_F$
$g_{181F} = g_{2F} + g_{2F} - g_F$             $g_{182F} = g_{181F} - g_F$         $g_{183F} = g_{182F} - g_F$
$ans_{181F} = ans_{2F} + L_{2F} - L_F$         $ans_{182F} = ans_{181F} - L_F$     $ans_{183F} = ans_{182F} - L_F$
Repeat to $L_{190F}, j_{190F}, g_{190F}, ans_{190F}$ t. Double Formula 3 and subtract Formula 1 repeatedly to create 10 more formulas.

$L_{191F} = L_{3F} + L_{3F} - L_F$             $L_{192F} = L_{191F} - L_F$         $L_{193F} = L_{192F} - L_F$
$j_{191F} = j_{3F} + j_{3F} - j_F$             $j_{192F} = j_{191F} - j_F$         $j_{193F} = j_{192F} - j_F$
$g_{191F} = g_{3F} + g_{3F} - g_F$             $g_{192F} = g_{191F} - g_F$         $g_{193F} = g_{192F} - g_F$
$ans_{191F} = ans_{3F} + L_{3F} - L_F$         $ans_{192F} = ans_{191F} - L_F$     $ans_{193F} = ans_{192F} - L_F$
Repeat to $L_{200F}, j_{200F}, g_{200F}, ans_{200F}$ u. Double Formula 3, add Formula 2, and subtract Formula 1 repeatedly to create 10 more formulas.

$L_{201F} = 2L_{3F} + L_{2F} - L_F$            $L_{202F} = L_{201F} - L_F$         $L_{203F} = L_{202F} - L_F$
$j_{201F} = 2j_{3F} + j_{2F} - j_F$            $j_{202F} = j_{201F} - j_F$         $j_{203F} = j_{202F} - j_F$
$g_{201F} = 2g_{3F} + g_{2F} - g_F$            $g_{202F} = g_{201F} - g_F$         $g_{203F} = g_{202F} - g_F$
$ans_{201F} = 2ans_{3F} + L_{2F} - L_F$        $ans_{202F} = ans_{201F} - L_F$     $ans_{203F} = ans_{202F} - L_F$
Repeat to $L_{210F}, j_{210F}, g_{210F}, ans_{210F}$ v. Double Formula 2, add Formula 3, and then subtract Formula 1 repeatedly to create 10 more formulas.

$L_{211F} = 2L_{2F} + L_{3F} - L_F$            $L_{212F} = L_{211F} - L_F$         $L_{213F} = L_{212F} - L_F$
$j_{211F} = 2j_{2F} + j_{3F} - j_F$            $j_{212F} = j_{211F} - j_F$         $j_{213F} = j_{212F} - j_F$
$g_{211F} = 2g_{2F} + g_{3F} - g_F$            $g_{212F} = g_{211F} - g_F$         $g_{213F} = g_{212F} - g_F$
$ans_{211F} = 2ans_{2F} + L_{3F} - L_F$        $ans_{212F} = ans_{211F} - L_F$     $ans_{213F} = ans_{212F} - L_F$
Repeat to $L_{220F}, j_{220F}, g_{220F}, ans_{220F}$ w. Double Formula 1 then subtract Formula 2 repeatedly to create 10 more formulas.

$L_{221F} = 2L_F - L_{2F}$                     $L_{222F} = L_{221F} - L_{2F}$      $L_{223F} = L_{222F} - L_{2F}$
$j_{221F} = 2j_F - j_{2F}$                     $j_{222F} = j_{221F} - j_{2F}$      $j_{223F} = j_{222F} - j_{2F}$
$g_{221F} = 2g_F - g_{2F}$                     $g_{222F} = g_{221F} - g_{2F}$      $g_{223F} = g_{222F} - g_{2F}$
$ans_{221F} = 2ans_F - L_{2F}$                 $ans_{222F} = ans_{221F} - L_{2F}$  $ans_{223F} = ans_{222F} - L_{2F}$
Repeat to $L_{230F}, j_{230F}, g_{230F}, ans_{230F}$ x. Double Formula 1 then subtract Formula 3 repeatedly to create 10 more formulas.

$L_{231F} = 2L_F - L_{3F}$                     $L_{232F} = L_{231F} - L_{3F}$      $L_{233F} = L_{232F} - L_{3F}$
$j_{231F} = 2j_F - j_{3F}$                     $j_{232F} = j_{231F} - j_{3F}$      $j_{233F} = j_{232F} - j_{3F}$
$g_{231F} = 2g_F - g_{3F}$                     $g_{232F} = g_{231F} - g_{3F}$      $g_{233F} = g_{232F} - g_{3F}$
$ans_{231F} = 2ans_F - L_{3F}$                 $ans_{232F} = ans_{231F} - L_{3F}$  $ans_{233F} = ans_{232F} - L_{3F}$
Repeat to $L_{240F}, j_{240F}, g_{240F}, ans_{240F}$ y. Double Formula 2 then subtract Formula 3 repeatedly to create 10 more formulas.

| | | |
|---|---|---|
| $L_{241F} = 2L_{2F} - L_{3F}$ | $L_{242F} = L_{241F} - L_{3F}$ | $L_{243F} = L_{242F} - L_{3F}$ |
| $j_{241F} = 2j_{2F} - j_{3F}$ | $j_{242F} = j_{241F} - j_{3F}$ | $j_{243F} = j_{242F} - j_{3F}$ |
| $g_{241F} = 2g_{2F} - g_{3F}$ | $g_{242F} = g_{241F} - g_{3F}$ | $g_{243F} = g_{242F} - g_{3F}$ |
| $ans_{241F} = 2ans_{2F} - L_{3F}$ | $ans_{242F} = ans_{241F} - L_{3F}$ | $ans_{243F} = ans_{242F} - L_{3F}$ |
| Repeat to $L_{250F}, j_{250F}, g_{250F}, ans_{250F}$ | | | z. Double Formula 3 then subtract Formula 2 repeatedly to create 10 more formulas.

| | | |
|---|---|---|
| $L_{251F} = 2L_{3F} - L_{2F}$ | $L_{252F} = L_{251F} - L_{2F}$ | $L_{253F} = L_{252F} - L_{2F}$ |
| $j_{251F} = 2j_{3F} - j_{2F}$ | $j_{252F} = j_{251F} - j_{2F}$ | $j_{253F} = j_{252F} - j_{2F}$ |
| $g_{251F} = 2g_{3F} - g_{2F}$ | $g_{252F} = g_{251F} - g_{2F}$ | $g_{253F} = g_{252F} - g_{2F}$ |
| $ans_{251F} = 2ans_{3F} - L_{2F}$ | $ans_{252F} = ans_{251F} - L_{2F}$ | $ans_{253F} = ans_{252F} - L_{2F}$ |
| Repeat to $L_{260F}, j_{260F}, g_{260F}, ans_{260F}$ | | | aa. Double Formula 1 then add Formula 2 repeatedly to create 10 more formulas.

| | | |
|---|---|---|
| $L_{261F} = 2L_F + L_{2F}$ | $L_{262F} = L_{261F} + L_{2F}$ | $L_{263F} = L_{262F} + L_{2F}$ |
| $j_{261F} = 2j_F + j_{2F}$ | $j_{262F} = j_{261F} + j_{2F}$ | $j_{263F} = j_{262F} + j_{2F}$ |
| $g_{261F} = 2g_F + g_{2F}$ | $g_{262F} = g_{261F} + g_{2F}$ | $g_{263F} = g_{262F} + g_{2F}$ |
| $ans_{261F} = 2ans_F + L_{2F}$ | $ans_{262F} = ans_{261F} + L_{2F}$ | $ans_{263F} = ans_{262F} + L_{2F}$ |
| Repeat to $L_{270F}, j_{270F}, g_{270F}, ans_{270F}$ | | | bb. Double Formula 1 then add Formula 3 repeatedly to create 10 more formulas.

| | | |
|---|---|---|
| $L_{271F} = 2L_F + L_{3F}$ | $L_{272F} = L_{271F} + L_{3F}$ | $L_{273F} = L_{272F} + L_{3F}$ |
| $j_{271F} = 2j_F + j_{3F}$ | $j_{272F} = j_{271F} + j_{3F}$ | $j_{273F} = j_{272F} + j_{3F}$ |
| $g_{271F} = 2g_F + g_{3F}$ | $g_{272F} = g_{271F} + g_{3F}$ | $g_{273F} = g_{272F} + g_{3F}$ |
| $ans_{271F} = 2ans_F + L_{3F}$ | $ans_{272F} = ans_{271F} + L_{3F}$ | $ans_{273F} = ans_{272F} + L_{3F}$ |
| Repeat to $L_{280F}, j_{280F}, g_{280F}, ans_{280F}$ | | | cc. Double Formula 2 then add Formula 1 repeatedly to create 10 more formulas.

| | | |
|---|---|---|
| $L_{281F} = 2L_{2F} + L_F$ | $L_{282F} = L_{281F} + L_F$ | $L_{283F} = L_{282F} + L_F$ |
| $j_{281F} = 2j_{2F} + j_F$ | $j_{282F} = j_{281F} + j_F$ | $j_{283F} = j_{282F} + j_F$ |
| $g_{281F} = 2g_{2F} + g_F$ | $g_{282F} = g_{281F} + g_F$ | $g_{283F} = g_{282F} + g_F$ |
| $ans_{281F} = 2ans_{2F} + L_F$ | $ans_{282F} = ans_{281F} + L_F$ | $ans_{283F} = ans_{282F} + L_F$ |
| Repeat to $L_{290F}, j_{290F}, g_{290F}, ans_{290F}$ | | | dd. Double Formula 2 then add Formula 3 repeatedly to create 10 more formulas.

| | | |
|---|---|---|
| $L_{291F} = 2L_{2F} + L_{3F}$ | $L_{292F} = L_{291F} + L_{3F}$ | $L_{293F} = L_{292F} + L_{3F}$ |
| $j_{291F} = 2j_{2F} + j_{3F}$ | $j_{292F} = j_{291F} + j_{3F}$ | $j_{293F} = j_{292F} + j_{3F}$ |
| $g_{291F} = 2g_{2F} + g_{3F}$ | $g_{292F} = g_{291F} + g_{3F}$ | $g_{293F} = g_{292F} + g_{3F}$ |
| $ans_{291F} = 2ans_{2F} + L_{3F}$ | $ans_{292F} = ans_{291F} + L_{3F}$ | $ans_{293F} = ans_{292F} + L_{3F}$ |
| Repeat to $L_{300F}, j_{300F}, g_{300F}, ans_{300F}$ | | | ee. Double Formula 3 then add Formula 1 repeatedly to create 10 more formulas.

| | | |
|---|---|---|
| $L_{301F} = 2L_{3F} + L_F$ | $L_{302F} = L_{301F} + L_F$ | $L_{303F} = L_{202F} + L_F$ |
| $j_{301F} = 2j_{3F} + j_F$ | $j_{302F} = j_{301F} + j_F$ | $j_{303F} = j_{302F} + j_F$ |
| $g_{301F} = 2g_{3F} + g_F$ | $g_{302F} = g_{301F} + g_F$ | $g_{303F} = g_{302F} + g_F$ |
| $ans_{301F} = 2ans_{3F} + L_F$ | $ans_{302F} = ans_{301F} + L_F$ | $ans_{303F} = ans_{302F} + L_F$ |
| Repeat to $L_{310F}, j_{310F}, g_{310F}, ans_{310F}$ | | | ff. Double Formula 3 then add Formula 2 repeatedly to create 10 more formulas.

| | | |
|---|---|---|
| $L_{311F} = 2L_{3F} + L_{2F}$ | $L_{312F} = L_{311F} + L_{2F}$ | $L_{313F} = L_{312F} + L_{2F}$ |
| $j_{311F} = 2j_{3F} + j_{2F}$ | $j_{312F} = j_{311F} + j_{2F}$ | $j_{313F} = j_{312F} + j_{2F}$ |
| $g_{311F} = 2g_{3F} + g_{2F}$ | $g_{312F} = g_{311F} + g_{2F}$ | $g_{313F} = g_{312F} + g_{2F}$ |
| $ans_{311F} = 2ans_{3F} + L_{2F}$ | $ans_{312F} = ans_{311F} + L_{2F}$ | $ans_{313F} = ans_{312F} + L_{2F}$ |
| Repeat to $L_{320F}, j_{320F}, g_{320F}, ans_{320F}$ | | | gg. Double Formula 1, add Formula 2, then subtract Formula 3 repeatedly to create 10 more formulas.

| | | |
|---|---|---|
| $L_{321F} = 2L_F + L_{2F} - L_{3F}$ | $L_{322F} = L_{321F} - L_{3F}$ | $L_{323F} = L_{322F} - L_{3F}$ |
| $j_{321F} = 2j_F + j_{2F} - L_{3F}$ | $j_{322F} = j_{321F} - j_{3F}$ | $j_{323F} = j_{322F} - j_{3F}$ |
| $g_{321F} = 2g_F + g_{2F} - L_{3F}$ | $g_{322F} = g_{321F} - g_{3F}$ | $g_{323F} = g_{322F} - g_{3F}$ |
| $ans_{321F} = 2ans_F + L_{2F} - L_{3F}$ | $ans_{322F} = ans_{321F} - L_{3F}$ | $ans_{323F} = ans_{322F} - L_{3F}$ |
| Repeat to $L_{330F}, j_{330F}, g_{330F}, ans_{330F}$ | | | hh. Double Formula 1, add Formula 3, then subtract Formula 2 repeatedly to create 10 more formulas.

| | | |
|---|---|---|
| $L_{331F} = 2L_F + L_{3F} - L_{2F}$ | $L_{332F} = L_{331F} - L_{2F}$ | $L_{333F} = L_{332F} - L_{2F}$ |
| $j_{331F} = 2j_F + j_{3F} - L_{2F}$ | $j_{332F} = j_{331F} - j_{2F}$ | $j_{333F} = j_{332F} - j_{2F}$ |
| $g_{331F} = 2g_F + g_{3F} - L_{2F}$ | $g_{332F} = g_{331F} - g_{2F}$ | $g_{333F} = g_{332F} - g_{2F}$ |
| $ans_{331F} = 2ans_F + L_{3F} - L_{2F}$ | $ans_{332F} = ans_{331F} - L_{2F}$ | $ans_{333F} = ans_{332F} - L_{2F}$ |
| Repeat to $L_{340F}, j_{340F}, g_{340F}, ans_{340F}$ | | | ii. Double Formula 2, add Formula 1, then subtract Formula 3 repeatedly to create 10 more formulas.

| | | |
|---|---|---|
| $L_{341F} = 2L_{2F} + L_F - L_{3F}$ | $L_{342F} = L_{341F} - L_{3F}$ | $L_{343F} = L_{342F} - L_{3F}$ |
| $j_{341F} = 2j_{2F} + j_F - L_{3F}$ | $j_{342F} = j_{341F} - j_{3F}$ | $j_{343F} = j_{342F} - j_{3F}$ |
| $g_{341F} = 2g_{2F} + g_F - L_{3F}$ | $g_{342F} = g_{341F} - g_{3F}$ | $g_{343F} = g_{342F} - g_{3F}$ |
| $ans_{341F} = 2ans_{2F} + L_F - L_{3F}$ | $ans_{342F} = ans_{341F} - L_{3F}$ | $ans_{343F} = ans_{342F} - L_{3F}$ |
| Repeat to $L_{350F}, j_{350F}, g_{350F}, ans_{350F}$ | | | jj. Double Formula 3 add Formula 1 then subtract Formula 2 repeatedly to create 10 more formulas.

| | | |
|---|---|---|
| $L_{351F} = 2L_{3F} + L_F - L_{2F}$ | $L_{352F} = L_{351F} - L_{2F}$ | $L_{353F} = L_{352F} - L_{2F}$ |
| $j_{351F} = 2j_{3F} + j_F - L_{2F}$ | $j_{352F} = j_{351F} - j_{2F}$ | $j_{353F} = j_{352F} - j_{2F}$ |
| $g_{351F} = 2g_{3F} + g_F - L_{2F}$ | $g_{352F} = g_{351F} - g_{2F}$ | $g_{353F} = g_{352F} - g_{2F}$ |
| $ans_{351F} = 2ans_{3F} + L_F - L_{2F}$ | $ans_{352F} = ans_{351F} - L_{2F}$ | $ans_{353F} = ans_{352F} - L_{2F}$ |
| Repeat to $L_{360F}, j_{360F}, g_{360F}, ans_{360F}$ | | |

3. First Set of Formulas Put in Correct Form a. Reduce the formulas created above by the largest common divisor, the formula is then noted as $L_{FR}$, $j_{FR}$, $g_{FR}$, $ans_{FR}$. GCD stands for 'greatest common divisor.' The positive and negative signs are ignored in this process.

$L_{FR} = L_F/\text{GCD}$ of absolute $L_F$, absolute $j_F$, absolute $g_F$, absolute $ans_F$
$j_{FR} = j_F/\text{GCD}$ of absolute $L_F$, absolute $j_F$, absolute $g_F$, absolute $ans_F$
$g_{FR} = g_F/\text{GCD}$ of absolute $L_F$, absolute $j_F$, absolute $g_F$, absolute $ans_F$
$ans_{FR} = ans_F/\text{GCD}$ of absolute $L_F$, absolute $j_F$, absolute $g_F$, absolute $ans_F$
$L_{2FR} = L_{2F}/\text{GCD}$ of absolute $L_{2F}$, absolute $j_{2F}$, absolute $g_{2F}$, absolute -continued $ans_{2F}$
$j_{2FR} = j_{2F}/$GCD of absolute $L_{2F}$, absolute $j_{2F}$, absolute $g_{2F}$, absolute $ans_{2F}$
$g_{2FR} = g_{2F}/$GCD of absolute $L_{2F}$, absolute $j_{2F}$, absolute $g_{2F}$, absolute $ans_{2F}$
$ans_{2FR} = ans_{2F}/$GCD of absolute $L_{2F}$, absolute $j_{2F}$, absolute $g_{2F}$, absolute $ans_{2F}$ Continue process through $L_{360FR}$, $j_{360FR}$, $g_{360FR}$, $ans_{360FR}$ b. Formula L's must always be a positive number, so if L is negative in any of the formulas above, divide its $L_{FR}$, $j_{FR}$, $g_{FR}$ and $ans_{FR}$ by $-1$. This is indicated by $L_{FRP}$ (Note, however, that L can be negative in a color notation.) It is also necessary to multiply by $-1$ in cases where L is 0 and j is a negative number or when L=0, j=0 and g<0. The first digit in the formulas must be positive so duplicate formulas will be recognized.

Example: 0, $-2$, 3=5 is a duplicate of 0, 2, $-3$=$-5$

---

$L_{FRP}$: If $L_{FR} < 0$, put $L_{FR}$ *$-1$, otherwise put $L_{FR}$
$j_{FRP}$: If $L_{FR} = 0$ and $j_{FR} < 0$, put $j_{FR}$ *$-1$; or if $L_{FR} < 0$, put $j_{FR}$ *$-1$; otherwise put $j_{FR}$
$g_{FRP}$: If $L_{FR} = 0$ and $j_{FR} < 0$, put $g_{FR}$ *$-1$; or if $L_{FR} = 0$ and $j_{FR} = 0$ and $g_{FR} < 0$, put $g_{FR}$ *$-1$; otherwise put $g_{FR}$
$ans_{FRP}$: if $L_{FR} = 0$ and $j_{FR} < 0$, put $ans_{FR}$ *$-1$; or if $L_{FR} = 0$ and $j_{FR} = 0$ and $g_{FR} < 0$, put $ans_{FR}$ *$-1$; otherwise put $ans_{FR}$
$L_{2FRP}$: If $L_{2FR} < 0$, put $L_{FR}$ *$-1$, otherwise put $L_{FR}$

---

-continued $j_{2FRP}$: If $L_{2FR} = 0$ and $j_{FR} < 0$, put $j_{FR}$ *$-1$; or if $L_{FR} < 0$, put $j_{FR}$ *$-1$; otherwise put $j_{2FR}$
$g_{2FRP}$: If $L_{2FR} = 0$ and $j_{2FR} < 0$, put $g_{FR2}$ *$-1$; or if $L_{FR2} = 0$ and $j_{FR2} = 0$ and $g_{FR2} < 0$, put $g_{2FR}$ *$-1$; otherwise put $g_{2FR}$
$ans_{FRP}$: if $L_{2FR} = 0$ and $j_{2FR} < 0$, put $ans_{FR2}$ *$-1$; or if $L_{FR2} = 0$ and $j_{FR2} = 0$ and $g_{2FR} < 0$, put $ans_{2FR}$ *$-1$; otherwise put $ans_{FR2}$ Continue process through $L_{360FRP}$, $j_{360FRP}$, $g_{360FRP}$, $ans_{360FRP}$ 4. Deriving Second Set of Formulas After formulas are reduced by common denominator and the first digit in the formula (except 0) made positive, the resulting reduced formulas are also combined to derive another set of formulas that will satisfy both original colors.

a. Formula 1, after the process given above, is designated as Formula $361_{FRP}$ in order to keep track of the number of formulas. Formula 2 becomes Formula 362FRP and Formula 3 becomes Formula 363FRP. In other words:

| | | |
|---|---|---|
| $L_F$ becomes $L_{361FRP}$ | $L_{2F}$ becomes $L_{362FRP}$ | $L_{3F}$ becomes $L_{363FRP}$ |
| $j_F$ becomes $j_{361FRP}$ | $j_{2F}$ becomes $j_{362FRP}$ | $j_{3F}$ becomes $j_{363FRP}$ |
| $g_F$ becomes $g_{361FRP}$ | $g_{2F}$ becomes $g_{362FRP}$ | $g_{3F}$ becomes $g_{363FRP}$ |
| $ans_F$ becomes $ans_{361FRP}$ | $ans_{2F}$ becomes $ans_{362FRP}$ | $ans_{3F}$ becomes $ans_{363FRP}$ |

Note—Many of these formulas, and the ones in section 2, are duplicates; but the duplicates will fall in different places depending on the original two colors and must be eliminated later.

b. Add Formula 362FRP (which is Formula 2 after the procedure above) repeatedly to Formula 361FRP (which is Formula 1 after the procedure above) to create 10 formulas.

---

| | |
|---|---|
| $L_{364FRP} = L_{361FRP} + L_{362FRP}$ | $L_{365FRP} = L_{364FRP} + L_{362FRP}$ |
| $j_{364FRP} = j_{361FRP} + j_{362FRP}$ | $j_{365FRP} = j_{364FRP} + j_{362FRP}$ |
| $g_{364FRP} = g_{361FRP} + g_{362FRP}$ | $g_{365FRP} = g_{364FRP} + g_{362FRP}$ |
| $ans_{364FRP} = ans_{361FRP} + ans_{362FRP}$ | $ans_{365FRP} = ans_{364FRP} + ans_{362FRP}$ |
| Repeat to $L_{373FRP}, j_{373FRP}, g_{373FRP}, ans_{373FRP}$ | | c. Add Formula 361FRP (old Formula 1 reduced) repeatedly to Formula 362FRP (old Formula 2 reduced) to create 10 formulas. Begin the series by adding Formula $361_{FRP}$ to Formula 364FRP, which avoids repeating the first formula in b. above (Formula 364FRP=Formula 361FRP+Formula 362FRP).

---

| | |
|---|---|
| $L_{374FRP} = L_{364FRP} + L_{361FRP}$ | $L_{375FRP} = L_{374FRP} + L_{361FRP}$ |
| $j_{374FRP} = j_{364FRP} + j_{361FRP}$ | $j_{375FRP} = j_{374FRP} + j_{361FRP}$ |
| $g_{374FRP} = g_{364FRP} + g_{361FRP}$ | $g_{375FRP} = g_{374FRP} + g_{361FRP}$ |
| $ans_{374FRP} = ans_{364FRP} + ans_{361FRP}$ | $ans_{375FRP} = ans_{374FRP} + ans_{361FRP}$ |
| Repeat to $L_{383FRP}, j_{383FRP}, g_{383FRP}, ans_{383FRP}$ | | d. Add Formula 363FRP (old Formula 3 reduced) repeatedly to Formula 361FRP (old Formula 1 reduced) to create 10 formulas.

---

| | |
|---|---|
| $L_{384FRP} = L_{361FRP} + L_{363FRP}$ | $L_{385FRP} = L_{384FRP} + L_{363FRP}$ |
| $j_{384FRP} = j_{361FRP} + j_{363FRP}$ | $j_{385FRP} = j_{384FRP} + j_{363FRP}$ |
| $g_{384FRP} = g_{361FRP} + g_{363FRP}$ | $g_{385FRP} = g_{384FRP} + g_{363FRP}$ |
| $ans_{384FRP} = ans_{361FRP} + ans_{363FRP}$ | $ans_{385FRP} = ans_{384FRP} + ans_{363FRP}$ |
| Repeat to $L_{393FRP}, j_{393FRP}, g_{393FRP}, ans_{393FRP}$ | | e. Add Formula 361FRP (old Formula 1 reduced) repeatedly to Formula 363 (old Formula 3 reduced) to create 10 formulas. Again begin the series by using Formula 384FRP to avoid repeating Formula 363FPR+Formula 361FRP.

$L_{394FRP} = L_{384FRP} + L_{361FRP}$  
$j_{394FRP} = j_{384FRP} + j_{361FRP}$  
$g_{394FRP} = g_{384FRP} + g_{361FRP}$  
$ans_{394FRP} = ans_{384FRP} + ans_{361FRP}$  
Repeat to $L_{403FRP}, j_{403FRP}, g_{403FRP}, ans_{403FRP}$ $L_{395FRP} = L_{394FRP} + L_{361FRP}$  
$j_{395FRP} = j_{394FRP} + j_{361FRP}$  
$g_{395FRP} = g_{394FRP} + g_{361FRP}$  
$ans_{395FRP} = ans_{394FRP} + ans_{361FRP}$ f. Add Formula 363FRP repeatedly to Formula 362FRP to create 10 formulas.

$L_{404FRP} = L_{362FRP} + L_{363FRP}$  
$j_{404FRP} = j_{362FRP} + j_{363FRP}$  
$g_{404FRP} = g_{362FRP} + g_{363FRP}$  
$ans_{404FRP} = ans_{362FRP} + ans_{363FRP}$  
Repeat to $L_{413FRP}, j_{413FRP}, g_{413FRP}, ans_{413FRP}$ $L_{405FRP} = L_{404FRP} + L_{363FRP}$  
$j_{405FRP} = j_{404FRP} + j_{363FRP}$  
$g_{405FRP} = g_{404FRP} + g_{363FRP}$  
$ans_{405FRP} = ans_{404FRP} + ans_{363FRP}$ g. Add Formula 362FRP repeatedly to Formula 363FRP to create 10 formulas. Again begin the series by using Formula 404FRP to avoid repeating Formula 362FRP+Formula 363FRP.

$L_{414FRP} = L_{404FRP} + L_{362FRP}$  
$j_{414FRP} = j_{404FRP} + j_{362FRP}$  
$g_{414FRP} = g_{404FRP} + g_{362FRP}$  
$ans_{414FRP} = ans_{404FRP} + ans_{362FRP}$  
Repeat to $L_{423FRP}, j_{423FRP}, g_{423FRP}, ans_{423FRP}$ $L_{415FRP} = L_{414FRP} + L_{362FRP}$  
$j_{415FRP} = j_{414FRP} + j_{362FRP}$  
$g_{415FRP} = g_{414FRP} + g_{362FRP}$  
$ans_{415FRP} = ans_{414FRP} + ans_{362FRP}$ h. Subtract Formula 2FRP repeatedly from Formula 1FRP to create 10 formulas.

$L_{424FRP} = L_{361FRP} - L_{2FRP}$  
$j_{424FRP} = j_{361FRP} - j_{2FRP}$  
$g_{424FRP} = g_{361FRP} - g_{2FRP}$  
$ans_{424FRP} = ans_{361FRP} - ans_{2FRP}$  
Repeat to $L_{433FRP}, j_{433FRP}, g_{433FRP}, ans_{433FRP}$ $L_{425FRP} = L_{424FRP} - L_{2FRP}$  
$j_{425FRP} = j_{424FRP} - j_{2FRP}$  
$g_{425FRP} = g_{424FRP} - g_{2FRP}$  
$ans_{425FRP} = ans_{424FRP} - ans_{2FRP}$ i. Subtract Formula 361FRP repeatedly from Formula 362FRP to create 10 formulas.

$L_{434FRP} = L_{362FRP} - L_{361FRP}$  
$j_{434FRP} = j_{362FRP} - j_{361FRP}$  
$g_{434FRP} = g_{362FRP} - g_{361FRP}$  
$ans_{434FRP} = ans_{362FRP} - ans_{361FRP}$  
Repeat to $L_{443FRP}, j_{443FRP}, g_{443FRP}, ans_{443FRP}$ $L_{435FRP} = L_{434FRP} - L_{361FRP}$  
$j_{435FRP} = j_{434FRP} - j_{361FRP}$  
$g_{435FRP} = g_{434FRP} - g_{361FRP}$  
$ans_{435FRP} = ans_{434FRP} - ans_{361FRP}$ j. Subtract Formula 363FRP repeatedly from Formula 361FRP to create 10 formulas.

$L_{444FRP} = L_{361FRP} - L_{363FRP}$
$j_{444FRP} = j_{361FRP} - j_{363FRP}$
$g_{444FRP} = g_{361FRP} - g_{363FRP}$
$ans_{444FRP} = ans_{361FRP} - ans_{363FRP}$
Repeat to $L_{453FRP}, j_{453FRP}, g_{453FRP}, ans_{453FRP}$ $L_{445FRP} = L_{444FRP} - L_{3FRP}$
$j_{445FRP} = j_{444FRP} - j_{363FRP}$
$g_{445FRP} = g_{444FRP} - g_{363FRP}$
$ans_{445FRP} = ans_{444FRP} - ans_{363FRP}$ k. Subtract Formula 1FRP repeatedly from Formula 3FRP to create 10 formulas.

$L_{454FRP} = L_{363FRP} - L_{361FRP}$
$j_{454FRP} = j_{363FRP} - j_{361FRP}$
$g_{454FRP} = g_{363FRP} - g_{361FRP}$
$ans_{454FRP} = ans_{363FRP} - ans_{361FRP}$
Repeat to $L_{463FRP}, j_{463FRP}, g_{463FRP}, ans_{463FRP}$ $L_{455FRP} = L_{454FRP} - L_{361FRP}$
$j_{455FRP} = j_{454FRP} - j_{361FRP}$
$g_{455FRP} = g_{454FRP} - g_{361FRP}$
$ans_{455FRP} = ans_{454FRP} - ans_{361FRP}$ l. Subtract Formula 3FRP repeatedly from Formula 2FRP to create 10 formulas.

$L_{464FRP} = L_{2FRP} - L_{363FRP}$
$j_{464FRP} = j_{2FRP} - j_{363FRP}$
$g_{464FRP} = g_{2FRP} - g_{363FRP}$
$ans_{464FRP} = ans_{2FRP} - ans_{363FRP}$
Repeat to $L_{473FRP}, j_{473FRP}, g_{473FRP}, ans_{473FRP}$ $L_{465FRP} = L_{464FRP} - L_{363FRP}$
$j_{465FRP} = j_{464FRP} - j_{363FRP}$
$g_{465FRP} = g_{464FRP} - g_{363FRP}$
$ans_{465FRP} = ans_{464FRP} - ans_{363FRP}$ m. Subtract Formula 362FRP repeatedly from Formula 363FRP to create 10 formulas.

$L_{474FRP} = L_{363FRP} - L_{362FRP}$
$j_{474FRP} = j_{363FRP} - j_{362FRP}$
$g_{474FRP} = g_{363FRP} - g_{362FRP}$
$ans_{474FRP} = ans_{363FRP} - ans_{362FRP}$
Repeat to $L_{483FRP}, j_{483FRP}, g_{483FRP}, ans_{483FRP}$ $L_{475FRP} = L_{474FRP} - L_{362FRP}$
$j_{475FRP} = j_{474FRP} - j_{362FRP}$
$g_{475FRP} = g_{474FRP} - g_{362FRP}$
$ans_{475FRP} = ans_{474FRP} - ans_{362FRP}$ n. Add Formula 361FRP to Formula 362FRP then repeatedly subtract Formula 363FRP to create 10 formulas.

$L_{484FRP} = L_{361FRP} + L_{362FRP} - L_{363FRP}$
$j_{484FRP} = j_{361FRP} + j_{362FRP} - j_{363FRP}$
$g_{484FRP} = g_{361FRP} + g_{362FRP} - g_{363FRP}$
$ans_{484FRP} = ans_{361FRP} + ans_{362FRP} - ans_{363FRP}$
Repeat to $L_{493FRP}, j_{493FRP}, g_{493FRP}, ans_{493FRP}$ $L_{485FRP} = L_{484FRP} - L_{363FRP}$
$j_{485FRP} = j_{484FRP} - j_{363FRP}$
$g_{485FRP} = g_{484FRP} - g_{363FRP}$
$ans_{485FRP} = ans_{484FRP} - ans_{363FRP}$ o. Add Formula 361FRP to Formula 363FRP then repeatedly subtract Formula 362FRP to create 10 formulas.

$L_{494FRP} = L_{361FRP} + L_{363FRP} - L_{362FRP}$
$j_{494FRP} = j_{361FRP} + j_{363FRP} - j_{362FRP}$
$g_{494FRP} = g_{361FRP} + g_{363FRP} - g_{362FRP}$
$ans_{494FRP} = ans_{361FRP} + ans_{363FRP} - ans_{362FRP}$
Repeat to $L_{503FRP}, j_{503FRP}, g_{503FRP}, ans_{503FRP}$ $L_{495FRP} = L_{494FRP} - L_{362FRP}$
$j_{495FRP} = j_{494FRP} - j_{362FRP}$
$g_{495FRP} = g_{494FRP} - g_{362FRP}$
$ans_{495FRP} = ans_{494FRP} - ans_{362FRP}$ p. Add Formula 362FRP to Formula 363FRP then repeatedly subtract Formula 361FRP to create 10 formulas.

$$L_{504FRP} = L_{362FRP} + L_{363FRP} - L_{361FRP}$$
$$j_{504FRP} = j_{362FRP} + j_{363FRP} - j_{361FRP}$$
$$g_{504FRP} = g_{362FRP} + g_{363FRP} - g_{361FRP}$$
$$ans_{504FRP} = ans_{362FRP} + ans_{363FRP} - ans_{361FRP}$$

$$L_{505FRP} = L_{504FRP} - L_{361FRP}$$
$$j_{505FRP} = j_{504FRP} - j_{361FRP}$$
$$g_{505FRP} = g_{504FRP} - g_{361FRP}$$
$$ans_{505FRP} = ans_{504FRP} - ans_{361FRP}$$

Repeat to $L_{513FRP}, j_{513FRP}, g_{513FRP}, ans_{513FRP}$ q. Add Formula 362FRP to Formula 363FRP, repeatedly add Formula 361FRP to create 10 formulas.

$$L_{514FRP} = L_{362FRP} + L_{363FRP} + L_{361FRP}$$
$$j_{514FRP} = j_{362FRP} + j_{363FRP} + j_{361FRP}$$
$$g_{514FRP} = g_{362FRP} + g_{363FRP} + g_{361FRP}$$
$$ans_{514FRP} = ans_{362FRP} + ans_{363FRP} + ans_{361FRP}$$

$$L_{515FRP} = L_{514FRP} + L_{361FRP}$$
$$j_{515FRP} = j_{514FRP} + j_{361FRP}$$
$$g_{515FRP} = g_{514FRP} + g_{361FRP}$$
$$ans_{515FRP} = ans_{514FRP} + ans_{361FRP}$$

Repeat to $L_{523FRP}, j_{523FRP}, g_{523FRP}, ans_{523FRP}$ r. Add Formula 361FRP to Formula 363FRP then repeatedly add Formula 362FRP to create 10 formulas. To avoid repeating the first formula in q. above, begin with Formula 514FRP.

$$L_{524FRP} = L_{514FRP} + L_{362FRP}$$
$$j_{524FRP} = j_{514FRP} + j_{362FRP}$$
$$g_{524FRP} = g_{514FRP} + g_{362FRP}$$
$$ans_{524FRP} = ans_{514FRP} + ans_{362FRP}$$

$$L_{525FRP} = L_{524FRP} + L_{362FRP}$$
$$j_{525FRP} = j_{524FRP} + j_{362FRP}$$
$$g_{525FRP} = g_{524FRP} + g_{362FRP}$$
$$ans_{525FRP} = ans_{524FRP} + ans_{362FRP}$$

Repeat to $L_{533FRP}, j_{533FRP}, g_{533FRP}, ans_{533FRP}$ s. Add Formula 361FRP to Formula 362FRP then repeatedly add Formula 363FRP to create 10 formulas. To avoid repeating the first formula in q) above begin with Formula 514FRP.

$$L_{534FRP} = L_{514FRP} + L_{363FRP}$$
$$j_{534FRP} = j_{514FRP} + j_{363FRP}$$
$$g_{534FRP} = g_{514FRP} + g_{363FRP}$$
$$ans_{534FRP} = ans_{514FRP} + ans_{363FRP}$$

$$L_{535FRP} = L_{534FRP} + L_{363FRP}$$
$$j_{535FRP} = j_{534FRP} + j_{363FRP}$$
$$g_{535FRP} = g_{534FRP} + g_{363FRP}$$
$$ans_{535FRP} = ans_{534FRP} + ans_{363FRP}$$

Repeat to $L_{543FRP}, j_{543FRP}, g_{543FRP}, ans_{543FRP}$

Note—The reduced formulas have only been combined through the first generation of formula combinations and the part of the second generation that does not involve doubling one of the formulas. These second and third generation formulas can be added to make the combinations equal to those for the unreduced formulas; however, fewer and fewer new formulas will be generated as the series increases and generating the formulas may slow the application.

t. Generate one last formula that will be used in eliminating charts that contain only the axis colors (the line of colors that include the original two colors that were entered). There can be a number of these charts, which are all identical. To make a chart worthwhile it must contain the axis colors and at least three new colors. If, after generating all charts from the formulas above as described below, duplicate charts can be recognized and eliminated, it will not be necessary to use this axis chart or to count the colors on each chart, as described below. The axis formula is included here in case it is not possible, or not convenient, to have the application look at each chart and determine which are identical.

The formula for the pole chart is not numbered like the others since it will not be one of the final palettes. Multiplying one of the original formulas by 20 and adding the result to a second one of the original formulas should assure that only the pole is generated. The multiplier can be increased if necessary.

$$L_{axis} = L_F + 20 * L_{2F}$$
$$j_{axis} = j_F + 20 * j_{2F}$$
$$g_{axis} = g_F + 20 * g_{2FRP}$$
$$ans_{axis} = ans_F + 20 * ans_{2F}$$

Note—Once all the charts have been generated and the number of colors on each chart counted, the number of colors on each chart (palette) from 1 through 543 will be compared to the number of colors on this axis chart and only those that contain more colors will be shown.

5. Put Second Set of Formulas in Correct Form

The $L_{FRP}$, $j_{FRP}$, $g_{FRP}$ and $ans_{FRP}$ for each of the formulas derived in Section 4 must also be divided by largest common devisor and the first digit made positive, as described in Section 3a and 3b.

6. Order Among OSA-UCS Color Planes

The 543 color planes (palettes) derived for a pair of colors by the formulas above will look best and be easy to search through if they are arranged by hue. The hue of an individual color is determined by the relationship between j and g, similarly the overall color of a plane is determined by the relationship between $j_{FRP}$ and $g_{FRP}$. Planes can be characterized by finding $j_{FRP}/g_{FRP}$ or $g_{FRP}/j_{FRP}$, or in certain instances between $L_{FRP}/j_{FRP}$ or $L_{FRP}/g_{FRP}$. Once a Ratio number representing its general color appearance is determined for each formula, the 543 formulas can be placed in hue order by those numbers.

Figure 7A:
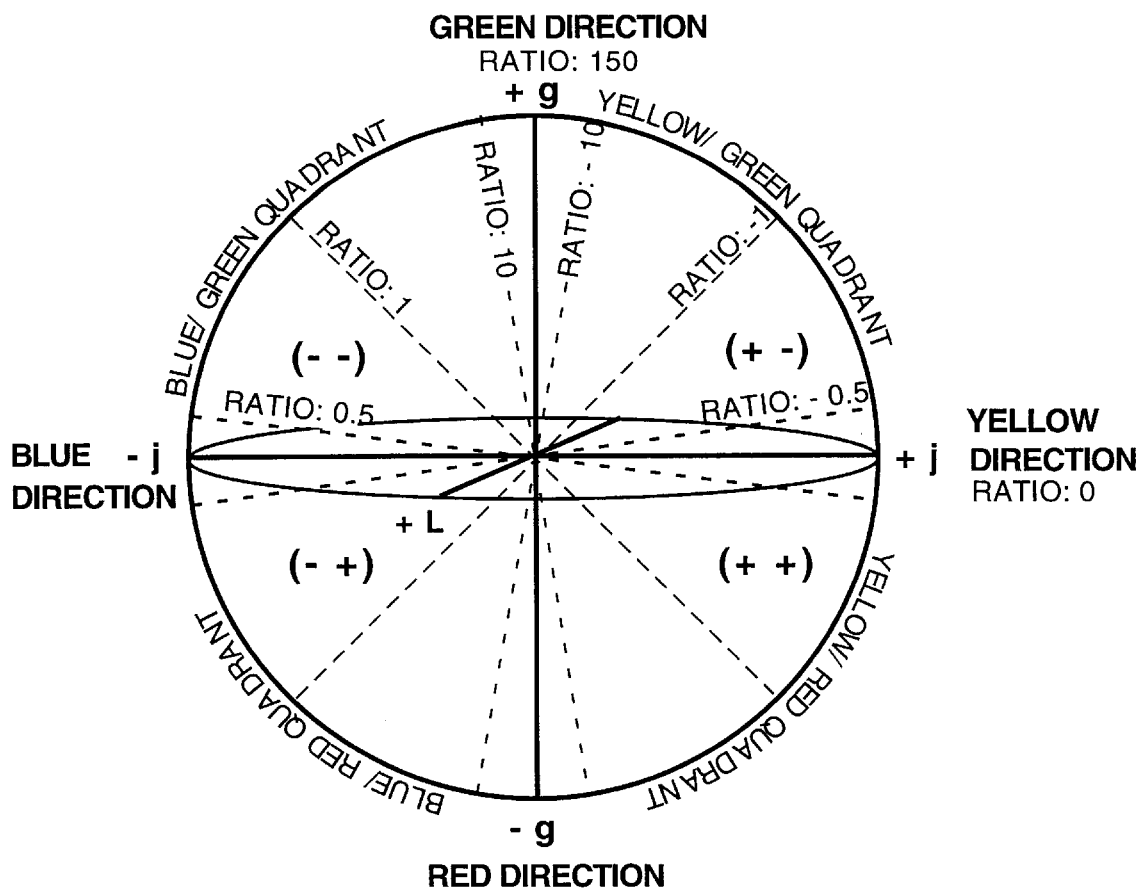
FIG. 7a illustrates the arrangement of planes within the OSA-UCS color solid when viewing the horizontal j,g plane from above.

FIG. 7a is schematic diagram of the OSA UCS color solid viewed from above, i.e., looking down on the middle lightness plane with the yellow/blue direction horizontal and the red/green direction vertical. For simplicity the color solid is shown as a sphere. The actual system is not spherical; its exact shape depends on the color gamut of the media under consideration. Notice also that the circle in FIG. 7a is rotated clockwise with respect to traditional representation of either degrees or x, y coodinates because the yellow direction is always placed to the right in OSA-UCS system and the plane on the yellow/blue axis has a Ratio ($j_{FRP}/g_{FRP}$) of zero.

A plane sliced vertically through the color solid exactly along the yellow/blue axis contains a gray scale in the center with all the unitary yellows on one side and all the unitary blues on the other. The unitary yellows and blues are defined as hues in which g=0. It should be noted that in the OSA-UCS system the blue on the yellow/blue axis is not the hue usually selected as a pure blue. The same is true of the red and green on the red/green axis. The system was devised for uniform color spacing without regard to where the primaries would fall. For this reason these axes should be thought of as indicating color directions, not pure hues. The fact that colors usually selected as primaries are not placed opposite one another on the main axes of the solid does not matter since this invention displays all planes in the solid, including colors considered to be complementary to one another.

A series of planes sliced parallel with the yellow/blue axis will contain hues that become progressively greener until they end with a plane that contains only a green, or become increasingly red until they end with a plane that contains only a red. Similarly planes sliced parallel with the red/green axis become increasingly yellow or blue. While the Ratio of the yellow/blue direction is 0, the red/green direction is arbitrarily assigned a Ratio of 150.

Figure 7B:
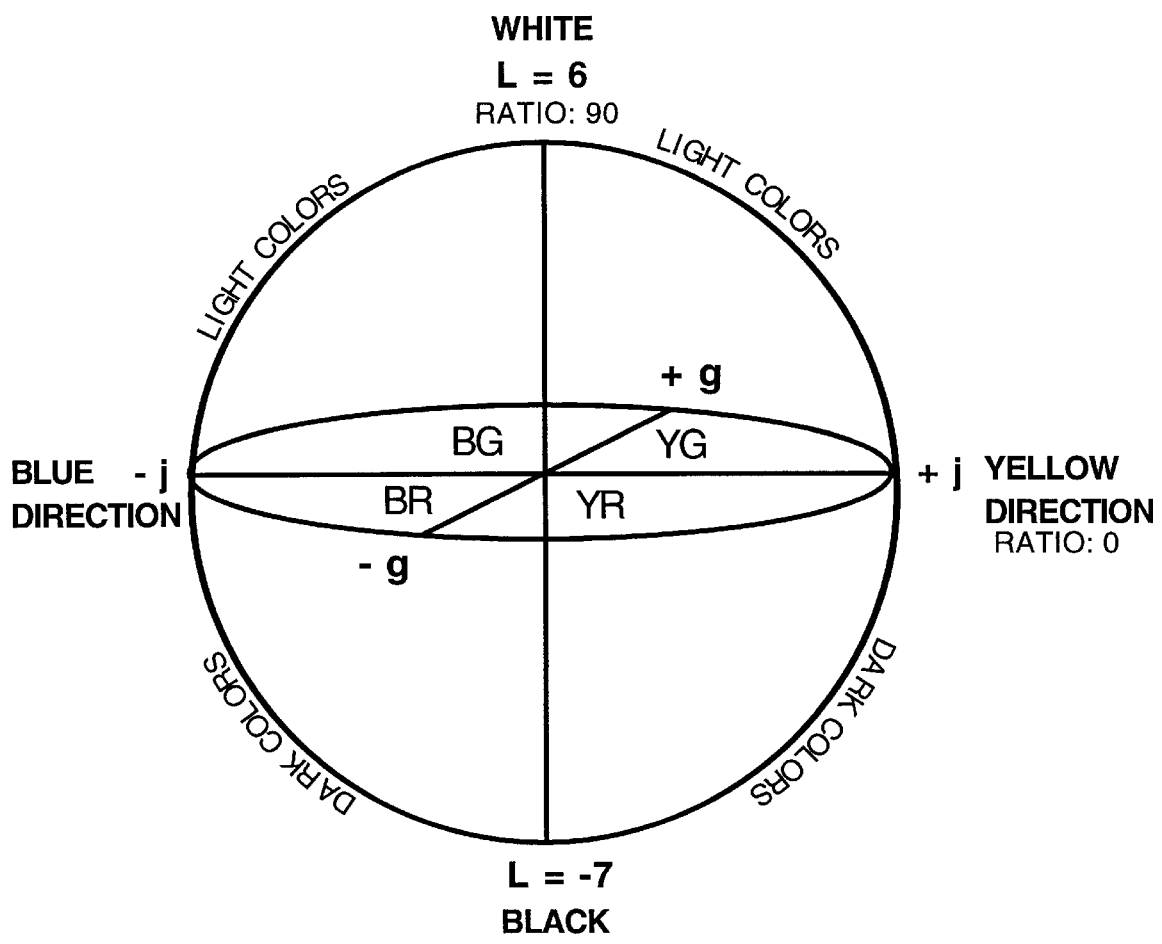
FIG. 7b illustrates of the arrangement of planes within the OSA-UCS solid when viewing the vertical L, j plane from the red, or –g, side.

FIG. 7b is a schematic diagram of the system viewed from its red side (-g) with the lightness scale vertical. When the solid as viewed in FIG. 7b is sliced horizontally each plane contains a range of all hues that have the same lightness. These planes are arbitrarily assigned the Ratio of 90. The two assigned Ratios, 150 and 90, combined with the ratio 0, are necessary as designations for planes in which $g_{FRP}$ or $L_{FRP}$ or $j_{FRP}$ is zero and are selected so the Ratio of a plane will indicate the type of colors on that plane. Planes whose Ratio is a decimal lie near the yellow/blue axis, while planes with increasingly large whole number Ratios approach the red/green axis, as shown in FIG. 7a.

The sign of the Ratio indicates the hue quadrants through which the plane passes. If both signs in a formula are the same (++ or --), the Ratio will be positive and the plane slices through the yellow/red and blue/green quadrants of the solid. If the signs in the formula are both positive the plane tilts one way in lightness, while if both signs are negative the plane tilts in the opposite direction in lightness. When the signs in the formula are different, the Ratio is negative and the plane slices through the yellow/green and blue/red quadrants, tilting in lightness depending on which sign is positive and which is negative.

If the the user enters two grays, they lie on the vertical gray scale in the center of the OSA-UCS solid defining it as the axis around which every plane in the series will rotate. In this case every plane will be vertical and, since each plane slices through the whole solid, they will rotate halfway around the circle in FIG. 5a from Ratio 0 to Ratio 0 again.

All planes in a set of planes rotate around an axis established by the two colors entered by the user. The angle of the axis within the color solid determines the number of planes in the set that will contain a significant number of colors and the particular colors that appear on each plane.

There are two types of formulas that result in vertical planes, ones in which $L_{FRP}$ is zero while $j_{FRP}$ and $g_{FRP}$ are either positive or negative integers, and another type where $j_{FRP}$ is a positive or negative integer while $L_{FRP}$ and $g_{FRP}$ are zero or where or $g_{FRP}$ is a positive or negative integer while $L_{FRP}$ and $j_{FRP}$ are zero. When these formulas equal zero, there will be a gray scale in the center of the plane with complementary colors displayed on each side of it. There is only one type of formula that results in a horizontal plane, i.e., when $L_{FRP}$ is an integer and $j_{FRP}$ and $g_{FRP}$ are zero. All colors on the plane have the same lightness. If the formula for the horizontal plane equals zero, the colors are on the middle plane of the solid. There will always be at least one vertical plane in every set of planes; however, there will not often be a horizontal plane in the set.

7. Determining Ratios for Color Planes

Each formula in the set of formulas derived from a pair of entered colors represents a plane slicing through a different region of color space. These planes are placed in order based on the hue region that particular plane passes through. The preferred method, as described above, is to find the ratio between the two attributes, usually $j_{FRP}$ and $g_{FRP}$, that represent hue in each formula. Provision must be made for cases where $g_{FRP}$ is zero or when both $j_{FRP}$ and $g_{FRP}$ are zero in a particular formula. There are also cases where $j_{FRP}$ or $g_{FRP}$ will be zero in all the formulas derived from the pair of colors. These cases are resolved by referring back to the first set of three formulas that were derived from the two colors entered by the user. For simplicity the subscripts are omitted in the following description; however, reference is to the L, j, and g of the formulas for planes.

The method for obtaining these formulas, given on page 13, is summarized in FIG. 8a. FIG. 8b illustrates the effect of the method when the user enters two colors that differ only in lightness, such as −6, 2, 2 and 3, 2, 2. The areas hatched with horizontal lines identify the digit in each of the three formulas that the method sets to zero. Using the instructions in FIG. 8a the three formulas are: 0L+1j+0g=2, 0L+0j+1g=2, and 0j+9j+0g=18. After reduction Formulas 1 and 3 are identical. Since g is zero in Formula 1, the Ratio of 150 is assigned to the plane. Since j is zero in Formula 2 its Ratio is 0. The vertical Formula 1 plane lies near the red/green axis while the vertical Formula 2 plane lies near the yellow/blue axis axis. Notice that L will be zero in all formulas in the set, but after combination of the three formulas neither j or g will be zero. The Ratio for other planes in this series are found by j/g.

In FIG. 8c the colors selected by the user differ only in yellowness, such as −4, 2,−4 and −4, 0, −4. Using the diagram in FIG. 8a, since j is zero in Formula 1 and 3, L is zero in Formula 2. The three formulas are: 0L+0j+2g=−8, 0L+0j+1g=−4, and 1L+0j+0g=−4. Formulas 1 and 2 are identical. In Formula 3, since j and g are zero the plane is horizontal and assigned a Ratio of 90. FIG. 8c shows that j will be zero in any formula made from a combination of these formulas, so the Ratios of the other planes in the set are determined by L/g. In the formula given in Formulas 1 and 2 L/g will equal zero, so the Ratio of that plane is 0.

In FIG. 8d the colors selected by the user differ only in greenness, an example is −2, −2, 5 and −2, −2, 2. FIG. 8a shows that since g is zero in Formula 1 and 2, j is zero in Formula 3. The formulas are: 0L+1j+0g=−2 , −3L+0j+0g=6 and 1L+0j+0g=−2. After reduction Formulas 2 and 3 are identical and both j and g are zero, so this is a horizontal plane with a Ratio of 90. FIG. 8d shows that g will be zero in all formulas, so the Ratios of the other formulas in this series are determined by L/j. In the case of Formula 1, L/j=0, so its Ratio is 0.

In the following instances one instead two of the three attributes of the entered colors are the same.

FIG. 8e shows the result if the colors have the same lightness, such as −2, −3, −5 and −2, −6, 4. The g in Formula 2 is zero, making j zero in Formula 3. Formulas 2 and 3 are identical and since j and g are zero, the Ratio is 90. The two colors have the same lightness and FIG. 8e shows that all combinations of the three formulas will result in the same ratio between j and g; therefore, the Ratios of the other formulas in this series are determined by L/j.

FIG. 8f shows that if the two colors have the same blue content, such as −2, −3, −5 and −4, −3, 4, g in Formula 1 is zero and L in Formula 3 is zero. Formulas 1 and 3 are identical and since g is zero the Ratio is 150. In Formula 2 j is zero so its Ratio is 0. The Ratios for the other formulas in this series are determined by j/g.

FIG. 8g shows that if colors have the same green content, such as −2, −3, 4 and −4, −4, 4, Formulas 1 and 2 are identical and since j is zero the Ratio is 0. In Formula 3 where g is zero, the Ratio is 150. The Ratio of other formulas in this series is determined by j/g.

No other configurations are possible. The original three formulas (reduced and the first digit in the formula made positive) are: $L_{361FRP}$, $j_{361FRP}$, $g_{361FRP}$; $L_{362FRP}$, $j_{362FRP}$, $g_{362FRP}$; and $L_{363FRP}$, $j_{363FRP}$, $g_{363FRP}$. They are used in the following calculations to take care of the instances above when one or more digit in a formula is zero. For Formula 1 through Formula 543 use the following to find Ratios:

Ratio$_1$: If $j_{361FRP}$=0 and $g_{361FRP}$=0, put 90;
if $j_{361FRP}$=0 and $j_{363FRP}$=0, put $L_{FRP}/g_{FRP}$;
if $g_{361FRP}$=0 and $g_{362FRP}$=0, put $L_{FRP}/j_{FRP}$;
if $g_{362FRP}$=0 and $j_{363FRP}$=0, put $L_{FRP}/j_{FRP}$;
if $g_{361FRP}$=0, put 150; otherwise put $j_{361FRP}/g_{361FRP}$.
Continue to:
Ratio$_{543}$: If $j_{543FRP}$=0 and $g_{543FRP}$=0, put 90;
if $j_{361FRP}$=0 and $j_{363FRP}$=0, put $L_{543FRP}/g_{543FRP}$;
if $g_{361FRP}$=0 and $g_{362FRP}$=0, put $L_{543FRP}/j_{543FRP}$;
if $g_{362FRP}$=0 and $j_{363FRP}$=0, put $L_{543FRP}/j_{543FRP}$;
if $g_{543FRP}$=0, put 150; otherwise put $j_{543FRP}/g_{543FRP}$ If an axis formula and chart is used, the axis formula is assigned a ratio of 200. (Ratio$_{axis}$=200.) If it is more convenient to have it be the first chart in the series, it must be positive so it will be generated first:

If Ratio$_{axis}$<0, Ratio$_{axis}$*−1.

If it is more convenient to have it be the last chart in the series then:

If Ratio$_{axis}$>0, Ratio$_{axis}$*−1.

7. Eliminate Formulas in Which All Attributes Are zero

When $L_{FRP}$, $j_{FRP}$, and $g_{FRP}$ are zero Excel will give ###. All but one of these cases is eliminated in Excel by making these cases blank. Then all but one instance can be filtered out as duplicates. The formulas used in Excel are below.

Ratio $2_1$: If ISERROR Ratio$_1$, put nothing; otherwise put Ratio$_1$
Continue to:
Ratio $2_{543}$: If ISERROR Ratio$_{543}$, put nothing; otherwise put Ratio$_{543}$
Then, if used:
Ratio$_{axis}$: If ISERROR Ratio$_{axis}$, put nothing; If Ratio$_{axis}$<0, put Ratio$_{axis}$*$^{-1}$; otherwise put Ratio$_{axis}$.

8. Eliminate Duplicate Formulas

Filter the list of 543 formulas, the axis formula and Ratios numbers to eliminate duplicate formulas. In Excel this is done with the Advanced Filter command, which places the much shorter filtered list of formulas in another set of cells. The length of this list will vary depending on the original pair of colors. It may be around 40 formulas or as much as about 200 formulas. Duplicates and blanks can be eliminated at the same time.

9. Sort Formulas

Sort this shortened list by the descending order of the numbers in Ratio from Ratio$_{axis}$ through Ratio$_{XXX}$. This puts formulas that will generate similar colors near one another. The color of the axis chart does not matter because it will not be among the charts, i.e. palettes, that will be shown.

10. Using Formulas to Place Colors on Charts

The appropriate formulas have been obtained and placed in order, now charts are constructed that contain OSA-UCS colors generated by each formula. The colors on each plane are generated by multiplying the formula for the plane by the levels of L (6 through −7) versus j (−7 through 12) to go on a j chart, or L versus g (−10 through 6) to go on a g chart, or j versus g to go on an L chart, depending on which is appropriate. The color gamut described above and shown in FIGS. 8, 9, and 10 is an example of the range of colors that can be achieved in print or paint. A different gamut is necessary to cover the colors that can be produced on a color monitor or television set. This additive color gamut is an option in the area labeled 1 on the first computer screen in FIG. 3.

The following are considerations in determining whether j chart, or g chart, or L chart should be used in displaying the colors on a plane:

The first choice is to use a j Chart; however, when g is zero, a g Chart must be used; and if j and g are 0, or if very different colors are next to one another on both the j and g charts, an L Chart must be used to indicate that the two colors are not near one another in color space.

(1) The j charts are arranged so L is vertical with the lightest row of colors (L=6) at the top and the darkest row of colors (L=−7) at the bottom of the chart. j runs horizontally across the top of the chart with the left column being j=−6 and the right column j=12. See FIG. 8.

(2) The g charts are arranged so L is vertical with the lightest row of colors (L=6) at the top and the darkest row of colors (L=−7) at the bottom of the chart. g runs horizontally across the top of the chart with the left column being g=−10 and the right column g=6. See FIG. 9.

(3) The L charts are arranged so g is vertical with the largest positive row of colors (g=6) at the top and the negative row of colors (g=−10) at the bottom of the chart. j runs horizontally across the top of the chart with the left column being j=−6 and the right column j=12. See FIG. 10.

a. j Charts

In Excel three cells (in addition to the cells that will contain the colors for that plane) are used to select the appropriate chart type.

(1) Cell 1: A zero is entered in the first cell if the formula g is zero; otherwise, the difference between the g of the color that would appear in the first cell of the j table and the g of the color that will appear in the cell on its right, is entered. (It doesn't matter if these numbers include decimals.)

If g=0, put 0, otherwise put $(\text{ans}_{FRP}-(L_{FRP}{}^*6+j_{FRP}{}^*-6)/g_{FRP})-(\text{ans}_{FRP}-(L_{FRP}{}^*6+j_{FRP}{}^*-5)/g_{FRP})$ (2) Cell 2: Place a zero in the cell if the formula g is zero; otherwise, the difference between the g of the first color and the g of the color that would appear in the cell directly below it, is entered.

If g=0, put 0, otherwise put $(\text{ans}_{FRP}-(L_{FRP}{}^*6+j_{FRP}{}^*-6)/g_{FRP})-(\text{ans}_{FRP}-(L_{FRP}{}^*5+j_{FRP}{}^*-6)/g_{FRP})$ (3) Cell 3: Place zero in the cell if the formula g is zero; if both the absolute number given in Cell 1 and the absolute number in Cell 2 are equal to, or less than, 2; put 1; otherwise put zero.

If g=0, put 0, if absolute Cell 1 and absolute Cell 2<=2, put 1; otherwise put 0.

Or combined:

j Chart formula: If g=0, put 0; if both $(\text{ans}_{FRP}-(L_{FRP}{}^*6+j_{FRP}{}^*-6)/g_{FRP})-(\text{ans}_{FRP}-(L_{FRP}{}^*6+j_{FRP}{}^*-5)/g_{FRP})$ and $(\text{ans}_{FRP}-(L_{FRP}{}^*6+j_{FRP}{}^*-6)/g_{FRP})-(\text{ans}_{FRP}-(L_{FRP}{}^*5+j_{FRP}{}^*-6)/g_{FRP})<=2$, put 1; otherwise put 0.

Considerations when constructing the j charts:

(1) exclude formulas where g is zero, (2) exclude formulas where the j Chart formula results in a zero.

(3) restrict the colors to those that are represented by whole UCS numbers, (4) restrict the g's to those that fall within the color gamut at that particular lightness level and amount of yellowness/blueness. See FIG. 9.

Note—Some cells on the charts are outside the gamut of achievable color and these cell will be blank in all formulas. The blank cells and the gamut of print and paint colors achievable in each cell of a j chart are shown in FIG. 9.

Provide for the considerations above and then in each cell of each j chart put:

(1) the L for the appropriate lightness row, (2) the j for the appropriate j column and (3) the g that is obtained by multiplying the formula L by the appropriate lightness level (from 6 through −7), adding the product of the formula j multiplied by the appropriate j level (−6 through 12), next subtracting the result from the formula answer, and then dividing that result by the formula g.

Example: In the j chart to find the g for cell L6, j0 use the following formula (See FIG. 9):

If $g_{FRP}=0$, put nothing; if Chart j formula=1, and if $(\text{ans}_{FRP}-(L_{FRP}{}^*6+j_{FRP}{}^*0)/g_{FRP})$ is an integer, and is>1, but<2, put $(\text{ans}_{FRP}-(L_{FRP}{}^*6+j_{FRP}{}^*0)/g_{FRP})$; otherwise put nothing.

Note—If it is possible to eliminate any duplicate charts at this point, use of the axis chart and counting colors on every j chart is not necessary. Otherwise, count the colors on each j chart. Compare the number of colors on each chart with the number given for the total number of colors on the axis chart. Eliminate charts and formulas that are blank or where the chart contains no more colors than on the axis chart. (If it is possible to eliminate all duplicate charts at this point, use the axis chart is not necessary.)

On each j chart (screen) put:

(1) j Chart;

(2) less conspicuously, the formula for that chart;

(3) Ratio for that formula;

(4) the UCS notation for each color on the chart in a separate screen reached by selecting a color on the third screen.

Use this process for all the formulas in the shortened, filtered list.

b. g Charts

In Excel just as in the case of the j charts, three cells are used to determine whether the g chart is the correct one to display the chart. The information in the three cells combined in one formula is:

g Chart formula: If j=0, put 0; if j chart formula=1, put 0; if both $(\text{ans}_{FRP}-(L_{FRP}{}^*6+g_{FRP}{}^*-10)/j_{FRP})-(\text{ans}_{FRP}-(L_{FRP}{}^*6+g_{FRP}{}^*-9)/j_{FRP})$ and $(\text{ans}_{FRP}-(L_{FRP}{}^*6+g_{FRP}{}^*-10)/j_{FRP})-(\text{ans}_{FRP}-(L_{FRP}{}^*5+g_{FRP}{}^*-10)/j_{FRP})<=2$, put 1; otherwise put 0.

Considerations when constructing the g charts:

(1) exclude formulas where j is zero, (2) exclude formulas where the g Chart formula, given above, results in zero.

(3) restrict the colors to those that are represented by whole UCS numbers, (4) restrict the j's to those that fall within the color gamut at that particular lightness level and amount of redness/greenness. See FIG. 9.

Note—Some cells on the charts are outside the gamut of achievable color and these cell will be blank in all formulas. These blank cells and the gamut of color possible each cell of a g chart are shown in FIG. 10 Note that in FIGS. 9, 10, and 110 the gamut is given for g in each cell on the j charts, for j onthe g charts and for L on the L charts.

Provide for the considerations above and then in each cell of each g chart put:

(1) the L for the appropriate lightness row, (2) the g for the appropriate g column and (3) the j that is obtained by multiplying the formula L by the appropriate lightness level (from 6 through −7), adding the product of the formula g multiplied by the appropriate g level (−10 through 6), next subtracting the result from the formula answer, and then dividing that result by the formula j.

Example: In the g chart to find j for cell L6, g0 (See FIG. 9):

If $j_{FRP}=0$, put nothing; if g Chart formula=1, and if $(\text{ans}_{FRP}-(L_{FRP}{}^*6+g_{FRP}{}^*0)/j_{FRP})$ is an integer, and is >−1, but <3, put $(\text{ans}_{FRP}-(L_{FRP}{}^*6+g_{FRP}{}^*0)/j_{FRP})$; otherwise put nothing.

Note—If is possible to eliminate all duplicate charts at this point, use of the axis chart and counting colors on every chart is not necessary. Otherwise, count the colors on each g chart. Compare the number of colors on each chart with the number given for the total number of colors on the axis chart. Eliminate charts and formulas that are blank or where the chart contains no more colors than on the axis chart.

On the the g chart (screen) put:

(1) g Chart;

(2) less conspicuously, the formula for that chart;

(3) Ratio for that formula.

(4) the UCS notation for each color on the chart in a separate screen reached by selecting a color on the third screen.

Use this process on all the formulas in the shortened, filtered list.

c. L Chart

Considerations when constructing the L charts:

(1) exclude formulas where L is zero, (2) exclude formulas where either the j Chart formula or the g Chart formula equal one (These will have been plotted on either j or g charts);

(3) restrict the colors to those that are represented by whole OSA-UCS numbers, (4) restrict the L's to those that fall within the color gamut at that particular yellowness/blueness level and that amount of redness/greenness. See FIG. 11.

Note—Some cells on the charts are outside the gamut of achievable color and these cell will be blank in all formulas. The blank cells and the gamut of color possible in each cell of a L chart are shown in FIG. 10.

Provide for the considerations above and then in each cell of each L chart put:

(1) the g for the appropriate redness/greenness row, (2) the j for the appropriate yellowness/blueness column and (3) the L that is obtained by multiplying the formula g by the appropriate g level (from 6 through 10), adding the product of the formula j multiplied by the appropriate j level (−6 through 12), next subtracting the result from the formula answer, and then dividing that result by the formula L.

Example: In the L chart to find L for cell g6, j0. (See FIG. 11):

If $L_{FRP}=0$, put nothing; if j Chart formula=0 and g Chart formula=0, and if $(ans_{FRP}-(g_{FRP}{}^*6+j_{FRP}{}^*0)/L_{FRP})$ is an integer, and is >−4, but <1, put $(ans_{FRP}-(g_{FRP}{}^*6+j_{FRP}{}^*0)/L_{FRP})$; otherwise put nothing.

Note—If it is possible to eliminate any duplicate charts at this point, use of the axis chart and counting colors on every chart is not necessary. Otherwise, count the colors on each L chart. Compare the number of colors on each chart with the number given for the total number of colors on the axis chart. Eliminate charts and formulas that are blank or where the chart contains no more colors than on the axis chart.

On the L chart (screen) put:

(1) L Chart;

(2) less conspicuously, the formula for that chart;

(3) Ratio for that formula.

(4) the UCS notation for each color on the chart in a separate screen reached by selecting a color on the third screen.

Use this process for all the formulas in the shortened, filtered list. Note—Although the L's, j's and g's were obtained in different orders depending on which chart was used, the numbers must be in the L, j, g order to be able to retrieve the appropriate CIELAB data and then RGB data. This is also the order that must be used to label colors in the final display.

11. The software embodiment of this invention includes several ways to save and to make these palettes, or individual colors from the palettes, available for reproduction or for use in graphic applications.

a. The user can select SAVE under the FILE menu to save any set of palettes.

b. The user can select SAVE AS under the FILE menu to convert a palette to a PICT file that can be opened in any computer applications that accept PICT files.

c. An individual color can be selected and copied by selecting COPY from the EDIT menu and then be pasted into a palette in graphic applications that allow users to make and save palettes.

12. An Alternative to the Method Described Above for Arranging Color Palettes

In writing the software that makes this system available to users it was decided that the set of palettes derived from the original two colors should be arranged so the groups of colors from palette to palette flow in a logical sequence. This makes it easier for users to search the set of palettes to find the color grouping most useful to them. The software described above accomplishes this by arranging the palettes by the ratio j (yellowness/blueness) divided by g (redness/greenness) and, in certain instances, L (lightness) divided by j or g. However, with some modification the software could arrange the palettes by the degrees of separation between the planes since the planes rotate around a axis running through the original two colors.

The method using the ratio j/g (and occasionally L/j or L/g) was selected for use in the software because it appears to afford a smoother visual transition from plane to plane, but the method of sorting by degrees is also included in this patent application. If the alternate method is chosen, the formulas that are used to derive the colors on each plane are created in the same manner as described above, reduced by a common divisor if possible, and sorted to eliminate duplicates.

One of the first three formulas, the one defining the vertical plane, is chosen as the first plane. The colors are derived for that plane and also for another plane using the method described above. Three colors that do not fall in a straight line, are selected from the vertical plane and from the second plane These six colors are entered and used to obtain vectors for the two planes. From the two vectors the degrees (or radians) between the two planes are calculated. This would be repeated, finding the degrees between the vertical plane and each of the other planes. The planes can then be sorted by the number of degrees from the vertical plane.

Example: The three colors on the vertical plane and on the second plane are:

| | |
|---|---|
| $L_1, j_1, g_1$ | $2L_1, 2j_1, 2g_1$ |
| $L_2, j_2, g_2$ | $2L_2, 2j_2, 2g_2$ |
| $L_3, j_3, g_3$ | $2L_3, 2j_3, 2g_3$ |
| Vector reference plane: | Vector new plane |
| $L_1 - L_2 = L_4, j_1 - j_2 = j_4, g_1 - g_2 = g_4$ | $2L_1 - 2L_2 = 2L_4, 2j_1 - 2j_2 = 2j_4, 2g_1 - 2g_2 = 2g_4$ |
| $L_2 - L_3 = L_5, j_2 - j_3 = j_5, g_2 - g_3 = g_5$ | $2L_2 - 2L_3 = 2L_5, 2j_2 - 2j_3 = 2j_5, 2g_2 - 2g_3 = 2g_5$ |
| Reference plane | New plane |
| $(L_4 * j_5) - (j_4 * L_5) = g_6$ | $(2L_4 * 2j_5) - (2j_4 * 2L_5) = 2g_6$ |
| $(g_4 * L_5) - (L_4 * g_5) = j_6$ | $(2g_4 * 2L_5) - (2L_4 * 2g_5) = 2j_6$ |
| $(j_4 * g_5) - (g_4 * j_5) = L_6$ | $(2j_4 * 2g_5) - (2g_4 * 2j_5) = 2L_6$ |
| $g_6 * 2g_6 = g_7 \quad j_6 * 2j_6 = j_7$ | $L_6 * 2L_6 = L_7$ |
| $g_7 + j_7 + L_7 = L, j, g_{sum}$ | |

$(SQRT((g_6{}^*g_6)+(j_6{}^*j_6)+(L_6{}^*L_6)))=length_1$ $(SQRT((2g_6{}^*2g_6)+(2j_6{}^*2j_6)+(2L_6{}^*2L_6)))=length_2$ $length_1{}^*length_2=length_3$ $L,j,g_{sum}/length_3=Cos\ theta$ $ACOS(Cos\ theta)=radians$ $(radians/Pi)^*180=degrees\ clockwise$ $180-degrees\ clockwise=degrees\ counterclockwise$ 12. The following Appendix A gives the code for the embodiment of this invention in computer software written for a Macintosh computer.

```
// ================================================================
// LJGColorDefs.h
// ©1997 Studio 231 All rights reserved.                APPENDIX A
//
// Define the LJG color structures
// ================================================================ pragma once

// Define a "box-limits" type of gamut description struct GamutPlane
    {
    short   lowj;
    short   highj;
    short   lowg;
    short   highg;
    };

typedef struct GamutPlane GamutPlane;
typedef GamutPlane *GamutPlanePtr, **GamutPlaneHandle;

struct Gamut
    {
    short   lowL;
    short   highL;
    short   numPlanes;
    GamutPlane  planes[1];
    };

typedef struct Gamut Gamut;
typedef Gamut *GamutPtr, **GamutHandle;

// Define contants used when displaying palettes to the user const   short   LJGPaletteWidth     =   19;
const   short   LJGPaletteHeight    =   17;
const   short   LJGDefPalColWidth   =   28;
const   short   LJGDefPalColHeight  =   28;
const   short   LJGDefTableCols     =   3;

// Define an Ljg color struct LJGColor
    {
    short   L;
    short   J;
    short   G;
    short   valid;
    };

typedef struct LJGColor LJGColor;
typedef LJGColor    *LJGColorPtr,**LJGColorHandle;

// Define the combination of an Ljg color and its position on the screen struct LJGColorPlusPos
    {
    LJGColor    theColor;
    short   width;
    short   height;
    short   top;
    short   left;
    };

typedef struct LJGColorPlusPos LJGColorPlusPos;
typedef LJGColorPlusPos *LJGColorPlusPosPtr,**LJGColorPlusPosHandle;

// Define a palette of Ljg colors typedef LJGColor    LJGPalette[LJGPaletteHeight][LJGPaletteWidth];
typedef LJGPalette  LJGPalette;
typedef LJGPalette  *LJGPalettePtr,**LJGPaletteHandle;

// Define the possible chart (palette) types const   short   LJGChartTypeJ   =   0;
const   short   LJGChartTypeG   =   1;
const   short   LJGChartTypeL   =   2;

// Define the chart formula structure struct LJGFormula
    {
    short   L;
```

1

```
    short    J;
    short    G;
    short    ans;
    double   ratio;
    short    chartype;
};

typedef struct LJGFormula   LJGFormula;
typedef LJGFormula  *LJGFormulaPtr,**LJGFormulaHandle;

// Define chart structure used to display cells in our palette table struct LJGCellData
    {
    LJGPalette  palette;
    LJGFormula  formula;
    short       valid;
    };

// Define the our file save contents struct  LJGPaletteFileData
    {
    LJGFormula      formula;
    LJGColorPlusPos theColorList[1];
    };

typedef LJGPaletteFileData  LJGPaletteFileData;
typedef LJGPaletteFileData  *LJGPaletteFilePtr,**LJGPaletteFileHandle;

typedef struct LJGCellData  LJGCellData;
typedef LJGCellData *LJGCellDataPtr,**LJGCellDataHandle;

struct LJGFileData
    {
    Str255      gamutName;  // The gamut name
    Gamut       theGamut;   // The gamut used for this calc
    LJGColor    LJGColor1;  // Coordinate 1
    LJGColor    LJGColor2;  // Coordinate 2
    long        totCells;
    LJGCellData cells[1];
    };

typedef LJGFileData LJGFileData;
typedef LJGFileData *LJGFilePtr,**LJGFileHandle;
```

```
// ---------------------------------------------------------------
// UColorUtils.h
// ©1997 Studio 231 All rights reserved.
// ---------------------------------------------------------------
pragma once include "LJGColorDefs.h"

const   double  kBadRatio       = (-9999.0);
const   short   kOutOfGamutL    = 1;
const   short   kOutOfGamutJ    = 2;
const   short   kOutOfGamutG    = 3;
const   short   kOutOfGamutGen  = 4;

typedef struct
{
    short   l;
    short   h;
}ljglimits;

typedef struct
{
    short   lowg;
    short   highg;
    short   lowj;
    short   highj;
    double  cyval;
    double  exval;
    double  eyval;
    double  uval;
    double  ddval;
    double  tval;
    double  flval;
} planelimits;

class   UColorUtils {
public:
    static  Boolean     TranslateRGB2LJG(RGBColor &inRGBColor,LJGColor &outLJGColor );
    static  Boolean     TranslateLJG2RGB(LJGColor &inLJGColor, RGBColor &outRGBColor);
    static  short       CalcFormulas(LJGColor &inLJGColor1,LJGColor &inLJGColor2,LJGFormula outFormula[544]);
    static  void        AddFormulas(LJGFormula &inFormula1, LJGFormula &inFormula2, LJGFormula &outFormula);
    static  void        SubFormulas(LJGFormula &inFormula1, LJGFormula &inFormula2, LJGFormula &outFormula);
    static  void        ReduceByGCD(LJGFormula &inFormula);
    static  void        EnsurePositiveFormula(LJGFormula &inFormula);
    static  double      CalcRatio(LJGFormula &inFormula,LJGFormula &inFormula1S1, LJGFormula &inFormula1S2,LJGFormula &inFormula1S3)
    static  short       IsOutOfGamut(LJGColor &theLJGColor,ljglimits &limits);
    static  Boolean     DuplicateFormulas(LJGFormula &inFormula1,LJGFormula &inFormula2);
    static  Boolean     DuplicateColors(LJGColor &inLJGColor1,LJGColor &inLJGColor2);
    static  Boolean     DuplicateCellData(LJGCellData *theCellData,LJGCellData *tmpCellData);
    static  short       CalcPaletteColors(LJGCellData &theCellData,GamutHandle theGamutH);

protected:
};
```

```
// ----------------------------------------------------------
// UColorUtils.cp
// ©1997 Studio 231 All rights reserved.
// ---------------------------------------------------------- include "CColorApp.h"
include "UColorUtils.h"
#include <math.h>
include <stdio.h> extern PrefsRecord gPrefs;

// Describe the G-chart gamut limits ljglimits   gchartlimits[LJGPaletteHeight][LJGPaletteWidth] = {
              99,0,99,0,99,0,99,0,99,0,99,0,99,0,99,0, 0,2,0,0, 99,0,99,0,99,0,99,0,99,0,99,0,
              99,0,99,0,99,0,99,0,99,0,99,0, 0,2,-1,5,-1,8,-2,9,-2,8,-2,5,0,2, 99,0,99,0,99,0,99,0,
              99,0,99,0,99,0,99,0,99,0,99,0, -1,6,-2,7,-2,10,-3,11,-3,12,-3,10,-3,9,-3,6,-1,4, 99,0,99,0,99,0,99,0,
              99,0,99,0,99,0,99,0, -1,4,-2,9,-2,9,-3,11,-3,11,-4,11,-4,11,-4,9,-4,9,-3,7,-1,3, 99,0,99,0,99,0,99,0,
              99,0,99,0, 2,2,-1,6,-2,10,-3,10,-3,10,-3,10,-3,10,-4,10,-5,10,-5,10,-5,8,-5,8,-2,6,0,2, 99,0,99,0,
              99,0, 3,3, 2,4,-2,9,-2,9,-3,9,-3,9,-4,9,-4,9,-5,9,-5,9,-6,9,-6,9,-6,7,-4,7,-1,4, 99,0,99,0,
              99,0, 2,6,0,8,-2,8,-3,8,-3,8,-4,8,-4,8,-5,8,-5,8,-6,8,-6,8,-6,8,-6,8,-6,8,-4,5,-1,4, 99,0,99,0,
              99,0, 1,7,2,7,-2,7,-3,7,-3,7,-3,7,-4,7,-5,7,-5,7,-6,7,-6,7,-6,7,-5,7,-3,7,0,3, 99,0,99,0,
              0,6,0,6,-2,6,-2,6,-2,6,-3,6,-3,6,-4,6,-5,6,-5,6,-6,6,-6,6,-6,6,-6,6,-2,5,-2,2, 99,0,99,0,
              99,0, 1,3,1,4,-1,5,-2,5,-3,5,-3,5,-4,5,-4,5,-5,5,-5,5,-6,5,-6,5,-3,5,-3,5, 99,0,99,0,99,0,
              99,0, 1,3,2,4,1,4,-1,4,-1,4,-2,4,-2,4,-4,4,-5,4,-5,4,-5,4,-4,4,-4,4, 99,0,99,0,99,0,99,0,
              99,0, 2,4,2,3,1,3,0,3,-1,3,-1,3,-3,3,-3,3,-5,3,-5,3,-5,3, 99,0,99,0,99,0,99,0,99,0,99,0,
              99,0,99,0, 2,2,0,2,-2,2,-2,2,-4,2,-4,2,-4,2,-4,2, 99,0,99,0,99,0,99,0,99,0,99,0,99,0,
              99,0,99,0,99,0,99,0,99,0,99,0, -3,1,-3,1,-3,1, 99,0,99,0,99,0,99,0,99,0,99,0,99,0,99,0,
              99,0,99,0,99,0,99,0,99,0,99,0,99,0,99,0,99,0,99,0,99,0,99,0,99,0,99,0,99,0,99,0,
              99,0,99,0,99,0,99,0,99,0,99,0,99,0,99,0,99,0,99,0,99,0,99,0,99,0,99,0,99,0,99,0};

// Describe the J-chart gamut limits ljglimits   jchartlimits[LJGPaletteHeight][LJGPaletteWidth] = {
              99,0,99,0,99,0,99,0,99,0,99,0, 0,1,0,0, 99,0,99,0,99,0,99,0,99,0,99,0,99,0,99,0,
              99,0,99,0,99,0,99,0, 0,2,-2,2,-3,3,-3,3,-3,3,-2,2,-2,2,-1,1,-1,1,-1,0,0, 99,0,99,0,99,0,
              99,0,99,0,99,0, -1,3,-3,3,-4,4,-4,4,-4,4,-4,4,-4,4,-4,3,-4,3,-3,2,-2,2,-2,2,-2,1,-1,-1,-1,0,0,
              99,0,99,0, -1,3,-3,4,-5,4,-6,5,-6,5,-6,5,-6,5,-6,4,-5,4,-5,4,-5,3,-5,3,-3,1,-3,1, 99,0,
              99,0, 0,4,-1,4,-5,4,-6,5,-7,5,-7,6,-7,6,-8,6,-7,5,-7,5,-7,5,-6,4,-6,4,-6,3,-6,2, 99,0,99,0,
              2,4,-1,4,-3,5,-5,5,-7,5,-7,6,-7,6,-8,6,-9,6,-8,6,-8,6,-7,5,-7,5,-7,5,-7,3,-7,3, 99,0,99,0,99,0,
              0,4,-2,4,-4,5,-6,5,-7,5,-7,6,-8,6,-8,6,-9,6,-9,6,-9,6,-9,4,-8,4,-8,4,-8,4, 99,0,99,0,99,0,99,0,
              0,4,-2,4,-3,4,-6,5,-7,5,-7,5,-8,6,-9,6,-9,6,-9,6,-9,5,-9,5,-9,5,-9,5, 99,0,99,0,99,0,99,0,99,0,
              0,4,-2,4,-3,4,-5,6,-8,6,-8,6,-10,6,-10,6,-10,6,-10,4,-10,4, 99,0,99,0,99,0,99,0,99,0,99,0,99,0,
              0,3,-1,3,-3,3,-5,5,-6,5,-7,5,-9,7,-9,5,-9,5,-8,5,-7,5, 99,0,99,0,99,0,99,0,99,0,99,0,99,0,99,0,
              99,0, -1,2,-2,4,-2,4,-4,4,-6,4,-7,4,-8,4,-8,4,-8,4, 99,0,99,0,99,0,99,0,99,0,99,0,99,0,99,0,99,0,
              99,0, -1,3,-1,3,-2,3,-3,3,-5,3,-6,3,-7,3,-7,3,-9,3, 99,0,99,0,99,0,99,0,99,0,99,0,99,0,99,0,99,0,
              99,0,99,0, -2,2,-2,2,-4,2,-4,2,-6,2,-6,2,-6,2, 99,0,99,0,99,0,99,0,99,0,99,0,99,0,99,0,99,0,
              99,0,99,0,99,0, -1,1,-1,1,-1,1,-1,1, 99,0,99,0,99,0,99,0,99,0,99,0,99,0,99,0,99,0,99,0,
              99,0,99,0,99,0,99,0,99,0,99,0,99,0,99,0,99,0,99,0,99,0,99,0,99,0,99,0,99,0,99,0,
              99,0,99,0,99,0,99,0,99,0,99,0,99,0,99,0,99,0,99,0,99,0,99,0,99,0,99,0,99,0,99,0};

// Describe the L-chart gamut limits ljglimits   lchartlimits[LJGPaletteHeight][LJGPaletteWidth] = {
              99,0,99,0,99,0,99,0, -2,0,0,1,-2,2,-2,2,-2,2,-1,1,0,1, 99,0,99,0,99,0,99,0,99,0,99,0,
              99,0,99,0, 0,1,-3,1,-3,2,-3,3,-3,3,-3,3,-3,3,-3,2,-3,2,-1,2,-1,1, 99,0,99,0,99,0,99,0,99,0,
              -2,1,-2,2,-4,2,-4,3,-4,3,-4,4,-4,4,-4,4,-4,4,-4,4,-4,4,-3,3,-2,3,-1,3,0,2, 99,0,99,0,99,0,99,0,
              -3,1,-5,2,-5,3,-5,4,-5,4,-5,4,-5,5,-5,5,-5,5,-4,4,-3,2,-4,-1,3,0,3,1,1,3, 99,0,99,0,99,0,
              -3,1,-5,2,-6,3,-6,4,-6,5,-6,5,-6,5,-6,5,-5,5,-5,5,-3,5,-3,5,-2,4,-1,4,1,1,2,2, 99,0,99,0,
              -3,0,-5,2,-6,3,-7,4,-7,4,-7,5,-7,5,-6,4,-5,5,-4,5,-3,5,-2,5,-1,5,1,2,2,4,2,3, 99,0,
              -3,1,-5,2,-6,3,-7,4,-7,5,-7,5,-7,6,-7,6,-6,5,-5,5,-3,5,-2,4,-1,5,0,5,1,5,2,4,3,4,4,4,
              99,0, -5,1,-6,3,-7,4,-7,4,-7,5,-7,5,-7,5,-6,5,-5,5,-3,5,-2,5,-1,5,0,5,1,4,2,4,3,4, 99,0,
              99,0, 0,0,-6,1,-6,3,-6,4,-6,5,-6,5,-6,5,-5,5,-4,5,-3,5,-1,4,0,4,1,4,2,4,3,3, 99,0,
              99,0,99,0, -3,1,-5,3,-6,4,-6,4,-6,4,-7,5,-6,5,-5,4,-4,4,-3,4,-2,4,-1,4,0,3,1,3,2,3,3,3, 99,0,
              99,0,99,0, 0,0,-3,1,-6,3,-6,4,-6,4,-6,4,-5,4,-4,4,-4,4,-2,4,-1,3,0,3,1,3,2,2, 99,0,
              99,0,99,0, 0,0,-3,2,-3,3,-5,3,-6,3,-6,3,-5,3,-4,3,-3,3,-3,3,-2,3,-1,3,0,3,1,3,2,2,2,2, 99,0,
              99,0,99,0,99,0, -1,0,-3,2,-4,3,-6,3,-6,3,-4,3,-3,2,-2,1,-2,1,-2,1,-2,1,2,0,2,1,2,2, 99,0,99,0,
              99,0,99,0,99,0, -2,1,-3,2,-3,2,-5,2,-5,2,-5,2,-4,2,-3,2,-2,2,-2,1,-1,1,1,1,1,1, 99,0,99,0,99,0,
              99,0,99,0,99,0,99,0, -2,-1,-2,-1,-3,-1,-3,-1,-5,-1,-2,0,-2,0,-2,0,-1,-1, 99,0,99,0,99,0,99,0,99,0,
              99,0,99,0,99,0,99,0,99,0, -2,-2,-2,-2,-2,-2,-2,-2,-2,-2,-2,-2,-2,-2,-2,-2, 99,0,99,0,99,0,99,0,99,0};

// The following table is used by the TranslateLJGtoRGB routine

>lanelimits   lplanes[14] = {
  //lowg  highg   lowj  highj   cy     ex      ey      u      dd      t        fl
     -1,    1,    -3,    1,    3.0,   0.25,   0.2,   0.1,   0.01,   0.0001,  2.0,     // L = -7
     -6,    2,    -4,    2,    4.0,   0.336,  0.2,   0.1,   0.01,   0.0001,  2.0,     // L = -6
     -9,    3,    -5,    3,    6.0,   0.3,    0.2,   0.1,   0.01,   0.0001,  2.0,     // L = -5
     -8,    4,    -5,    4,    9.0,   0.3,    0.2,   0.1,   0.01,   0.0001,  2.0,     // L = -4
     -9,    5,    -6,    5,   13.0,   0.32,   0.2,   0.1,   0.01,   0.0001,  2.0,     // L = -3
```

|     |    |     |     |       |      |      |     |      |        |      |           |
|-----|----|-----|-----|-------|------|------|-----|------|--------|------|-----------|
| -16,| 0, | -6, | 6,  | 16.0, | 0.4, | 0.2, | 0.1,| 0.01,| 0.0001,| 2.0, | // L = -2 |
| -9, | 6, | -6, | 7,  | 20.0, | 0.3, | 0.2, | 0.1,| 0.01,| 0.0001,| 2.0, | // L = -1 |
| -9, | 6, | -6, | 8,  | 26.0, | 0.3, | 0.3, | 0.04,| 0.01,| 0.005, | 1.0, | // L = 0  |
| -9, | 6, | -6, | 9,  | 30.0, | 0.4, | 0.2, | 0.1,| 0.01,| 0.0001,| 2.0, | // L = 1  |
| -8, | 6, | -5, | 10, | 39.0, | 0.4, | 0.2, | 0.1,| 0.01,| 0.0001,| 2.0, | // L = 2  |
| -6, | 5, | -4, | 11, | 48.0, | 0.4, | 0.2, | 0.1,| 0.01,| 0.0001,| 2.0, | // L = 3  |
| -4, | 4, | -3, | 12, | 58.0, | 0.4, | 0.2, | 0.1,| 0.01,| 0.0001,| 2.0, | // L = 4  |
| -3, | 3, | -2, | 9,  | 70.0, | 0.4, | 0.2, | 0.1,| 0.01,| 0.0001,| 2.0, | // L = 5  |
| 0,  | 1, | 0,  | 2,  | 82.0, | 0.4, | 0.2, | 0.1,| 0.01,| 0.0001,| 2.0  | }; // L = 6 |

```
ouble cy,ex,ey,bigx,bigz,bigL,lita,litb,redf,greenf,bluef;

/ ---------------------------------------------------------------
/ TranslateRGB2LJG
/
/ Translate a color in RGB space to one in Ljg space
/ Return TRUE if translation was successful
/ --------------------------------------------------------------- oolean
ColorUtils::TranslateRGB2LJG(RGBColor &inRGBColor, LJGColor &outLJGColor )

/ Descale the Mac rgb values
    double r = ((double)inRGBColor.red / 5120.0);
    r = pow(r,1.8);
    double g = ((double)inRGBColor.green / 5120.0);
    g = pow(g,1.8);
    double b = ((double)inRGBColor.blue / 5120.0);
    b = pow(b,1.8);

double X = (0.41254 * r) + (0.35815 * g) + (0.17740 * b);
    double Y = (0.21272 * r) + (0.71631 * g) + (0.07096 * b);
    double Z = (0.01933 * r) + (0.11938 * g) + (0.93431 * b);

double x;

if(X == 0.0)
            {
            x = 0.0;
            }
        else
            {
            x = X / (X + Y + Z);
            } double y;

if(Y == 0.0)
            {
            y = 0.0;
            }
        else
            {
            y = Y / (X + Y + Z);
            } double Yo = Y* ((4.4934 * (x * x)) + (4.3034 * (y * y)) - (4.276 * x * y) - (1.3744 * x) - (2.56439 * y) + 1.8103);
    double L,el,crisp;

if(Yo == 0.0)
            {
            el = -0.66666666;
            }
        else if(Yo < 0.0)
            {
            el = (pow((Yo * (-1.0)), 0.33333333) - 0.66666666) * (-1.0);
            }
        else if (Yo > 0.0)
            {
            el = (pow(Yo,0.33333333)) - 0.66666666;
            }
        if(Yo == 30.0)
            {
            crisp = 1.0;
            }
        else if (Yo < 30.0)
            {
            crisp = 1.0 - (0.842 * (pow((30.0 - Yo),0.33333333) / el));
            if(el < 0.0)
                {
                crisp = crisp * (-1.0);
                }
            }
        else if (Yo > 30.0)
```

```c
        {
            crisp = 1.0 + (0.042 * (pow((Yo - 30.0),0.33333333) / el));
        }
        L = ((5.9 * el * crisp) - 14.4) * 0.707;

double R = (0.799 * X) + (0.4194 * Y) - (0.1648 * Z);
    double crR;
        if(R < 0.0)
        {
            crR = (pow((R * (-1.0)),0.33333333)) * (-1.0);
        }
        else
        {
            crR = pow(R,0.33333333);
        }
    double G = (-0.4493 * X) + (1.3265 * Y) + (0.0927 * Z);
    double crG;
        if(G < 0.0)
        {
            crG = (pow((G * (-1.0)),0.33333333)) * (-1.0);
        }
        else
        {
            crG = pow(G,0.33333333);
        }
    double B = (-0.1149 * X) + (0.3394 * Y) + (0.717 * Z);
    double crB;
        if(B < 0.0)
        {
            crB = (pow((B * (-1.0)),0.33333333)) * (-1.0);
        }
        else
        {
            crB = pow(B,0.33333333);
        }
    //Calc g
    double lg = ((17.7 * crG) - (13.7 * crR) - (4.0 * crB)) * crisp;
    //Calc j
    double j = ((1.7 * crR) + (8.0 * crG) - (9.7 * crB)) * crisp;

// Round up or down as appropriate
    outLJGColor.L = (short)L;    // make a copy of the value without the fraction
    if(L < 0.0)
    {
        if(((double)outLJGColor.L - L) > 0.50)outLJGColor.L -= 1;
    }
    else
    {
        if((L - (double)outLJGColor.L) > 0.50)outLJGColor.L += 1;
    }
    outLJGColor.J = (short)j;    // make a copy of the value without the fraction
    if(j < 0.0)
    {
        if(((double)outLJGColor.J - j) > 0.50)outLJGColor.J -= 1;
    }
    else
    {
        if((j - (double)outLJGColor.J) > 0.50)outLJGColor.J += 1;
    }
    outLJGColor.G = (short)lg;   // make a copy of the value without the fraction
    if(lg < 0.0)
    {
        if(((double)outLJGColor.G - lg) > 0.50)outLJGColor.G -= 1;
    }
    else
    {
        if((lg - (double)outLJGColor.G) > 0.50)outLJGColor.G += 1;
    }

// We assume that any RGB color is a valid UCS color
    outLJGColor.valid = 1;

return true;
}
// ======================================================================
// TranslateLJG2RGB
//
// Derived from a FORTRAN program by David L. MacAdam, circa 1974
// by Robert C. Landrum 1997
//
// Translate a color in ljg space to one in RGB space
```

```
//  Return TRUE if translation was successful
// ---------------------------------------------------------------------

Boolean
JColorUtils::TranslateLJG2RGB(LJGColor &inLJGColor, RGBColor &outRGBColor)
{
    short    l = inLJGColor.L;
    short    j = inLJGColor.J;
    short    g = inLJGColor.G;
    short    planeindex = inLJGColor.L + 7;
    double   s = 0.1;

cy = lplanes[planeindex].cyval;
    cx = lplanes[planeindex].cxval;
    ey = lplanes[planeindex].eyval;
    double u  = lplanes[planeindex].uval;
    double dd = lplanes[planeindex].ddval;
    double t  = lplanes[planeindex].tval;
    double fl = lplanes[planeindex].flval;

double x1,x0,x1,x2;
    double z[26],xa,xx,el,crisp,xi,dl,ss,xc,yc,zc,r,fr,gr,fg,bl,fb,aa,bb,xg,xj,d,d2,d0,d1,ds;
    short  k;
    short  retval = 0;
    long   tmpl;

x2 = cy;
    x0 = ex;
    x1 = ey;

ds = t + 1.0;   // Make it greater than t

//
    // General statement of the technique used here:
    //
    // The input value is a known Ljg value (the target), along with a starting set of Yxy values based on the value of L
    // The object is to find a set of Yxy values that when used in the MacAdam formulas, will come within a low threshold
    //     (0.0001) of the target.
    // Test calculations of the target Ljg based on varying values of the initial Yxy values are performed as follows:
    // 1.  Ljg calculated based on the current (input) Yxy value
    // 2.  Ljg calculated based on (Y + 0.1)xy
    // 3.  Ljg calculated based on Y(x + 0.01)y
    // 4.  Ljg calculated based on Yx(y + 0.01)
    // 5.  The differences between the target and calculated L, j, and g values are recorded
    //     The differences between the input Ljg and Ljp based on and incremented elements of Yxy are recorded
    // 6.  New increment or decrement values are calculated for Y, x, and y based on these differences
    // 7.  The routine loops until the differences between the calculated Ljg and the input Ljg fall below 0.0001
    //
    // R.C. Landrum June 30 1997 ab13:
    if(retval == 200)
    {
        return false;
    }
    for(k=1;k<= 5;k++)
    {
        // Calculate Yo
        //xa= (x (4.4934x - 4.276y - 1.3744)) + (y (4.3034y - 2.56439)) + 1.8103
        xa = (x0 * ((x0 * 4.4934) - (x1 * 4.276) - 1.3744)) + (x1 * ((x1 * 4.3034) - 2.56439)) + 1.8103;
        // Yo = Y * xa
        xx = x2 * xa;
        if(xx == 0.0)
        {
            el = (2.0 / 3.0) * (-1.0);
        }
        else if(xx < 0.0)
        {
            el = (pow((xx * (-1.0)), 0.33333333) - (2.0/3.0)) * (-1.0);
        }
        else if (xx > 0.0)
        {
            el = (pow(xx,0.33333333)) - (2.0/3.0);
        }
        if(xx == 30.0)
        {
            crisp = 1.0;
        }
        else if (xx < 30.0)
        {
            crisp = 1.0 - (0.042 * (pow((30.0 - xx),0.33333333) / el));
            if(el < 0.0)
            {
                crisp = crisp * (-1.0);
```

```
        }
    else if (xx > 30.0)
        {
            crisp = 1.0 + (0.042 * (pow((xx - 30.0),0.33333333) / el));
        }
    el = el * crisp * 5.9;    // Calculate preliminary L xl = (el - 14.4) * 0.707;   //Calculate real L
    xi = (double)l; // xi = actual current L from loop
    dl = xi - xl;   // Calc difference between actual and calculated // Calculate CIE XYZ
    ss = x2 / x1;   // ss = (Y / y)
    xc = x0 * ss;   // CIE X = x * (Y / y)
    yc = x2;        // CIE Y = Y
    zc = (1.0 - x0 - x1) * ss;  // CIE Z = (1 - x - y) * (Y / y)

// Calculate RGB
    //R = 0.799X + 0.4194Y - 0.1648Z
    r = (0.799 * xc) + (0.4194 * yc) - (0.16498 * zc);
    // Precalc cube root of R
    if(r < 0.0)
        {
            fr = (pow((r * (-1.0)),0.33333333)) * (-1.0);
        }
    else
        {
            fr = pow(r,0.33333333);
        }
    //G = -0.4493X + 1.3265Y - 0.0927Z
    gr = (-0.4493 * xc) + (1.3265 * yc) + (0.0927 * zc);
    //Precalc cube root of G
    if(gr < 0.0)
        {
            fg = (pow((gr * (-1.0)),0.33333333)) * (-1.0);
        }
    else
        {
            fg = pow(gr,0.33333333);
        }
    //B = -0.1149X + 0.3394Y + 0.717Z
    bl = (-0.1149 * xc) + (0.3394 * yc) + (0.717 * zc);
    //Precalc cube root of Z
    if(bl < 0.0)
        {
            fb = (pow((bl * (-1.0)),0.33333333)) * (-1.0);
        }
    else
        {
            fb = pow(bl,0.33333333);
        }
    //Calc g
    aa = ((17.7 * fg) - (13.7 * fr) - (4.0 * fb)) * crisp;
    //Calc j
    bb = ((1.7 * fr) + (8.0 * fg) - (9.7 * fb)) * crisp;

switch(k)
        {
            case 1:     // Save original calculations for Ljg
                z[1] = xl;  // Actual current L in double precision
                z[2] = aa;  // g
                z[3] = bb;  // j
                z[5] = dl;  // Diff between actual and calculated L
                xg = (double)g;  // Get actual g from loop
                z[6] = xg - aa;  // Save Diff between actual g and calculated g
                xj = (double)j;  // Get actual j from loop
                z[7] = xj - bb;  // Save Diff between actual j and calculated j
                x2 = x2 + s;     // Y = Y + 0.1
                break;
            case 2:     // Calculate Ljg based on Y + 0.1
                z[8] = xl - z[1];   //Save diff between L (in terms of Y + 0.1) and L (in terms of original Y)
                z[11] = aa - z[2];  //Save diff between g (in terms of Y + 0.1) and g (in terms of original Y)
                z[14] = bb - z[3];  //Save diff between j (in terms of Y + 0.1) and j (in terms of original Y)
                x2 = x2 - s;        // Y = y - 0.1 (back to original Y)
                x0 = x0 + dd;       // x = x + 0.01
                break;
            case 3:     // Calcuate Ljg based on x + 0.01
                z[9] = xl - z[1];   //Save diff between L (in terms of x + 0.01) and L (in terms of original x)
                z[12] = aa - z[2];  //Save diff between g (in terms of x + 0.01) and g (in terms of original x)
                z[15] = bb - z[3];  //Save diff between j (in terms of x + 0.01) and j (in terms of original x)
                x0 = x0 - dd;       // x = x - 0.01 (back to original x)
                x1 = x1 + dd;       // y = y + 0.01
                break;
            case 4:     //Calculate Ljg based on y + 0.01
```

```
z[10] = x1 - z[1];    //Save diff between L (in terms of y + 0.01) and L (in terms of original y)
z[13] = aa - z[2];    //Save diff between g (in terms of y + 0.01) and g (in terms of original y)
z[16] = bb - z[3];    //Save diff between j (in terms of y + 0.01) and j (in terms of original y)
x1 = x1 - dd;         // y = y - 0.01 (back to original y)

//z17 = (DiffACL * Diffg01x * Diffj01y) + (DiffACg * DiffL01x * Diffj01y) + (DiffACj * DiffL01x * Diffg01y)
z[17] = (z[5] * z[12] * z[16]) + (z[6] * z[10] * z[15]) + (z[7] * z[9] * z[13]);
//z18 = (DiffACL * Diffg01y * Diffj01x) + (DiffACg * DiffL01x * Diffj01y) + (DiffACj * Diffg01x * DiffL01y)
z[18] = (z[5] * z[13] * z[15]) + (z[6] * z[9] * z[16]) + (z[7] * z[12] * z[10]);
//z19 = (DiffACL * Diffg01y * Diffj1Y) + (DiffACg * DiffL01x * Diffj01y) + (DiffACj * DiffL01y * Diffg1Y)
z[19] = (z[5] * z[13] * z[14]) + (z[6] * z[8] * z[16]) + (z[7] * z[10] * z[11]);
//z20 = (DiffACL * Diffg1Y * Diffj01y) + (DiffACg * DiffL01y * Diffj1Y) + (DiffACj * DiffL1Y * Diffg01y)
z[20] = (z[5] * z[11] * z[16]) + (z[6] * z[10] * z[14]) + (z[7] * z[8] * z[13]);
//z21 = (DiffACL * Diffg1Y * Diffj01x) + (DiffACg * DiffL01x * Diffj1Y) + (DiffACj * DiffL1Y * Diffg01x)
z[21] = (z[5] * z[11] * z[15]) + (z[6] * z[9] * z[14]) + (z[7] * z[8] * z[12]);
//z22 = (DiffACL * Diffj1Y * Diffg01x) + (DiffACg * DiffL1Y * Diffj01x) + (DiffACj * DiffL01x * Diffg1Y)
z[22] = (z[5] * z[14] * z[12]) + (z[6] * z[8] * z[15]) + (z[7] * z[9] * z[11]);
//z23 = (DiffL1Y * Diffg01x * Diffj01y) + (DiffL01x * Diffg01y * Diffj1Y) + (DiffL01y * Diffg1Y * Diffj01x)
z[23] = (z[8] * z[12] * z[16]) + (z[9] * z[13] * z[14]) + (z[10] * z[11] * z[15]);
//z24 = (DiffL1Y * Diffg01y * Diffj01x) + (DiffL01y * Diffg1Y * Diffj01y) + (DiffL01y * Diffg01x * Diffj1Y)
z[24] = (z[8] * z[13] * z[15]) + (z[9] * z[11] * z[16]) + (z[10] * z[12] * z[14]);

// Validate Ljg calculation - if diff is zero, input was likely all zeros

// Calculate a (inc)decrement value for Y
d = z[23] - z[24];
if(d == 0.0)
    {
    return false;
    }

//d2 = (0.1 * (z17 - z18)) / (z23 - z24)
d2 = (u * (z[17] - z[18])) / d;

// If Y (inc)decrement value is greater than current Y, use 1/2 of (inc)decrement value if((d2 * (-1.0)) >= x2)
    {
    d2 = (d2/2.0) * (-1.0);
    }
//Calculate new (inc)decrement value for x
d0 = (dd * (z[19] - z[20])) / d;
//Calculate new (inc)decrement value for y
d1 = (dd * (z[21] - z[22])) / d;

//Y = Y + (-)d2 (actually decrements Y)
x2 = x2 + d2;
if(x2 > 95.0)   // Check for over bright limit
    {
    return false;
    }
if(retval > 200)   // Check for too many attempts
    {
    return false;
    }
// If x decrement value is greater than current x, use 1/2 of decrement value
if((d0 * (-1.0)) >= x0)
    {
    d0 = (d0/2.0) * (-1.0);
    }
// Decrement x
x0 = x0 + d0;
// If y decrement value is greater than current y, use 1/2 of decrement value
if((d1 * (-1.0)) >= x1)
    {
    d1 = (d1/2.0) * (-1.0);
    }
// Decrement y
x1 = x1 + d1;
break;
case 5:
    //ds = (2.0 * DiffACL * DiffACL) + (actualg - calcg)(squared) * (actualj - calcj)(squared)
    ds = (fl * dl * dl) + pow((xg - aa),2.0) + pow((xj - bb),2.0);
    break;
} // end switch
if(ds < t)
    {
    cy = x2;    // Save calculated Y
    cx = x0;    // Save calculated x
    cy = x1;    // Save calcukated y
    bigx = ex * (cy / ey);                         // Calculate X
    bigz = (1 - ex - ey) * (cy / ey);              // Calculate Z
    bigL = exp(log(cy/100.0)/3.0) * 116.0 - 16.0;                            // Calculate CIE L
    lita = (exp(log(bigx/94.811)/3.0) - exp(log(cy/100)/3.0)) * 500.0;       // Calculate CIE a
    litb = (exp(log(cy/100.0)/3.0) - exp(log(bigz/107.304)/3.0)) * 200.0;    // Calculate CIE b
```

```
        //Following transform from my calculated matrix
        redf  = (bigx *  3.2397) + (cy * -1.5367) + (bigz * -0.4984);    // Calculate absolute R
        greenf = (bigx * -0.9676) + (cy *  1.8729) + (bigz *  0.0414);   // Calculate absolute G
        bluef = (bigx *  0.0565) + (cy * -0.2875) + (bigz *  1.0753);    // Calculate absolute B // Convert values by gamma factor redf   = pow(redf,0.55555);
        greenf = pow(greenf,0.55555);
        bluef  = pow(bluef,0.55555);

retval = 0;       // Indicate success
        goto done;
        }
    retval++;
    } // end k loop
    goto lab13;

one:

if(redf  < 0.0)redf  = 0.0;
if(bluef < 0.0)bluef = 0.0;
if(greenf< 0.0)greenf= 0.0;

// Make a good Macintosh RGB color out of this by multiplying matrix results * 20 = 256 (or 5120)
    // Make each component proportional to a full component value of 0xFFFF;

// Calc RGB color
    tmpl = (long)(redf * 5120.0);
    if(tmpl > 0xFFFF)tmpl = 0xFFFF;
    outRGBColor.red = (unsigned short)tmpl;
    tmpl = (long)(greenf * 5120.0);
    if(tmpl > 0xFFFF)tmpl = 0xFFFF;
    outRGBColor.green = (unsigned short)tmpl;
    tmpl = (long)(bluef * 5120.0);
    if(tmpl > 0xFFFF)tmpl = 0xFFFF;
    outRGBColor.blue = (unsigned short)tmpl;

return true;

/---------------------------------------------------------------------
/ CalcPaletteColors
/
/ Based on the chart type and formula, calculate the Ljg colors in a chart (palette)
/ Return 1 if chart is valid, 0 if it should be discarded
/--------------------------------------------------------------------- short
ColorUtils::CalcPaletteColors(LJGCellData &theCellData,GamutHandle /*theGamutH*/)
{
    short   i,j;
    short   totValidColors = 0;

switch(theCellData.formula.chartype)
    {
        case LJGChartTypeJ: // J incs left to right from -6 to 12 , L decs top to bottom from 6 to -7
        {
            short currL = 6;
            for(i=0;i<LJGPaletteHeight;i++)
            {
                short currJ = (-6);
                for(j=0;j<LJGPaletteWidth;j++)
                {
                    theCellData.palette[i][j].L = currL;    // Set L
                    theCellData.palette[i][j].J = currJ;    // Set J
                    theCellData.palette[i][j].G = 0;

if(jchartlimits[i][j].l != 99) // If this chart cell can contain a color...
                    {
                        theCellData.palette[i][j].valid = 1;    // Default color is valid // Calculate G
                        short currG = 0;    // Default short   val1 = theCellData.formula.ans - ((theCellData.formula.L * currL) + (theCellData.formula.J * currJ));
                        Boolean isIntegerNumber = (val1 % theCellData.formula.G) ? false : true;
                        if(isIntegerNumber)
                        {
                            currG = (theCellData.formula.G == 0) ? 0 : (val1 / theCellData.formula.G);
                        }
                        else
                        {
                            theCellData.palette[i][j].valid = 0;    // Color not valid
                        }
```

```
                    theCellData.palette[i][j].G = currG;   // Set Calculated G if(theCellData.palette[i][j].valid) // Still valid?
                    {
                        // Exclude G values outside the gamut
                        if((currG < jchartlimits[i][j].l) || (currG > jchartlimits[i][j].h))
                        {
                            // G is out of gamut
                            theCellData.palette[i][j].valid = 0;
                        }
                        else
                        {
                            totValidColors++;
                        }
                    }
                } // chart cell can hold a color
                else
                {
                    // cannot hold a color
                    theCellData.palette[i][j].valid = 0;
                }
                currJ++;    // Inc J
            }
            currL--;    // Dec L
        }
        break;
    }
    case LJGChartTypeG: // G incs left to right from -10 to 6 , L decs top to bottom from 6 to -7
    {
        short currL = 6;
        for(i=0;i<LJGPaletteHeight;i++)
        {
            short currG = (-10);
            for(j=0;j<LJGPaletteWidth;j++)
            {
                theCellData.palette[i][j].L = currL;   // Set L
                theCellData.palette[i][j].G = currG;   // Set G
                theCellData.palette[i][j].J = 0;

if(gchartlimits[i][j].l != 99) // If this chart cell can contain a color...
                {
                    theCellData.palette[i][j].valid = 1;   // Default color is valid // Calculate J
                    short currJ = 0;   // Default short   val1 = theCellData.formula.ans - ((theCellData.formula.L * currL) + (theCellData.formula.G * currG))
                    Boolean isIntegerNumber = (val1 % theCellData.formula.J) ? false : true;
                    if(isIntegerNumber)
                    {
                        currJ = (theCellData.formula.J == 0) ? 0 : (val1 / theCellData.formula.J);
                    }
                    else
                    {
                        theCellData.palette[i][j].valid = 0;   // Color not valid
                    }
                    theCellData.palette[i][j].J = currJ;   // Set Calculated J if(theCellData.palette[i][j].valid) // Still valid?
                    {
                        // Exclude J values outside the gamut
                        if((currJ < gchartlimits[i][j].l) || (currJ > gchartlimits[i][j].h))
                        {
                            // J is out of gamut
                            theCellData.palette[i][j].valid = 0;
                        }
                        else
                        {
                            totValidColors++;
                        }
                    }
                } // chart cell can hold a color
                else
                {
                    // cannot hold a color
                    theCellData.palette[i][j].valid = 0;
                }
                currG++;    // Inc G
            }
            currL--;    // Dec L
        }
        break;
    }
    case LJGChartTypeL: // J incs left to right from -6 to 12 , G decs top to bottom from 6 to -10
    {
        short currG = 6;
```

```
                for(i=0;i<LJGPaletteHeight;i++)
                {
                    short currJ = (-6);
                    for(j=0;j<LJGPaletteWidth;j++)
                    {
                        theCellData.palette[i][j].G = currG;    // Set G
                        theCellData.palette[i][j].J = currJ;    // Set J
                        theCellData.palette[i][j].L = 0;

if(lchartlimits[i][j].l != 99) // If this chart cell can contain a color...
                        {
                            theCellData.palette[i][j].valid = 1;    // Default color is valid // Calculate L
                            short currL = 0;    // Default short  valI = theCellData.formula.ans - ((theCellData.formula.G * currG) + (theCellData.formula.J * currJ))
                            Boolean isIntegerNumber = (valI % theCellData.formula.L) ? false : true;
                            if(isIntegerNumber)
                            {
                                currL = (theCellData.formula.L == 0) ? 0 : (valI / theCellData.formula.L);
                            }
                            else
                            {
                                theCellData.palette[i][j].valid = 0;    // Color not valid
                            }
                            theCellData.palette[i][j].L = currL;    // Set Calculated L if(theCellData.palette[i][j].valid) // Still valid?
                            {
                                // Exclude L values outside the gamut
                                if((currL < lchartlimits[i][j].l) || (currL > lchartlimits[i][j].h))
                                {
                                    // L is out of gamut
                                    theCellData.palette[i][j].valid = 0;
                                }
                                else
                                {
                                    totValidColors++;
                                }
                            }
                        } // chart cell can hold a color
                        else
                        {
                            // cannot hold a color
                            theCellData.palette[i][j].valid = 0;
                        }
                        currJ++;    // Inc J
                    }
                    currG--;    // Dec G
                }
                break;
            }
            default:
            {
                return 0;   // Invalid chart type
            }
        }
        // Check # of valid colors if(totValidColors < gPrefs.minPaletteColors)
        {
            return 0;   // Not enough colors to bother with
        }
        return 1;   // Palette is valid //==================================================================
//  IsOutOfGamut
//
//  Check an Ljg color for out-of-gamut
//  Return:
//          0 = Not out of gamut
//          1 = L is out of gamut as returned in limits variable
//          2 = L is out of gamut as returned in limits variable
//          3 = L is out of gamut as returned in limits variable
//          4 = Input color is out of gamut - culprit not determined
//================================================================== short
ColorUtils::IsOutOfGamut(LJGColor &theLJGColor,ljglimits &limits)

// We will use the L-chart to determine out of gamut
```

```
// Test for absolute value of L and J and G first

// L decs top to bottom from 6 to -7
if((theLJGColor.L > 6) || (theLJGColor.L < -7))
{
    limits.l = (-7);
    limits.h = 6;
    return kOutOfGamutL;    // Its out of gamut
}
// J incs left to right from -6 to 12
if((theLJGColor.J < -6) || (theLJGColor.J > 12))
{
    limits.l = (-6);
    limits.h = 12;
    return kOutOfGamutJ;    // Its out of gamut
}
// G decs top to bottom from 6 to -10
if((theLJGColor.G > 6) || (theLJGColor.G < -10))
{
    limits.l = (-10);
    limits.h = 6;
    return kOutOfGamutG;    // Its out of gamut
}
// Test to see whether ANY L and exist at the given j and g cooordinates short   Jindex = theLJGColor.J + 6;     // Form index from 0 to 18
short   Gindex = theLJGColor.G + 10;    // Form index from 0 to 16 if(lchartlimits[Gindex][Jindex].l == 99)    // If this chart cell is blank...
    return kOutOfGamutGen;  // Its out of gamut // Finally, test to be sure that the specified L is within the allowed
// range for the cell specified by the j and g coordinates if((theLJGColor.L < lchartlimits[Gindex][Jindex].l) || (theLJGColor.L > lchartlimits[Gindex][Jindex].h))
    return kOutOfGamutGen;  // Its out of gamut return false;   // It is NOT out of gamut

}

// ================================================================
// CalcFormulas
//
// Based on two input colors, calculate a set up chart formulas which will later
// be used to generate the chart colors. For each formula, decide which type of
// chart (L or j or g) will be generated.
// ================================================================
short
JColorUtils::CalcFormulas(LJGColor &mLJGColor1,LJGColor &mLJGColor2,LJGFormula mFormula[544])
{ short           mValidFormulas = 0;

// Note that mFormula[0] isn't used

// Step I - Calculate the first three formulas from the two input colors

// Calculate formula 1 mFormula[1].L   = 0;
    mFormula[1].J   = (mLJGColor1.J == mLJGColor2.J) ? 1 : (mLJGColor2.G - mLJGColor1.G);
    mFormula[1].G   = (mLJGColor1.J == mLJGColor2.J) ? 0 : (mLJGColor1.J - mLJGColor2.J);
    mFormula[1].ans = (mLJGColor1.J == mLJGColor2.J) ? mLJGColor1.J : ((mLJGColor1.J * (mLJGColor2.G - mLJGColor1.G)) +
                                        (mLJGColor1.G * (mLJGColor1.J - mLJGColor2.J)));

// Calculate formula 2 mFormula[2].L   = (mLJGColor1.G == mLJGColor2.G) ? 0 : (mLJGColor1.G - mLJGColor2.G);
    mFormula[2].J   = 0;
    mFormula[2].G   = (mLJGColor1.G == mLJGColor2.G) ? 1 : (mLJGColor1.L - mLJGColor2.L);
    mFormula[2].ans = (mLJGColor1.G == mLJGColor2.G) ? mLJGColor1.G : ((mLJGColor1.L * (mLJGColor2.G - mLJGColor1.G)) +
                                        (mLJGColor1.G * (mLJGColor1.L - mLJGColor2.L)));

// Calculate formula 3 mFormula[3].L   = (mLJGColor1.L == mLJGColor2.L) ? 1 : (mLJGColor2.J - mLJGColor1.J);
    mFormula[3].J   = (mLJGColor1.L == mLJGColor2.L) ? 0 : (mLJGColor1.L - mLJGColor2.L);
    mFormula[3].G   = 0;
    mFormula[3].ans = (mLJGColor1.L == mLJGColor2.L) ? mLJGColor1.L : ((mLJGColor1.L * (mLJGColor2.J - mLJGColor1.J)) +
                                        (mLJGColor1.J * (mLJGColor1.L - mLJGColor2.L)));
```

```
short    formulaNum = 4;
// Step IIa Add formula 2 to 1 then repeat to form additional formulas AddFormulas(mFormula[2],mFormula[1],mFormula[formulaNum]);   // 2 + 1 to get 4
while(formulaNum < 13)                                        // Calc thru 13
{
    AddFormulas(mFormula[2],mFormula[formulaNum],mFormula[formulaNum+1]);
    formulaNum++;
}
formulaNum++;
// Step IIb Add formula 1 to 4 then repeat to form additional formulas AddFormulas(mFormula[1],mFormula[4],mFormula[formulaNum]);   // 1 + 4 to get 14
while(formulaNum < 23)                                        // Calc thru 23
{
    AddFormulas(mFormula[1],mFormula[formulaNum],mFormula[formulaNum+1]);
    formulaNum++;
}
formulaNum++;
// Step IIc Add formula 3 to 1 then repeat to form additional formulas AddFormulas(mFormula[3],mFormula[1],mFormula[formulaNum]);   // 3 + 1 to get 24
while(formulaNum < 33)                                        // Calc thru 33
{
    AddFormulas(mFormula[3],mFormula[formulaNum],mFormula[formulaNum+1]);
    formulaNum++;
}
formulaNum++;
// Step IId Add formula 1 to 3 then repeat to form additional formulas AddFormulas(mFormula[1],mFormula[3],mFormula[formulaNum]);   // 1 + 3 to get 34
while(formulaNum < 43)                                        // Calc thru 43
{
    AddFormulas(mFormula[1],mFormula[formulaNum],mFormula[formulaNum+1]);
    formulaNum++;
}
formulaNum++;
// Step IIe Add formula 3 to 2 then repeat to form additional formulas AddFormulas(mFormula[3],mFormula[2],mFormula[formulaNum]);   // 3 + 2 to get 44
while(formulaNum < 53)                                        // Calc thru 53
{
    AddFormulas(mFormula[3],mFormula[formulaNum],mFormula[formulaNum+1]);
    formulaNum++;
}
formulaNum++;
// Step IIf Add formula 2 to 44 then repeat to form additional formulas AddFormulas(mFormula[2],mFormula[44],mFormula[formulaNum]);  // 2 + 44 to get 54
while(formulaNum < 63)                                        // Calc thru 63
{
    AddFormulas(mFormula[2],mFormula[formulaNum],mFormula[formulaNum+1]);
    formulaNum++;
}
formulaNum++;
// Step IIg Subtract formula 2 from 1 then repeat to form additional formulas SubFormulas(mFormula[1],mFormula[2],mFormula[formulaNum]);   // 1 - 2 to get 64
while(formulaNum < 73)                                        // Calc thru 73
{
    SubFormulas(mFormula[formulaNum],mFormula[2],mFormula[formulaNum+1]);
    formulaNum++;
}
formulaNum++;
// Step IIh Subtract formula 1 from 2 then repeat to form additional formulas SubFormulas(mFormula[2],mFormula[1],mFormula[formulaNum]);   // 2 - 1 to get 74
while(formulaNum < 83)                                        // Calc thru 83
{
    SubFormulas(mFormula[formulaNum],mFormula[1],mFormula[formulaNum+1]);
    formulaNum++;
}
formulaNum++;
// Step IIi Subtract formula 3 from 1 then repeat to form additional formulas SubFormulas(mFormula[1],mFormula[3],mFormula[formulaNum]);   // 1 - 3 to get 84
```

```
while(formulaNum < 93)                                    // Calc thru 93
{
    SubFormulas(mFormula[formulaNum],mFormula[3],mFormula[formulaNum+1]);
    formulaNum++;
}
formulaNum++;
// Step IIj Subtract formula 1 from 3 then repeat to form additional formulas SubFormulas(mFormula[3],mFormula[1],mFormula[formulaNum]);     // 3 - 1 to get 94
while(formulaNum < 103)                                        // Calc thru 103
{
    SubFormulas(mFormula[formulaNum],mFormula[1],mFormula[formulaNum+1]);
    formulaNum++;
}
formulaNum++;
// Step IIk Subtract formula 3 from 2 then repeat to form additional formulas SubFormulas(mFormula[2],mFormula[3],mFormula[formulaNum]);     // 2 - 3 to get 104
while(formulaNum < 113)                                        // Calc thru 113
{
    SubFormulas(mFormula[formulaNum],mFormula[3],mFormula[formulaNum+1]);
    formulaNum++;
}
formulaNum++;
// Step IIl Subtract formula 2 from 3 then repeat to form additional formulas SubFormulas(mFormula[3],mFormula[2],mFormula[formulaNum]);     // 3 - 2 to get 114
while(formulaNum < 123)                                        // Calc thru 123
{
    SubFormulas(mFormula[formulaNum],mFormula[2],mFormula[formulaNum+1]);
    formulaNum++;
}
formulaNum++;
// Step IIm Add formula 1 to 2 then subtract 3 and repeat to form additional formulas AddFormulas(mFormula[1],mFormula[2],mFormula[formulaNum]);     // 1 + 2 = interim
SubFormulas(mFormula[formulaNum],mFormula[3],mFormula[formulaNum]); // interim - 3 to get 124
while(formulaNum < 133)                                        // Calc thru 133
{
    SubFormulas(mFormula[formulaNum],mFormula[3],mFormula[formulaNum+1]);
    formulaNum++;
}
formulaNum++;
// Step IIn Add formula 1 to 3 then subtract 2 and repeat to form additional formulas AddFormulas(mFormula[1],mFormula[3],mFormula[formulaNum]);     // 1 + 3 = interim
SubFormulas(mFormula[formulaNum],mFormula[2],mFormula[formulaNum]); // interim - 2 to get 134
while(formulaNum < 143)                                        // Calc thru 143
{
    SubFormulas(mFormula[formulaNum],mFormula[2],mFormula[formulaNum+1]);
    formulaNum++;
}
formulaNum++;
// Step IIo Add formula 2 to 3 then subtract 1 and repeat to form additional formulas AddFormulas(mFormula[2],mFormula[3],mFormula[formulaNum]);     // 2 + 3 = interim
SubFormulas(mFormula[formulaNum],mFormula[1],mFormula[formulaNum]); // interim - 1 to get 144
while(formulaNum < 153)                                        // Calc thru 153
{
    SubFormulas(mFormula[formulaNum],mFormula[1],mFormula[formulaNum+1]);
    formulaNum++;
}
formulaNum++;
// Step IIp Add formula 2 to 3 then add 1 and repeat to form additional formulas AddFormulas(mFormula[2],mFormula[3],mFormula[formulaNum]);     // 2 + 3 = interim
AddFormulas(mFormula[formulaNum],mFormula[1],mFormula[formulaNum]); // interim + 1 to get 154
while(formulaNum < 163)                                        // Calc thru 163
{
    AddFormulas(mFormula[formulaNum],mFormula[1],mFormula[formulaNum+1]);
    formulaNum++;
}
formulaNum++;
// Step IIq Add formula 1 to 3 then add 2 and repeat to form additional formulas AddFormulas(mFormula[1],mFormula[3],mFormula[formulaNum]);     // 1 + 3 = interim
AddFormulas(mFormula[formulaNum],mFormula[2],mFormula[formulaNum]); // interim + 2 to get 164
while(formulaNum < 173)                                        // Calc thru 173
```

```
    {
        AddFormulas(mFormula[formulaNum],mFormula[2],mFormula[formulaNum+1]);
        formulaNum++;
    }
formulaNum++;

// Step IIr Add formula 1 to 2 then add 3 and repeat to form additional formulas AddFormulas(mFormula[1],mFormula[2],mFormula[formulaNum]);          // 1 + 2 = interim
AddFormulas(mFormula[formulaNum],mFormula[3],mFormula[formulaNum]); // interim + 3 to get 174
while(formulaNum < 183)                                              // Calc thru 183
    {
        AddFormulas(mFormula[formulaNum],mFormula[3],mFormula[formulaNum+1]);
        formulaNum++;
    }
formulaNum++;

// Step IIs Add formula 2 to 2 then subtract 1 and repeat to form additional formulas AddFormulas(mFormula[2],mFormula[2],mFormula[formulaNum]);           // 2 + 2 = interim
SubFormulas(mFormula[formulaNum],mFormula[1],mFormula[formulaNum]);  // interim - 1 to get 184
while(formulaNum < 193)                                              // Calc thru 193
    {
        SubFormulas(mFormula[formulaNum],mFormula[1],mFormula[formulaNum+1]);
        formulaNum++;
    }
formulaNum++;

// Step IIt Add formula 3 to 3 then subtract 1 and repeat to form additional formulas AddFormulas(mFormula[3],mFormula[3],mFormula[formulaNum]);           // 3 + 3 = interim
SubFormulas(mFormula[formulaNum],mFormula[1],mFormula[formulaNum]);  // interim - 1 to get 194
while(formulaNum < 203)                                              // Calc thru 203
    {
        SubFormulas(mFormula[formulaNum],mFormula[1],mFormula[formulaNum+1]);
        formulaNum++;
    }
formulaNum++;

// Step IIu Add formula 3 to 3, add 2, then subtract 1 and repeat to form additional formulas AddFormulas(mFormula[3],mFormula[3],mFormula[formulaNum]);           // 3 + 3 = interim
AddFormulas(mFormula[formulaNum],mFormula[2],mFormula[formulaNum]);  // interim + 2 to get interim
SubFormulas(mFormula[formulaNum],mFormula[1],mFormula[formulaNum]);  // interim - 1 to get 204
while(formulaNum < 213)                                              // Calc thru 213
    {
        SubFormulas(mFormula[formulaNum],mFormula[1],mFormula[formulaNum+1]);
        formulaNum++;
    }
formulaNum++;

// Step IIv Add formula 2 to 2, add 3, then subtract 1 and repeat to form additional formulas AddFormulas(mFormula[2],mFormula[2],mFormula[formulaNum]);           // 2 + 2 = interim
AddFormulas(mFormula[formulaNum],mFormula[3],mFormula[formulaNum]);  // interim + 3 to get interim
SubFormulas(mFormula[formulaNum],mFormula[1],mFormula[formulaNum]);  // interim - 1 to get 214
while(formulaNum < 223)                                              // Calc thru 223
    {
        SubFormulas(mFormula[formulaNum],mFormula[1],mFormula[formulaNum+1]);
        formulaNum++;
    }
formulaNum++;

// Step IIw Add formula 1 to 1, then subtract 2 and repeat to form additional formulas AddFormulas(mFormula[1],mFormula[1],mFormula[formulaNum]);           // 1 + 1 = interim
SubFormulas(mFormula[formulaNum],mFormula[2],mFormula[formulaNum]);  // interim - 2 to get 224
while(formulaNum < 233)                                              // Calc thru 233
    {
        SubFormulas(mFormula[formulaNum],mFormula[2],mFormula[formulaNum+1]);
        formulaNum++;
    }
formulaNum++;

// Step IIx Add formula 1 to 1, then subtract 3 and repeat to form additional formulas AddFormulas(mFormula[1],mFormula[1],mFormula[formulaNum]);           // 1 + 1 = interim
SubFormulas(mFormula[formulaNum],mFormula[3],mFormula[formulaNum]);  // interim - 3 to get 234
while(formulaNum < 243)                                              // Calc thru 243
    {
        SubFormulas(mFormula[formulaNum],mFormula[3],mFormula[formulaNum+1]);
        formulaNum++;
    }
formulaNum++;

// Step IIy Add formula 2 to 2, then subtract 3 and repeat to form additional formulas
```

```
    AddFormulas(mFormula[2],mFormula[2],mFormula[formulaNum]);      // 2 + 2 - interim
    SubFormulas(mFormula[formulaNum],mFormula[3],mFormula[formulaNum]); // interim - 3 to get 244
    while(formulaNum < 253)                                         // Calc thru 253
    {
        SubFormulas(mFormula[formulaNum],mFormula[3],mFormula[formulaNum+1]);
        formulaNum++;
    }
formulaNum++;

// Step IIz Add formula 3 to 3, then subtract 2 and repeat to form additional formulas AddFormulas(mFormula[3],mFormula[3],mFormula[formulaNum]);      // 3 + 3 - interim
    SubFormulas(mFormula[formulaNum],mFormula[2],mFormula[formulaNum]); // interim - 2 to get 254
    while(formulaNum < 263)                                         // Calc thru 263
    {
        SubFormulas(mFormula[formulaNum],mFormula[2],mFormula[formulaNum+1]);
        formulaNum++;
    }
formulaNum++;

// Step IIaa Add formula 1 to 1, then add 2 and repeat to form additional formulas AddFormulas(mFormula[1],mFormula[1],mFormula[formulaNum]);      // 1 + 1 - interim
    AddFormulas(mFormula[formulaNum],mFormula[2],mFormula[formulaNum]); // interim + 2 to get 264
    while(formulaNum < 273)                                         // Calc thru 273
    {
        AddFormulas(mFormula[formulaNum],mFormula[2],mFormula[formulaNum+1]);
        formulaNum++;
    }
formulaNum++;

// Step IIbb Add formula 1 to 1, then add 3 and repeat to form additional formulas AddFormulas(mFormula[1],mFormula[1],mFormula[formulaNum]);      // 1 + 1 - interim
    AddFormulas(mFormula[formulaNum],mFormula[3],mFormula[formulaNum]); // interim + 3 to get 274
    while(formulaNum < 283)                                         // Calc thru 283
    {
        AddFormulas(mFormula[formulaNum],mFormula[3],mFormula[formulaNum+1]);
        formulaNum++;
    }
formulaNum++;

// Step IIcc Add formula 2 to 2, then add 1 and repeat to form additional formulas AddFormulas(mFormula[2],mFormula[2],mFormula[formulaNum]);      // 2 + 2 - interim
    AddFormulas(mFormula[formulaNum],mFormula[1],mFormula[formulaNum]); // interim + 1 to get 284
    while(formulaNum < 293)                                         // Calc thru 293
    {
        AddFormulas(mFormula[formulaNum],mFormula[1],mFormula[formulaNum+1]);
        formulaNum++;
    }
formulaNum++;

// Step IIdd Add formula 2 to 2, then add 3 and repeat to form additional formulas AddFormulas(mFormula[2],mFormula[2],mFormula[formulaNum]);      // 2 + 2 - interim
    AddFormulas(mFormula[formulaNum],mFormula[3],mFormula[formulaNum]); // interim + 3 to get 294
    while(formulaNum < 303)                                         // Calc thru 303
    {
        AddFormulas(mFormula[formulaNum],mFormula[3],mFormula[formulaNum+1]);
        formulaNum++;
    }
formulaNum++;

// Step IIee Add formula 3 to 3, then add 1 and repeat to form additional formulas AddFormulas(mFormula[3],mFormula[3],mFormula[formulaNum]);      // 3 + 3 - interim
    AddFormulas(mFormula[formulaNum],mFormula[1],mFormula[formulaNum]); // interim + 1 to get 304
    while(formulaNum < 313)                                         // Calc thru 313
    {
        AddFormulas(mFormula[formulaNum],mFormula[1],mFormula[formulaNum+1]);
        formulaNum++;
    }
formulaNum++;

// Step IIff Add formula 3 to 3, then add 2 and repeat to form additional formulas AddFormulas(mFormula[3],mFormula[3],mFormula[formulaNum]);      // 3 + 3 - interim
    AddFormulas(mFormula[formulaNum],mFormula[2],mFormula[formulaNum]); // interim + 2 to get 314
    while(formulaNum < 323)                                         // Calc thru 323
    {
        AddFormulas(mFormula[formulaNum],mFormula[2],mFormula[formulaNum+1]);
        formulaNum++;
    }
formulaNum++;
```

```
// Step IIgg Add formula 1 to 1, add 2, then subtract 3 and repeat to form additional formulas AddFormulas(mFormula[1],mFormula[1],mFormula[formulaNum]);      // 1 + 1 = interim
AddFormulas(mFormula[formulaNum],mFormula[2],mFormula[formulaNum]);  // interim + 2 to get interim
SubFormulas(mFormula[formulaNum],mFormula[3],mFormula[formulaNum]);  // interim - 3 to get 324
while(formulaNum < 333)                                         // Calc thru 333
    {
    SubFormulas(mFormula[formulaNum],mFormula[3],mFormula[formulaNum+1]);
    formulaNum++;
    }
formulaNum++;

// Step IIhh Add formula 1 to 1, add 3, then subtract 2 and repeat to form additional formulas AddFormulas(mFormula[1],mFormula[1],mFormula[formulaNum]);      // 1 + 1 = interim
AddFormulas(mFormula[formulaNum],mFormula[3],mFormula[formulaNum]);  // interim + 3 to get interim
SubFormulas(mFormula[formulaNum],mFormula[2],mFormula[formulaNum]);  // interim - 2 to get 334
while(formulaNum < 343)                                         // Calc thru 343
    {
    SubFormulas(mFormula[formulaNum],mFormula[2],mFormula[formulaNum+1]);
    formulaNum++;
    }
formulaNum++;

// Step IIii Add formula 2 to 2, add 3, then subtract 2 and repeat to form additional formulas AddFormulas(mFormula[2],mFormula[2],mFormula[formulaNum]);      // 2 + 2 = interim
AddFormulas(mFormula[formulaNum],mFormula[1],mFormula[formulaNum]);  // interim + 1 to get interim
SubFormulas(mFormula[formulaNum],mFormula[3],mFormula[formulaNum]);  // interim - 3 to get 344
while(formulaNum < 353)                                         // Calc thru 353
    {
    SubFormulas(mFormula[formulaNum],mFormula[2],mFormula[formulaNum+1]);
    formulaNum++;
    }
formulaNum++;

// Step IIjj Add formula 3 to 3, add 1, then subtract 2 and repeat to form additional formulas AddFormulas(mFormula[3],mFormula[3],mFormula[formulaNum]);      // 3 + 3 = interim
AddFormulas(mFormula[formulaNum],mFormula[1],mFormula[formulaNum]);  // interim + 1 to get interim
SubFormulas(mFormula[formulaNum],mFormula[2],mFormula[formulaNum]);  // interim - 2 to get 354
while(formulaNum < 363)                                         // Calc thru 363
    {
    SubFormulas(mFormula[formulaNum],mFormula[2],mFormula[formulaNum+1]);
    formulaNum++;
    }
formulaNum++;

// Step III a Reduce each formula (including original 3) by its greatest common divisor
//             Ignore the sign of each formula component in this calculation for(short i=1; i <= 363; i++)
    {
    ReduceByGCD(mFormula[i]);
    }

// Step III b Ensure that first L or j (L=0) or p (L and j = 0) is positive for(short i=1; i <= 363; i++)
    {
    EnsurePositiveFormula(mFormula[i]);
    }

// Step IV - Generate 360 more formulas based on the modified first 363

// Step IVa - Note that formulas 1, 2, and 3 have been reduced and made
// positive by the previous steps and will be used to form more formulas // Step IVb Add formula 2 to 1 then repeat to form additional formulas AddFormulas(mFormula[2],mFormula[1],mFormula[formulaNum]);      // 2 + 1 to get 364
while(formulaNum < 373)                                         // Calc thru 373
    {
    AddFormulas(mFormula[2],mFormula[formulaNum],mFormula[formulaNum+1]);
    formulaNum++;
    }
formulaNum++;

// Step IVc Add formula 1 to 2 then repeat to form additional formulas

AddFormulas(mFormula[1],mFormula[364],mFormula[formulaNum]);// 1 + 364 to get 374
while(formulaNum < 383)                                         // Calc thru 383
    {
    AddFormulas(mFormula[1],mFormula[formulaNum],mFormula[formulaNum+1]);
    formulaNum++;
```

```
      }
      formulaNum++;
// Step IVd Add formula 3 to 1 then repeat to form additional formulas AddFormulas(mFormula[3],mFormula[1],mFormula[formulaNum]);   // 3 + 1 to get 384
while(formulaNum < 393)                                       // Calc thru 393
    {
    AddFormulas(mFormula[3],mFormula[formulaNum],mFormula[formulaNum+1]);
    formulaNum++;
    }
formulaNum++;
// Step IVe Add formula 1 to 384 then repeat to form additional formulas AddFormulas(mFormula[1],mFormula[384],mFormula[formulaNum]); // 1 + 384 to get 394
while(formulaNum < 403)                                       // Calc thru 403
    {
    AddFormulas(mFormula[1],mFormula[formulaNum],mFormula[formulaNum+1]);
    formulaNum++;
    }
formulaNum++;
// Step IVf Add formula 3 to 2 then repeat to form additional formulas AddFormulas(mFormula[3],mFormula[2],mFormula[formulaNum]);   // 3 + 2 to get 404
while(formulaNum < 413)                                       // Calc thru 413
    {
    AddFormulas(mFormula[3],mFormula[formulaNum],mFormula[formulaNum+1]);
    formulaNum++;
    }
formulaNum++;
// Step IVg Add formula 2 to 194 then repeat to form additional formulas AddFormulas(mFormula[2],mFormula[404],mFormula[formulaNum]); // 2 + 404 to get 414
while(formulaNum < 423)                                       // Calc thru 423
    {
    AddFormulas(mFormula[2],mFormula[formulaNum],mFormula[formulaNum+1]);
    formulaNum++;
    }
formulaNum++;
// Step IVh Sub formula 2 from 1 then repeat to form additional formulas SubFormulas(mFormula[1],mFormula[2],mFormula[formulaNum]);   // 1 - 2 to get 424
while(formulaNum < 433)                                       // Calc thru 433
    {
    SubFormulas(mFormula[formulaNum],mFormula[2],mFormula[formulaNum+1]);
    formulaNum++;
    }
formulaNum++;
// Step IVi Sub formula 1 from 2 then repeat to form additional formulas SubFormulas(mFormula[2],mFormula[1],mFormula[formulaNum]);   // 2 - 1 to get 434
while(formulaNum < 443)                                       // Calc thru 443
    {
    SubFormulas(mFormula[formulaNum],mFormula[1],mFormula[formulaNum+1]);
    formulaNum++;
    }
formulaNum++;
// Step IVj Sub formula 3 from 1 then repeat to form additional formulas SubFormulas(mFormula[1],mFormula[3],mFormula[formulaNum]);   // 1 - 3 to get 444
while(formulaNum < 453)                                       // Calc thru 453
    {
    SubFormulas(mFormula[formulaNum],mFormula[3],mFormula[formulaNum+1]);
    formulaNum++;
    }
formulaNum++;
// Step IVk Sub formula 1 from 3 then repeat to form additional formulas SubFormulas(mFormula[3],mFormula[1],mFormula[formulaNum]);   // 3 - 1 to get 454
while(formulaNum < 463)                                       // Calc thru 463
    {
    SubFormulas(mFormula[formulaNum],mFormula[1],mFormula[formulaNum+1]);
    formulaNum++;
    }
formulaNum++;
// Step IVl Sub formula 3 from 2 then repeat to form additional formulas SubFormulas(mFormula[2],mFormula[3],mFormula[formulaNum]);   // 2 - 3 to get 464
```

```
    while(formulaNum < 473)                          // Calc thru 473
    {
        SubFormulas(mFormula[formulaNum],mFormula[3],mFormula[formulaNum+1]);
        formulaNum++;
    }
    formulaNum++;
// Step IVm Sub formula 2 from 3 then repeat to form additional formulas SubFormulas(mFormula[3],mFormula[2],mFormula[formulaNum]);   // 3 - 2 to get 474
    while(formulaNum < 483)                          // Calc thru 483
    {
        SubFormulas(mFormula[formulaNum],mFormula[2],mFormula[formulaNum+1]);
        formulaNum++;
    }
    formulaNum++;
// Step IVn Add formula 1 to 2 then Sub 3 repeatedly to form additional formulas AddFormulas(mFormula[1],mFormula[2],mFormula[formulaNum]);   // 1 + 2 to get interim
    SubFormulas(mFormula[formulaNum],mFormula[3],mFormula[formulaNum]); // interim - 3 to get 484
    while(formulaNum < 493)                          // Calc thru 493
    {
        SubFormulas(mFormula[formulaNum],mFormula[3],mFormula[formulaNum+1]);
        formulaNum++;
    }
    formulaNum++;
// Step IVo Add formula 1 to 3 then Sub 2 repeatedly to form additional formulas AddFormulas(mFormula[1],mFormula[3],mFormula[formulaNum]);   // 1 + 3 to get interim
    SubFormulas(mFormula[formulaNum],mFormula[2],mFormula[formulaNum]); // interim - 2 to get 494
    while(formulaNum < 503)                          // Calc thru 503
    {
        SubFormulas(mFormula[formulaNum],mFormula[2],mFormula[formulaNum+1]);
        formulaNum++;
    }
    formulaNum++;
// Step IVp Add formula 2 to 3 then Sub 1 repeatedly to form additional formulas AddFormulas(mFormula[2],mFormula[3],mFormula[formulaNum]);   // 2 + 3 to get interim
    SubFormulas(mFormula[formulaNum],mFormula[1],mFormula[formulaNum]); // interim - 1 to get 504
    while(formulaNum < 513)                          // Calc thru 513
    {
        SubFormulas(mFormula[formulaNum],mFormula[1],mFormula[formulaNum+1]);
        formulaNum++;
    }
    formulaNum++;
// Step IVq Add formula 2 to 3 then Add 1 repeatedly to form additional formulas AddFormulas(mFormula[2],mFormula[3],mFormula[formulaNum]);   // 2 + 3 to get interim
    AddFormulas(mFormula[formulaNum],mFormula[1],mFormula[formulaNum]); // interim + 1 to get 514
    while(formulaNum < 523)                          // Calc thru 523
    {
        AddFormulas(mFormula[formulaNum],mFormula[1],mFormula[formulaNum+1]);
        formulaNum++;
    }
    formulaNum++;
// Step IVr Add formula 1 to 3 then Add 1 repeatedly to form additional formulas AddFormulas(mFormula[1],mFormula[3],mFormula[formulaNum]);   // 1 + 3 to get interim
    AddFormulas(mFormula[formulaNum],mFormula[2],mFormula[formulaNum]); // interim + 2 to get 524
    while(formulaNum < 533)                          // Calc thru 533
    {
        AddFormulas(mFormula[formulaNum],mFormula[2],mFormula[formulaNum+1]);
        formulaNum++;
    }
    formulaNum++;
// Step IVs Add formula 1 to 2 then Add 3 repeatedly to form additional formulas AddFormulas(mFormula[1],mFormula[2],mFormula[formulaNum]);   // 1 + 2 to get interim
    AddFormulas(mFormula[formulaNum],mFormula[3],mFormula[formulaNum]); // interim + 3 to get 534
    while(formulaNum < 543)                          // Calc thru 543
    {
        AddFormulas(mFormula[formulaNum],mFormula[3],mFormula[formulaNum+1]);
        formulaNum++;
    }
    formulaNum++;
// Step V a Reduce each formula by its greatest common divisor
//          Ignore the sign of each formula component in this calculation
```

```
for(short i=364; i <= 543; i++)
    {
    ReduceByGCD(mFormula[i]);
    }

// Step V b Ensure that first L or j (L=0) or g (L and j = 0) is positive for(short i=364; i <= 543; i++)
    {
    EnsurePositiveFormula(mFormula[i]);
    }

// Step VI Calculate ratios for all formulas and mark extreme values as bad for(short i=1; i <= 543; i++)
    {
    mFormula[i].ratio = CalcRatio(mFormula[i],mFormula[1],mFormula[2],mFormula[3]);
    } mValidFormulas = 0;

// Eliminate formulas marked as bad
for(short i=1; i<=543; i++)
    {
    if(mFormula[i].ratio != kBadRatio)
        {
        // Its a good one
        mFormula[mValidFormulas+1] = mFormula[i];    // Move good formula up
        mValidFormulas++;                            // Increment good formula count
        }
    } if(mValidFormulas == 0)
    return mValidFormulas;                           // Nothing left to do if(mValidFormulas == 1)
    return mValidFormulas;                           // Cant dedupe a set of 1

// Step VII Eliminate duplicate formulas short   dedupedItemCnt = 1;    // The first item by itself cant be a duplicate for(short i=2; i <=mValidFormulas; i++)
    {
    short  j;
    for(j=1; j<=dedupedItemCnt; j++)    // Compare this one to list of ones we have deduped
        {
        if(DuplicateFormulas(mFormula[i],mFormula[j]))
            {
            // Ignore duplicates
            break;
            }
        }
    if(j > dedupedItemCnt)
        {
        // Not a duplicate - move this item up
        mFormula[dedupedItemCnt+1] = mFormula[i];    // Move formula
        dedupedItemCnt++;                            // Bump count of deduped items
        }
    } mValidFormulas = dedupedItemCnt;    // Valid, non-duplicate formulas if(mValidFormulas == 0)
    return mValidFormulas;                           // Nothing left to do if(mValidFormulas == 1)
    return mValidFormulas;                           // Cant sort a set of 1

// Step VIII Sort the list of formulas into decending order by ratios for(short i=1;i<=(mValidFormulas-1);i++)
    {
    for(short j=(i+1);j<=mValidFormulas;j++)
        {
        if(mFormula[j].ratio > mFormula[i].ratio)    // Find largest
            {
            LJGFormula  tmpFormula = mFormula[i];
            mFormula[i] = mFormula[j];
            mFormula[j] = tmpFormula;
            }
        }
    }

// Done with first 8 steps
```

```
// Determine the chart type to create for each palette
for(short i=1;i<=mValidFormulas;i++)
    {
    // A J chart is preferred. See if we can do a J
    if(mFormula[i].G != 0) // Exclude when G=0
        {
        // Calc the J-chart formula
        short   val1 = (mFormula[i].ans - (((mFormula[i].L * 6) + (mFormula[i].J * -6)) /
                        mFormula[i].G)) - (mFormula[i].ans - (((mFormula[i].L * 6) +
                        (mFormula[i].J * -5)) / mFormula[i].G));
        short   val2 = (mFormula[i].ans - (((mFormula[i].L * 6) + (mFormula[i].J * -6)) /
                        mFormula[i].G)) - (mFormula[i].ans - (((mFormula[i].L * 5) +
                        (mFormula[i].J * -6)) / mFormula[i].G));
        // If both values are <= 2, we have a good J chart
        val1 = (val1 < 0) ? (val1 * (-1)) : val1;   // Make absolute
        val2 = (val2 < 0) ? (val2 * (-1)) : val2;
        if((val1 <= 2) && (val2 <= 2))
            {
            mFormula[i].chartype = LJGChartTypeJ;   // Do a J chart
            continue;   // ...with next formula
            }
        }

// Can't do a J - try doing a G if(mFormula[i].J != 0) // Exclude when J=0
        {
        // Calc the G-chart formula
        short   val1 = (mFormula[i].ans - (((mFormula[i].L * 6) + (mFormula[i].G * -10)) /
                        mFormula[i].J)) - (mFormula[i].ans - (((mFormula[i].L * 6) +
                        (mFormula[i].G * -9)) / mFormula[i].J));
        short   val2 = (mFormula[i].ans - (((mFormula[i].L * 6) + (mFormula[i].G * -10)) /
                        mFormula[i].J)) - (mFormula[i].ans - (((mFormula[i].L * 5) +
                        (mFormula[i].G * -10)) / mFormula[i].J));
        // If both values are <= 2, we have a good G chart
        val1 = (val1 < 0) ? (val1 * (-1)) : val1;   // Make absolute
        val2 = (val2 < 0) ? (val2 * (-1)) : val2;
        if((val1 <= 2) && (val2 <= 2))
            {
            mFormula[i].chartype = LJGChartTypeG;   // Do a G chart
            continue;   // ...with next formula
            }
        }

// Can't do J or G, try L if(mFormula[i].L != 0) // Exclude when L=0
        {
        mFormula[i].chartype = LJGChartTypeL;   // Do a L chart
        continue;   // ...with next formula
        }

// If we reach here, this is a bad chart and should be eliminated - mark it for deletion mFormula[i].ratio = kBadRatio;
    }
// Eliminate formulas for which we could not get a chart short   tmpValidFormulas = 0;

// Eliminate formulas marked as bad
for(short i=1; i<=mValidFormulas; i++)
    {
    if(mFormula[i].ratio != kBadRatio)
        {
        // Its a good one
        mFormula[tmpValidFormulas+1] = mFormula[i];     // Move good Formula up
        tmpValidFormulas++;                             // Increment good formula count
        }
    } mValidFormulas = tmpValidFormulas;

return mValidFormulas;
}

// ----------------------------------------------------------------
// DuplicateFormulas
//
// Utility routine to check whether two formulas are equal
// ----------------------------------------------------------------
```

```
Boolean
UColorUtils::DuplicateFormulas(LJGFormula &inFormula1,LJGFormula &inFormula2)
{
    if( (inFormula1.L == inFormula2.L) &&
        (inFormula1.J == inFormula2.J) &&
        (inFormula1.G == inFormula2.G) &&
        (inFormula1.ans == inFormula2.ans) )return true;

return false;
}
// =============================================================
// DuplicateCellData
//
// Utility routine to check whether two charts are equal (have same colors)
// =============================================================
Boolean
UColorUtils::DuplicateCellData(LJGCellData *theCellData,LJGCellData *tmpCellData)
{
    if(theCellData->formula.chartype != tmpCellData->formula.chartype)
    {
        return false;   // chart types are different
    } short  i,j;

for(i=0;i<LJGPaletteHeight;i++)
    {
        for(j=0;j<LJGPaletteWidth;j++)
        {
            if((theCellData->palette[i][j].valid == 1) && (tmpCellData->palette[i][j].valid == 1))
            {
                if(!DuplicateColors(theCellData->palette[i][j],tmpCellData->palette[i][j]))
                {
                    return false;
                }
            }
            else if((theCellData->palette[i][j].valid != tmpCellData->palette[i][j].valid))
            {
                return false;
            }
        }
    } return true;   // Charts are duplicates
}
// =============================================================
// DuplicateColors
//
// Utility routine to check whether two colors are equal
// =============================================================
Boolean
UColorUtils::DuplicateColors(LJGColor &inLJGColor1,LJGColor &inLJGColor2)
{
    if( (inLJGColor1.L == inLJGColor2.L) &&
        (inLJGColor1.J == inLJGColor2.J) &&
        (inLJGColor1.G == inLJGColor2.G) )return true;

return false;
}
// =============================================================
// CalcRatio
//
// Calculate and return the floating point ratio of a formula
// =============================================================
double
UColorUtils::CalcRatio(LJGFormula &inFormula,LJGFormula &inFormula151, LJGFormula &inFormula152,LJGFormula &inFormula153)
{
    short  absoluteL,absoluteJ,absoluteG,absoluteANS;

absoluteL   = (inFormula.L < 0)    ? (inFormula.L * (-1)) : inFormula.L;
    absoluteJ   = (inFormula.J < 0)    ? (inFormula.J * (-1)) : inFormula.J;
    absoluteG   = (inFormula.G < 0)    ? (inFormula.G * (-1)) : inFormula.G;
    absoluteANS = (inFormula.ans < 0)  ? (inFormula.ans * (-1)) : inFormula.ans;

// If L=0 and J=0 and g=0 then ignore this plane
    if((absoluteL == 0) && (absoluteJ == 0) && (absoluteG == 0))
        return kBadRatio;
```

```
//    If L + j + g greater than 28 then ignore this plane
//    if((absoluteL + absoluteJ + absoluteG) > 31)
//        return kBadRatio;

//    If L + g + j + ans is greater than 80 then ignore this plane
//    if((absoluteL + absoluteJ + absoluteG + absoluteANS) > 80)
//        return kBadRatio;

// If j=0 and g=0 put 90
    if((absoluteJ == 0) && (absoluteG == 0))
        return 90.0;

// If j151=0 and j153=0 put L/g (assume if g=0 then bad ratio)
    if((inFormula151.J == 0) && (inFormula153.J == 0))
    {
        if(absoluteG == 0)
            return kBadRatio;
        else
            return (double)inFormula.L / (double)inFormula.G;
    }

// If g151=0 and g152=0 put L/j (assume if j=0 then bad ratio)
    if((inFormula151.G == 0) && (inFormula152.G == 0))
    {
        if(absoluteJ == 0)
            return kBadRatio;
        else
            return (double)inFormula.L / (double)inFormula.J;
    }

// If g152=0 and j153=0 put L/j (assume if j=0 then bad ratio)
    if((inFormula152.G == 0) && (inFormula153.J == 0))
    {
        if(absoluteJ == 0)
            return kBadRatio;
        else
            return (double)inFormula.L / (double)inFormula.J;
    }

// If g=0 put 100 else put j/g
    if((absoluteG == 0))
        return 150.0;      // was 100 return (double)inFormula.J / (double)inFormula.G;
}
// ====================================================================
// EnsurePositiveFormula
//
// Make a formula positive
// ====================================================================
void
UColorUtils::EnsurePositiveFormula(LJGFormula &inFormula)
{
    // If L is negative, adjust all values to make L positive
    // If L = 0, and j is negative, adjust to make j positive
    // If L = 0 and j = 0 and g is negative, adjust to make g positive if( (inFormula.L < 0) ||
        ((inFormula.L == 0) && (inFormula.J < 0)) ||
        ((inFormula.L == 0) && (inFormula.J == 0) && (inFormula.G < 0)) )
    {
        // Fix all components
        inFormula.L    *= (-1);
        inFormula.J    *= (-1);
        inFormula.G    *= (-1);
        inFormula.ans  *= (-1);
    }
}
// ====================================================================
// ReduceByGCD
//
// Reduce a formula by its greatest common denominator
// ====================================================================
void
UColorUtils::ReduceByGCD(LJGFormula &inFormula)
{
    // The GCD cannot be greater than the smallest component, excluding zero if((inFormula.L == 0) && (inFormula.J == 0) && (inFormula.G == 0) && (inFormula.ans == 0))
    {
        // All components zero - nothing to do
```

```
        return;
    }
// At least one component is non-zero short   absoluteVals[4];

absoluteVals[0] = (inFormula.L < 0)    ? (inFormula.L * (-1)) : inFormula.L;
absoluteVals[1] = (inFormula.J < 0)    ? (inFormula.J * (-1)) : inFormula.J;
absoluteVals[2] = (inFormula.G < 0)    ? (inFormula.G * (-1)) : inFormula.G;
absoluteVals[3] = (inFormula.ans < 0)  ? (inFormula.ans * (-1)) : inFormula.ans;

// Find the smallest value of the 4 short   gcd = 32000;    // big number to start
short   i;

for(i=0;i<4;i++)
    {
    if((absoluteVals[i] != 0) && (absoluteVals[i] < gcd))
        {
        gcd = absoluteVals[i];
        }
    } if(gcd == 1)
    {
    // Cant get any smaller than this - nothing to do
    return;
    }

// Find the GCD by performing modulos using smallest until all 4 components have no remainder
// Reduce smallest by 1 until this occurs or 1 is reached while(gcd > 1)
    {
    if( ((absoluteVals[0] % gcd) == 0) &&
        ((absoluteVals[1] % gcd) == 0) &&
        ((absoluteVals[2] % gcd) == 0) &&
        ((absoluteVals[3] % gcd) == 0) )
        {
        // We have a winner - divide all original component values by this number
        inFormula.L     /= gcd;
        inFormula.J     /= gcd;
        inFormula.G     /= gcd;
        inFormula.ans   /= gcd;
        // We are done with this one
        return;
        }
    gcd--;  // -1 and try again
    }
// These values could not be evenly divided by anything greater than 1 - give up
}

// -----------------------------------------------------------------
// AddFormulas
//
// Utility routine to add two formulas
// -----------------------------------------------------------------
void
UColorUtils::AddFormulas(LJGFormula &inFormula1, LJGFormula &inFormula2, LJGFormula &outFormula)
{
    outFormula.L    = inFormula1.L      +  inFormula2.L;
    outFormula.J    = inFormula1.J      +  inFormula2.J;
    outFormula.G    = inFormula1.G      +  inFormula2.G;
    outFormula.ans  = inFormula1.ans    +  inFormula2.ans;
}

// -----------------------------------------------------------------
// SubFormulas
//
// Utility routine to subtract two formulas
// -----------------------------------------------------------------
void
UColorUtils::SubFormulas(LJGFormula &inFormula1, LJGFormula &inFormula2, LJGFormula &outFormula)
{
    outFormula.L    = inFormula1.L      -  inFormula2.L;
    outFormula.J    = inFormula1.J      -  inFormula2.J;
    outFormula.G    = inFormula1.G      -  inFormula2.G;
    outFormula.ans  = inFormula1.ans    -  inFormula2.ans;
}
```

We claim:

1. An automated method of creating a color palette including two selected colors and a plurality of other colors visually compatible with the two selected colors, comprising the steps of:

providing a computing system;

defining in said computing system a three-dimensional coordinate mapping system which maps colors;

receiving a user input in the computing system defining the two selected colors and storing coordinates of said two selected colors according to said coordinate mapping system;

using said computing system, deriving an equation for at least one plane in the coordinate mapping system containing said coordinates of said two selected colors;

automatically selecting a plurality of spaced points on said plane, each said point defining a color, to form a color palette of points in said plane; and generating an output providing information defining said planar color palette;

wherein said computing system automatically derives equations for a plurality of said planes containing the coordinates of said two selected colors, creates color palettes from said planes, and generates a plurality of outputs providing information defining said color palettes.

2. The method of claim 1 including the further step of arranging said outputs for said plurality of color palettes for sequential display according to a degree of color separation.

3. The method of claim 1 including the further step of arranging said outputs for said plurality of color palettes for sequential display according to a hue content.

4. The method of claim 3 including the further steps of:

selecting two of the three axes of said coordinate system;

calculating a ratio of coordinates of each palette along the selected two axes; and using said ratio of coordinates to control the arrangement of said sequential display of the palettes.

5. The method of claim 1 including the further step of receiving a user scrolling control input and sequentially displaying the palettes in a predetermined order under user control.

6. The method of claim 1 wherein said plurality of palettes are generated by combining a plurality of plane-defining equations derived from an equation of a line passing through said coordinates of said two selected colors.

7. The method of claim 6 including the further step of filtering the palettes to eliminate palettes which do not have a color difference that exceeds a defined threshold, as compared to other generated palettes.

8. The method of claim 6 including the further step of filtering the palettes to eliminate palettes which contain only colors having coordinates on the line between said coordinates of said two selected colors.

9. The method of claim 1 further comprising the step of receiving a user input indicating a number of colors to be displayed, and filtering said output to provide color palettes with a desired number of colors.

10. The method of claim 1 including the further steps of:

for each color palette to be displayed, selecting two of the three axes of the coordinate system according to a predetermined formula based on the orientation of the plane of the color palette;

arranging the colors in each palette for display according to their relative coordinates on the selected two of the three axes of the coordinate system.

11. An automated system for creating a color palette including two selected colors and a plurality of other colors visually compatible with the two selected colors, comprising:

coordinate system defining means for defining a three-dimensional coordinate mapping system which maps colors;

input means for receiving a user input defining the two selected colors and storing coordinates of said two selected colors according to said coordinate mapping system;

calculating means associated with the coordinate system defining means and the input means, for deriving an equation for at least one plane in the coordinate mapping system containing said coordinates of said two selected colors;

palette creating means associated with the calculating means for automatically selecting a plurality of spaced points on said plane, each said point defining a color, to form a color palette of points in said plane; and output means for generating an output providing information defining said planar color palette;

wherein said calculating means automatically derives equations for a plurality of said planes containing the coordinates of said two selected colors, said palette creating means creates color palettes from said planes, and said output means generates a plurality of outputs providing information defining said plurality of color palettes.

12. The system of claim 11 further including color separation output sequencing means for arranging said outputs for said plurality of color palettes for sequential display according to a degree of color separation.

13. The system of claim 11 further including hue output sequencing means for arranging said outputs for said plurality of color palettes for sequential display according to a hue content.

14. The system of claim 13 further comprising coordinate ratio sequencing means for selecting two of the three axes of said coordinate system, calculating a ratio of coordinates of each palette along the selected two axes, and using said ratio of coordinates to control the arrangement of said sequential display of the palettes.

15. The system of claim 11 including scrolling means for receiving a user scrolling control input and sequentially displaying the generated palettes in a predetermined sequence under user control.

16. The system of claim 11 wherein said calculating means includes means for combining a plurality of plane-defining equations derived from an equation of a line passing through said coordinates of said two selected colors.

17. The system of claim 16 further comprising filtering means associated with said palette creating means for filtering the palettes to eliminate palettes which do not have a color difference that exceeds a defined threshold, as compared to other generated palettes.

18. The system of claim 16 further comprising filtering means for eliminating palettes which contain only colors having coordinates on the line between said coordinates of said two selected colors.

19. The system of claim 11 including display ordering means for selecting two of the three axes of the coordinate system according to a predetermined formula based on the orientation of the plane of each color palette, and arranging the colors in each palette for display according to their relative coordinates on the selected two of the three axes of the coordinate system.

20. The system of claim 11 further comprising color quantity selection means for receiving a user input indicating a number of colors to be displayed, and filtering said output to provide color palettes with a desired number of colors.

* * * * *